US012675002B2

(12) United States Patent
Aikawa

(10) Patent No.: US 12,675,002 B2
(45) Date of Patent: Jul. 7, 2026

(54) OPHTHALMIC LENS DESIGN METHOD, OPHTHALMIC LENS MANUFACTURING METHOD, OPHTHALMIC LENS, OPHTHALMIC LENS DESIGN DEVICE, OPHTHALMIC LENS ORDER RECEIVING/ORDERING SYSTEM, AND DESIGN PROGRAM

(71) Applicant: NIKON-ESSILOR CO., LTD., Tokyo (JP)

(72) Inventor: Naoshi Aikawa, Fujisawa (JP)

(73) Assignee: NIKON-ESSILOR CO., LTD., Tokyo (JP)

( * ) Notice: Subject to any disclaimer, the term of this patent is extended or adjusted under 35 U.S.C. 154(b) by 844 days.

(21) Appl. No.: 17/841,154

(22) Filed: Jun. 15, 2022

(65) Prior Publication Data

US 2022/0308362 A1     Sep. 29, 2022

Related U.S. Application Data

(63) Continuation of application No. PCT/JP2020/047280, filed on Dec. 17, 2020.

(30) Foreign Application Priority Data

Dec. 20, 2019     (JP) ................................. 2019-230891

(51) Int. Cl.
*G02C 7/02*     (2006.01)
*G02C 7/06*     (2006.01)

(52) U.S. Cl.
CPC ............... *G02C 7/027* (2013.01); *G02C 7/06* (2013.01)

(58) Field of Classification Search
CPC .......... G02C 7/027; G02C 7/06; G02C 7/025; G02C 2202/22; G02C 7/02; G02C 7/061; (Continued)

(56) References Cited

U.S. PATENT DOCUMENTS

| 4,055,379 A | 10/1977 | Winthrop |
|---|---|---|
| 4,253,747 A | 3/1981 | Maitenaz |

(Continued)

FOREIGN PATENT DOCUMENTS

| CN | 101118635 A | 2/2008 |
|---|---|---|
| CN | 208384273 U | 1/2019 |

(Continued)

OTHER PUBLICATIONS

Machine translation of JP2002010977A (Year: 2002).*

(Continued)

*Primary Examiner* — Matthew Y Lee

(57) ABSTRACT

An ophthalmic lens design method includes: acquiring first information about a purpose of an ophthalmic lens; acquiring second information about at least one of a visual line of a wearer for the purpose, a place, a use tool, and a body of the wearer; acquiring data indicating a number of first regions, positions, shapes, and sizes of a plurality of first regions set on a surface of the ophthalmic lens, and distances to a target viewed through the first regions; setting a variable numerical value among numerical values indicating the number of first regions, the positions, the shapes, and the sizes of the plurality of first regions, and the distances in the data and setting the plurality of first regions and the distances on the surface; and setting a target aberration distribution based on the plurality of first regions and the distances that have been set.

31 Claims, 52 Drawing Sheets

EMBODIMENT EXAMPLE 1   RESIDUAL REFRACTIVE POWER

(58) Field of Classification Search
CPC ........ G02C 7/066; G02C 7/14; G02C 13/003; G06F 30/10
See application file for complete search history.

(56) References Cited

U.S. PATENT DOCUMENTS

| | | | | |
|---|---|---|---|---|
| 5,892,565 A * | 4/1999 | Ueno | ..................... | G02C 7/065 |
| | | | | 351/159.42 |
| 5,949,519 A | 9/1999 | Le Saux et al. | | |
| 2001/0051953 A1 | 12/2001 | Fukuma et al. | | |
| 2004/0027679 A1 | 2/2004 | Welk et al. | | |
| 2006/0007394 A1* | 1/2006 | Shirayanagi | ............. | G02C 7/02 |
| | | | | 351/159.74 |
| 2008/0033836 A1* | 2/2008 | Shinohara | .......... | G06Q 30/0635 |
| | | | | 705/26.81 |
| 2010/0157242 A1* | 6/2010 | Esser | ..................... | G02C 7/027 |
| | | | | 351/159.76 |
| 2010/0296055 A1 | 11/2010 | Esser et al. | | |
| 2010/0309428 A1* | 12/2010 | Altheimer | .............. | G02C 7/061 |
| | | | | 703/2 |
| 2011/0222019 A1 | 9/2011 | Suzuki et al. | | |
| 2015/0055083 A1 | 2/2015 | Mori et al. | | |
| 2015/0293381 A1* | 10/2015 | Mizuno | ................ | G02C 13/005 |
| | | | | 351/159.75 |
| 2016/0011437 A1* | 1/2016 | Nishimura | ........... | A61B 3/0091 |
| | | | | 351/204 |
| 2016/0242670 A1* | 8/2016 | Suzuki | ................. | A61B 3/0025 |
| 2019/0271859 A1* | 9/2019 | Cho | ........................ | G02C 7/066 |
| 2019/0391411 A1* | 12/2019 | Kelch | .................... | G02C 7/068 |

FOREIGN PATENT DOCUMENTS

| | | | | |
|---|---|---|---|---|
| DE | 298 17 176 U1 | 8/1999 | | |
| JP | 55-11285 | 1/1980 | | |
| JP | 63-115129 | 5/1988 | | |
| JP | 11-194307 A | 7/1999 | | |
| JP | 2002-10977 | 1/2002 | | |
| JP | 2002010977 A * | 1/2002 | .......... | G02C 13/003 |
| JP | 2008-39997 | 2/2008 | | |
| JP | 2008-299168 | 12/2008 | | |
| JP | 2010-517088 | 5/2010 | | |
| JP | 2012-22288 | 2/2012 | | |
| JP | 2013-218004 A | 10/2013 | | |
| JP | 2014-66792 | 4/2014 | | |
| JP | 5725646 | 5/2015 | | |
| WO | 03/019269 A2 | 3/2003 | | |
| WO | 2008/089995 A1 | 7/2008 | | |

OTHER PUBLICATIONS

Written Amendment of Japanese Patent Application No. JP63-115129 issued on Apr. 22, 1994 (4 pp.).

International Search Report, dated Mar. 9, 2021, in counterpart International Patent Application No. PCT/JP2020/047280 (6 pp.).

Written Opinion of the International Searching Authority, dated Mar. 9, 2021, in counterpart International Patent Application No. PCT/JP2020/047280 (12 pp.).

Extended European Search Report dated Jan. 2, 2024 for European Application No. 20903932.0.

Japanese Office Action dated Jan. 9, 2024 for Japanese Application No. 2021-565659.

Canadian Office Action dated Sep. 27, 2023 for Canadian Application No. 3,165,146.

Chinese Office Action date Feb. 28, 2024 for Chinese Application No. 202080086591.2.

Japanese Office Action dated Aug. 1, 2023 for Japanese Application No. 2021-565659.

Japanese Office Action dated May 14, 2024 for Japanese Patent Application No. 2021-565659.

Canadian Office Action dated May 30, 2024 for Canadian Application No. 3,165,146.

Office Action issued Oct. 21, 2025 for Application No. 20 903 932.0.

Korean Office Action dated Jan. 31, 2025 for Korean Application No. 10-2022-7019408.

Canadian Office Action issued Mar. 12, 2026 for Application No. 3,165,146.

* cited by examiner

FIG. 2
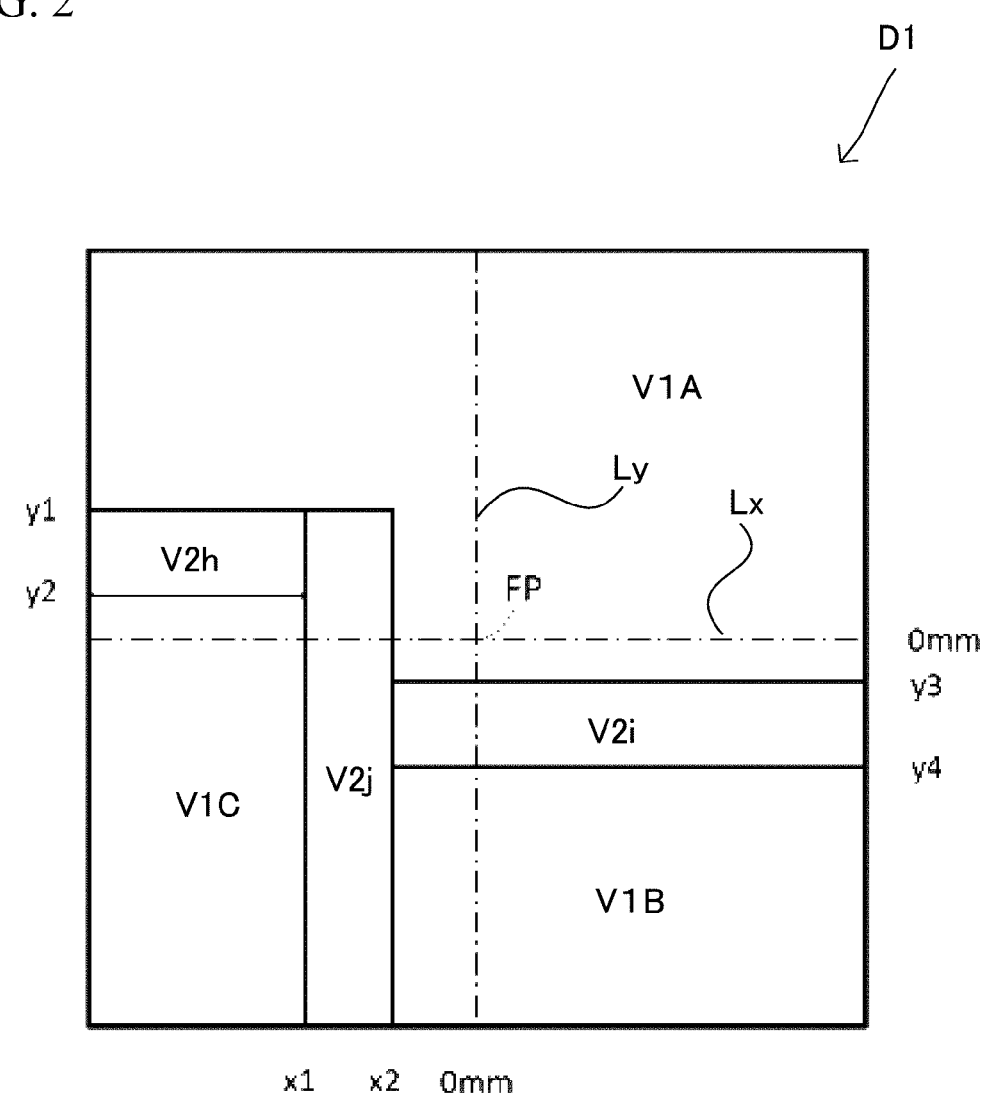
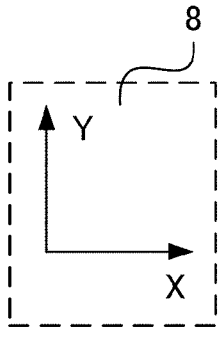

FIG. 7

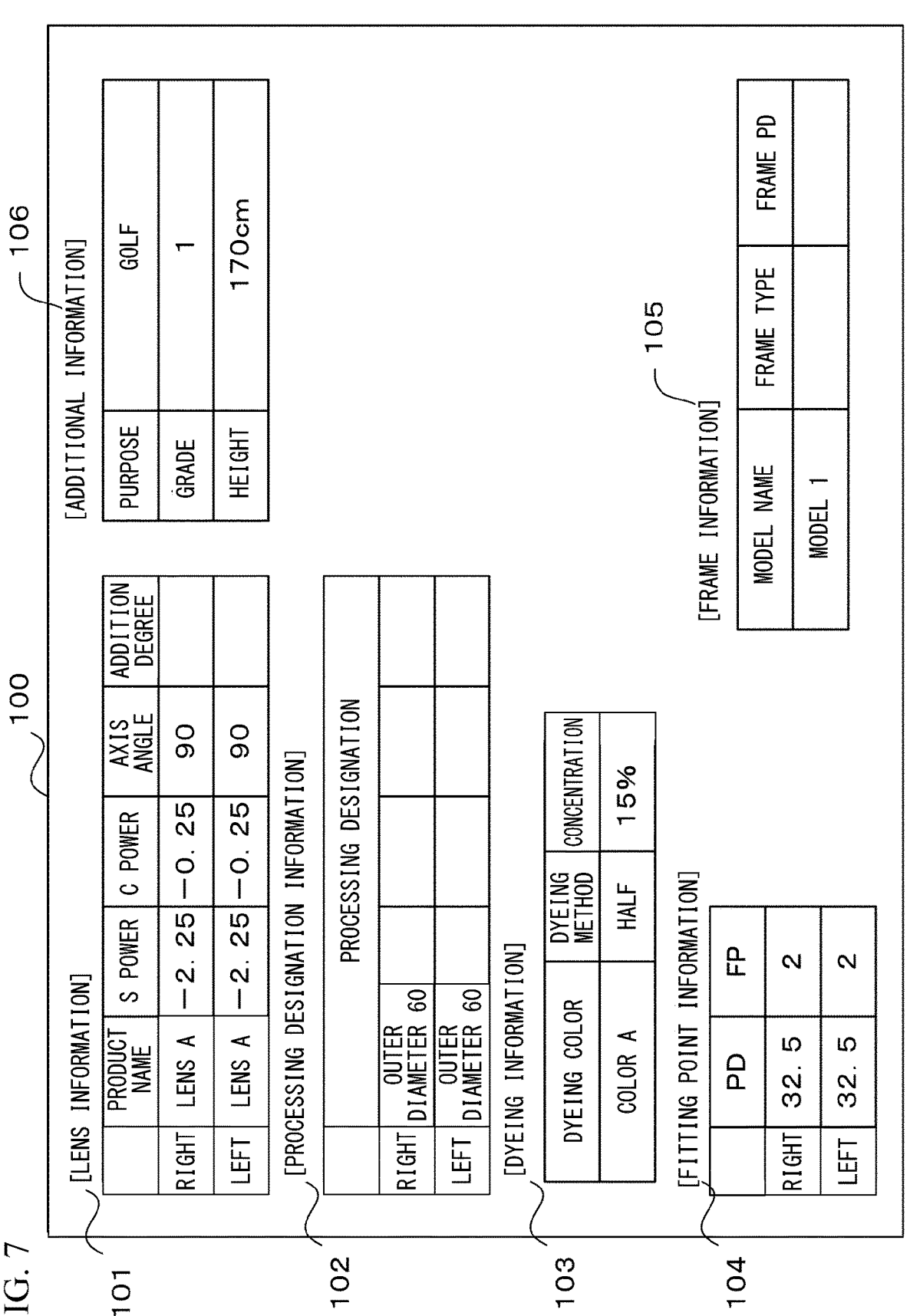

100

[LENS INFORMATION] 101

| | PRODUCT NAME | S POWER | C POWER | AXIS ANGLE | ADDITION DEGREE |
|---|---|---|---|---|---|
| RIGHT | LENS A | -2. 25 | -0. 25 | 90 | |
| LEFT | LENS A | -2. 25 | -0. 25 | 90 | |

[PROCESSING DESIGNATION INFORMATION] 102

| | PROCESSING DESIGNATION | | |
|---|---|---|---|
| RIGHT | OUTER DIAMETER 60 | | |
| LEFT | OUTER DIAMETER 60 | | |

[DYEING INFORMATION] 103

| DYEING COLOR | DYEING METHOD | CONCENTRATION |
|---|---|---|
| COLOR A | HALF | 15% |

[FITTING POINT INFORMATION] 104

| | PD | FP |
|---|---|---|
| RIGHT | 32. 5 | 2 |
| LEFT | 32. 5 | 2 |

[ADDITIONAL INFORMATION] 106

| PURPOSE | GOLF |
|---|---|
| GRADE | 1 |
| HEIGHT | 170cm |

[FRAME INFORMATION] 105

| MODEL NAME | FRAME TYPE | FRAME PD |
|---|---|---|
| MODEL 1 | | |

D2

Ly V1A1 y1

V2h y2

Lx

FP

0mm y3

V2i1 y4

V1C

V2j

V2k

V1D

V1B1 x1   x2   0mm   x3   x4

8

V100     C100     D4

V1A3

CM

V1A3       Lx y10

FP

0mm

V2i2 y20

V1B3

Ly

V1B3

0mm

8

Y

X

FIG. 18
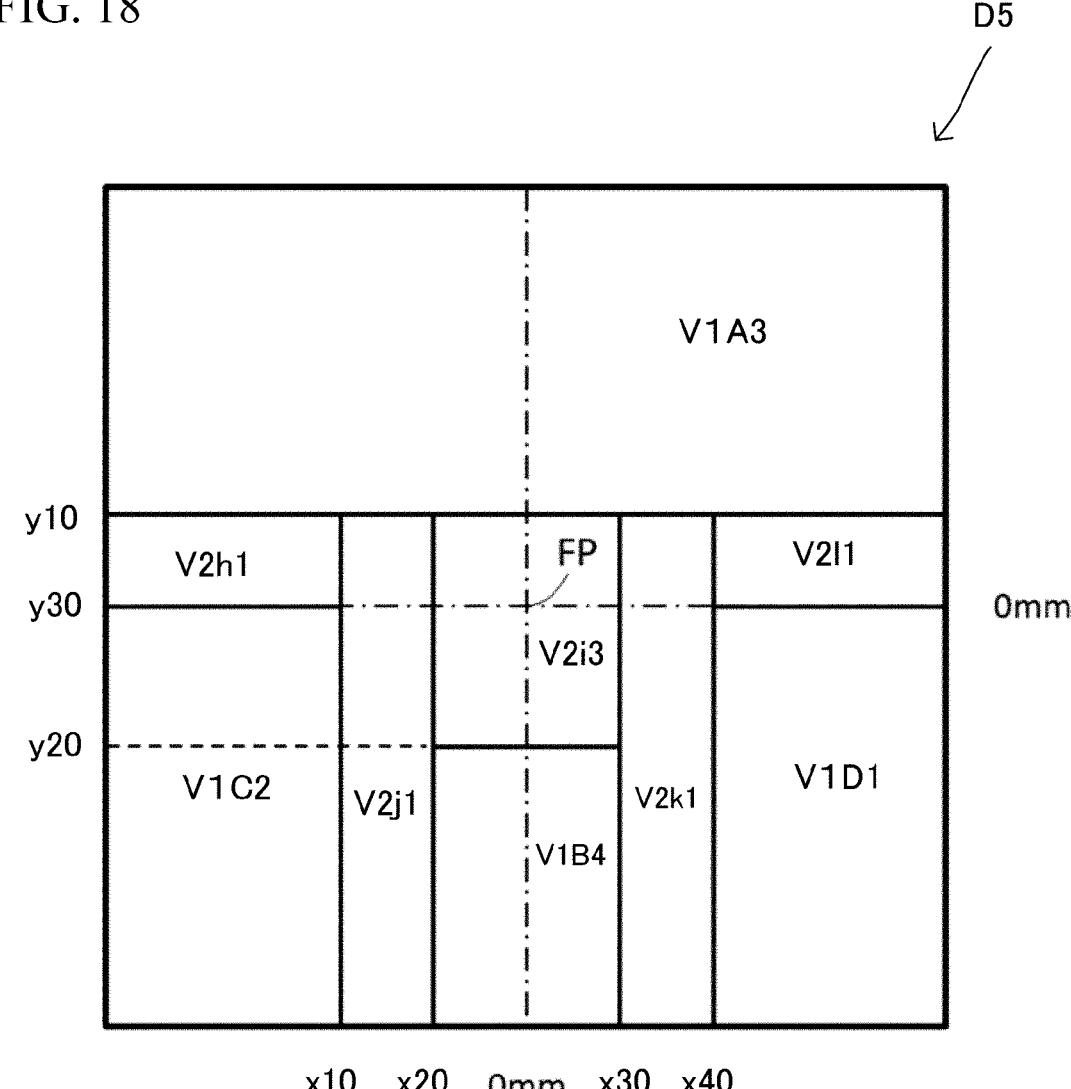
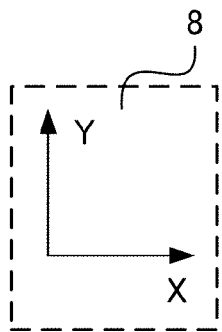

FIG. 20
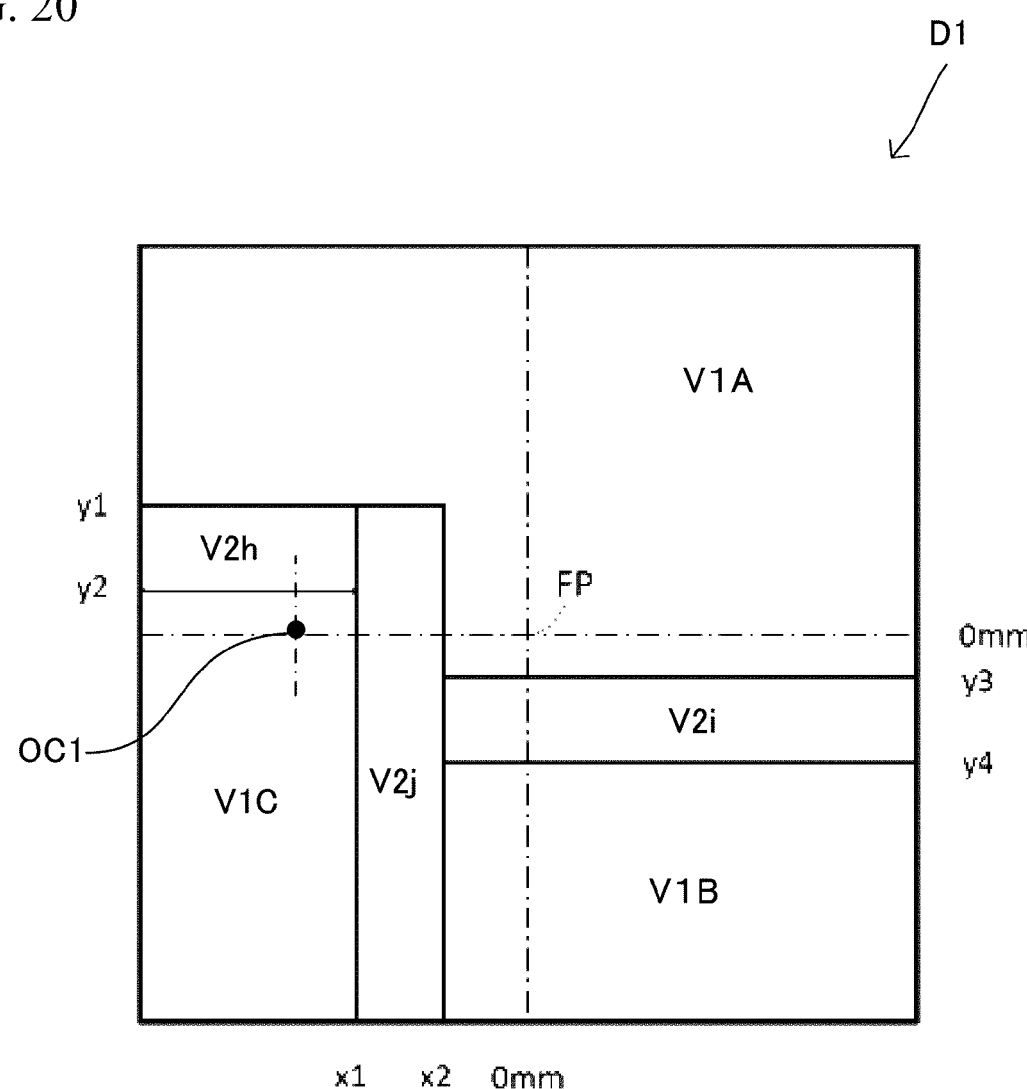
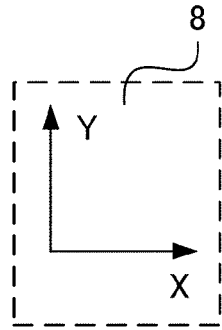

FIG. 21
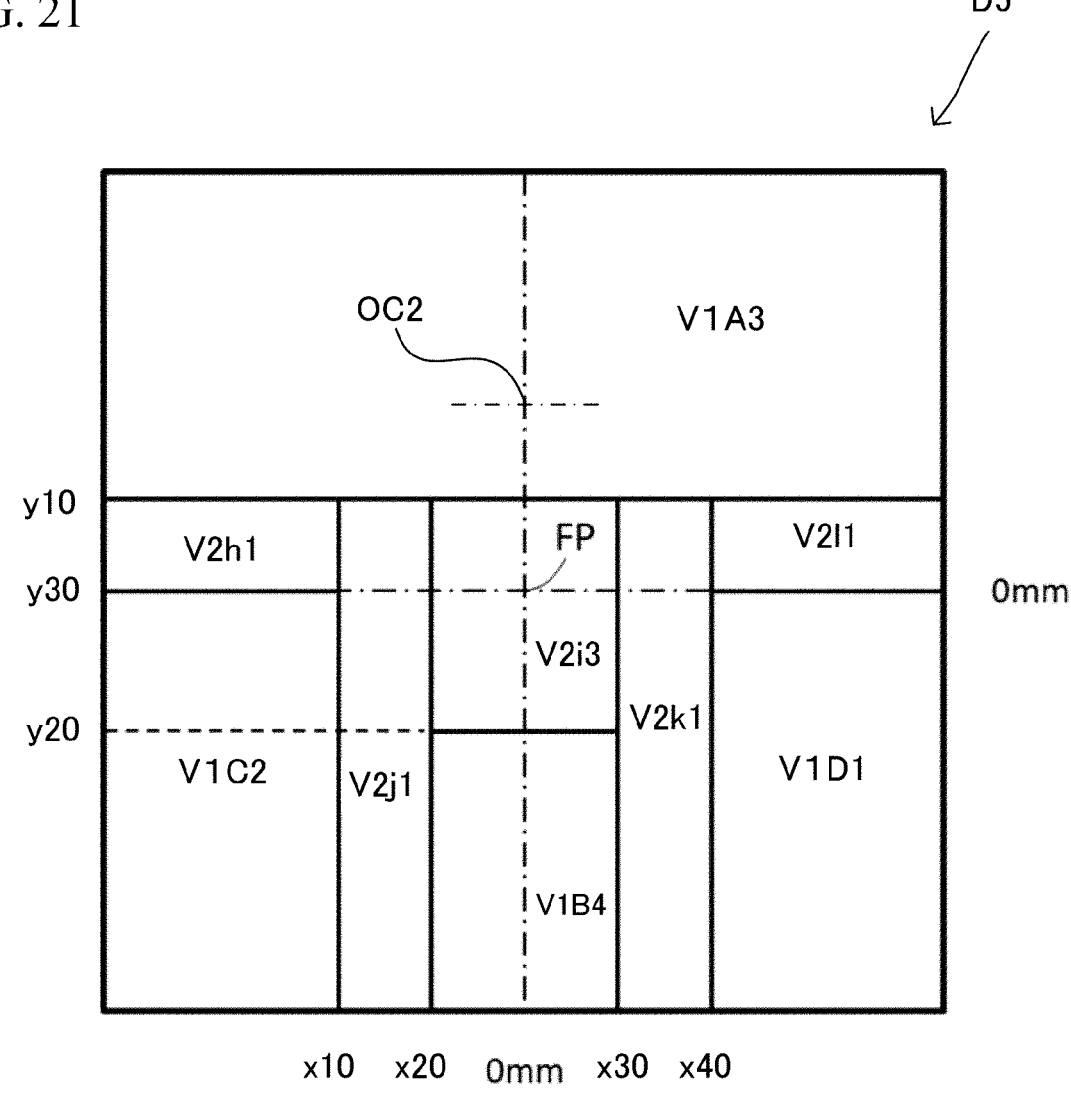
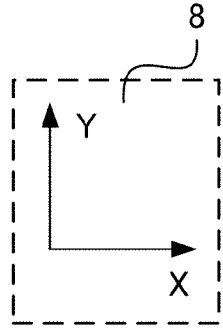

FIG. 22
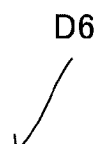
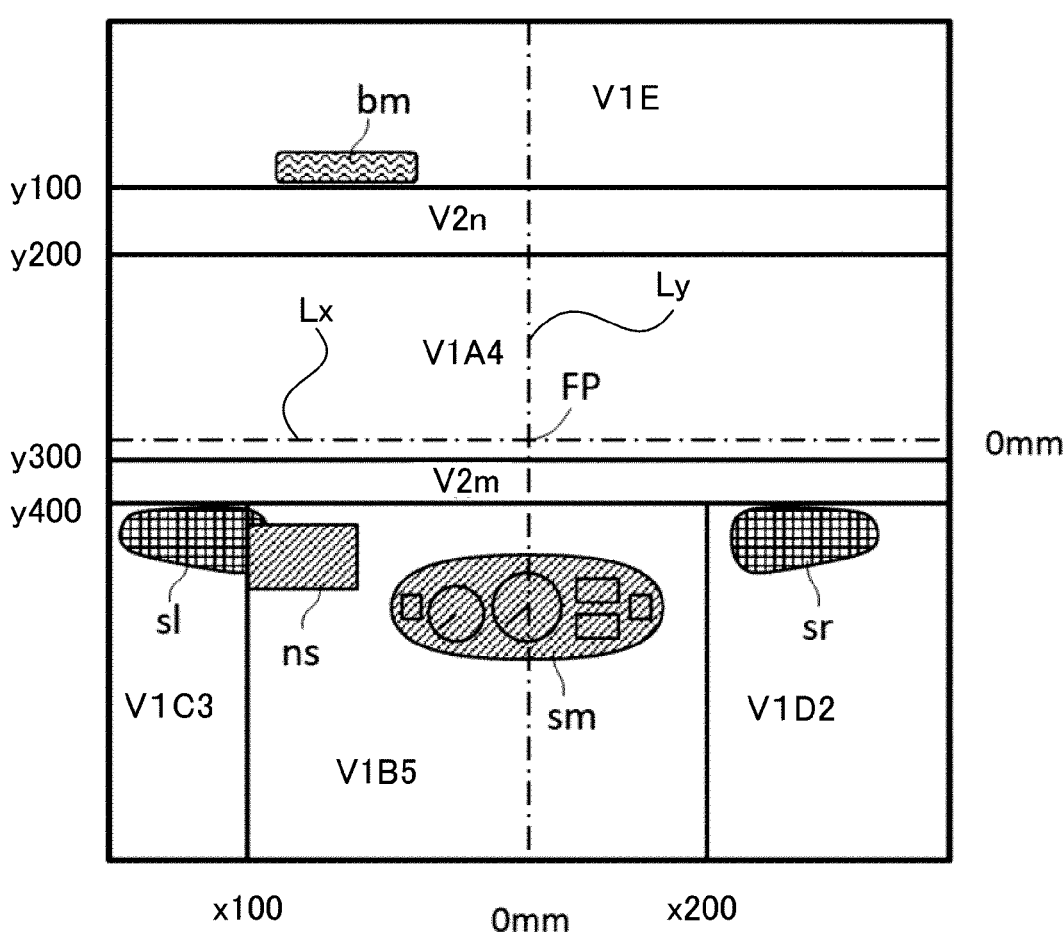
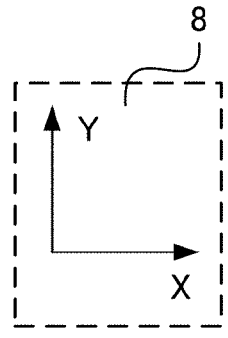

FIG. 24    EMBODIMENT EXAMPLE 1    RESIDUAL REFRACTIVE POWER
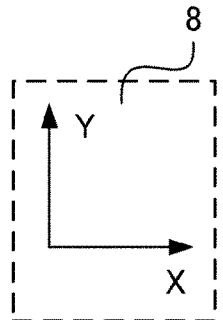

FIG. 25   <u>EMBODIMENT EXAMPLE 1   RESIDUAL ASTIGMATISM</u>
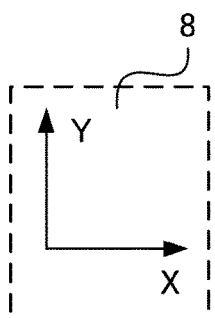

FIG. 26 EMBODIMENT EXAMPLE 1   AVERAGE CURVATURE
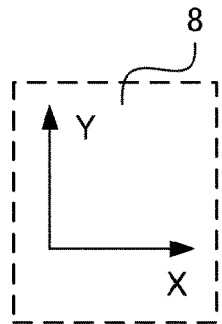
POSITION IN X-DIRECTION (mm)

FIG. 27   COMPARATIVE EXAMPLE 1   RESIDUAL REFRACTIVE POWER
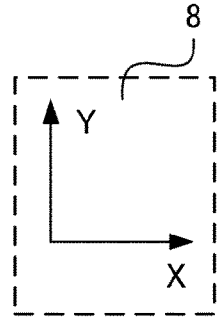

FIG. 28  COMPARATIVE EXAMPLE 1  RESIDUAL ASTIGMATISM
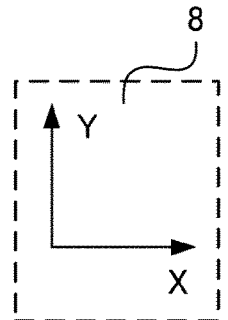

FIG. 29  COMPARATIVE EXAMPLE 1  AVERAGE CURVATURE
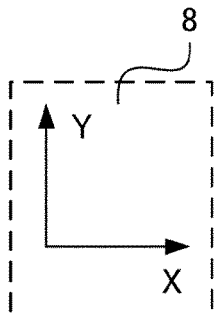

FIG. 30    EMBODIMENT EXAMPLE 2    RESIDUAL REFRACTIVE POWER
POSITION IN X-DIRECTION (mm)
POSITION IN Y-DIRECTION (mm)
V1A
BL
V1C
V1B
0.0
-0.1
-0.2
-0.4
-0.6
CL1
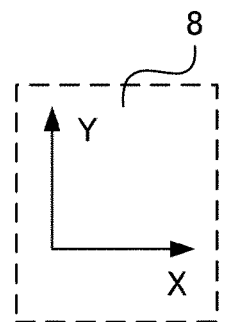

FIG. 31  EMBODIMENT EXAMPLE 2   RESIDUAL ASTIGMATISM
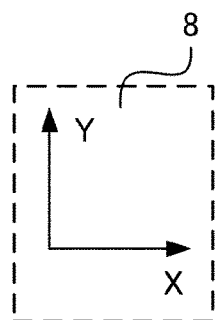
POSITION IN X-DIRECTION (mm)

FIG. 32  EMBODIMENT EXAMPLE 2  AVERAGE CURVATURE
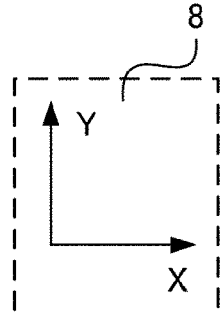
POSITION IN X-DIRECTION (mm)

FIG. 33  EMBODIMENT EXAMPLE 3  RESIDUAL REFRACTIVE POWER
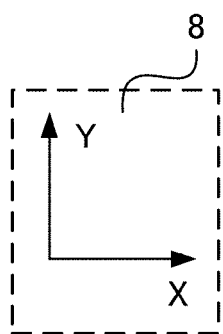
POSITION IN X-DIRECTION (mm)

FIG. 34 <u>EMBODIMENT EXAMPLE 3   RESIDUAL ASTIGMATISM</u>
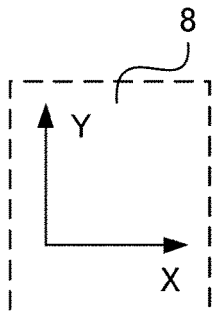

FIG. 35   EMBODIMENT EXAMPLE 3   AVERAGE CURVATURE
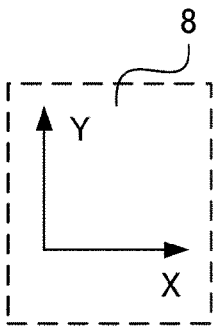

FIG. 36    EMBODIMENT EXAMPLE 3    NORMALIZED AVERAGE CURVATURE
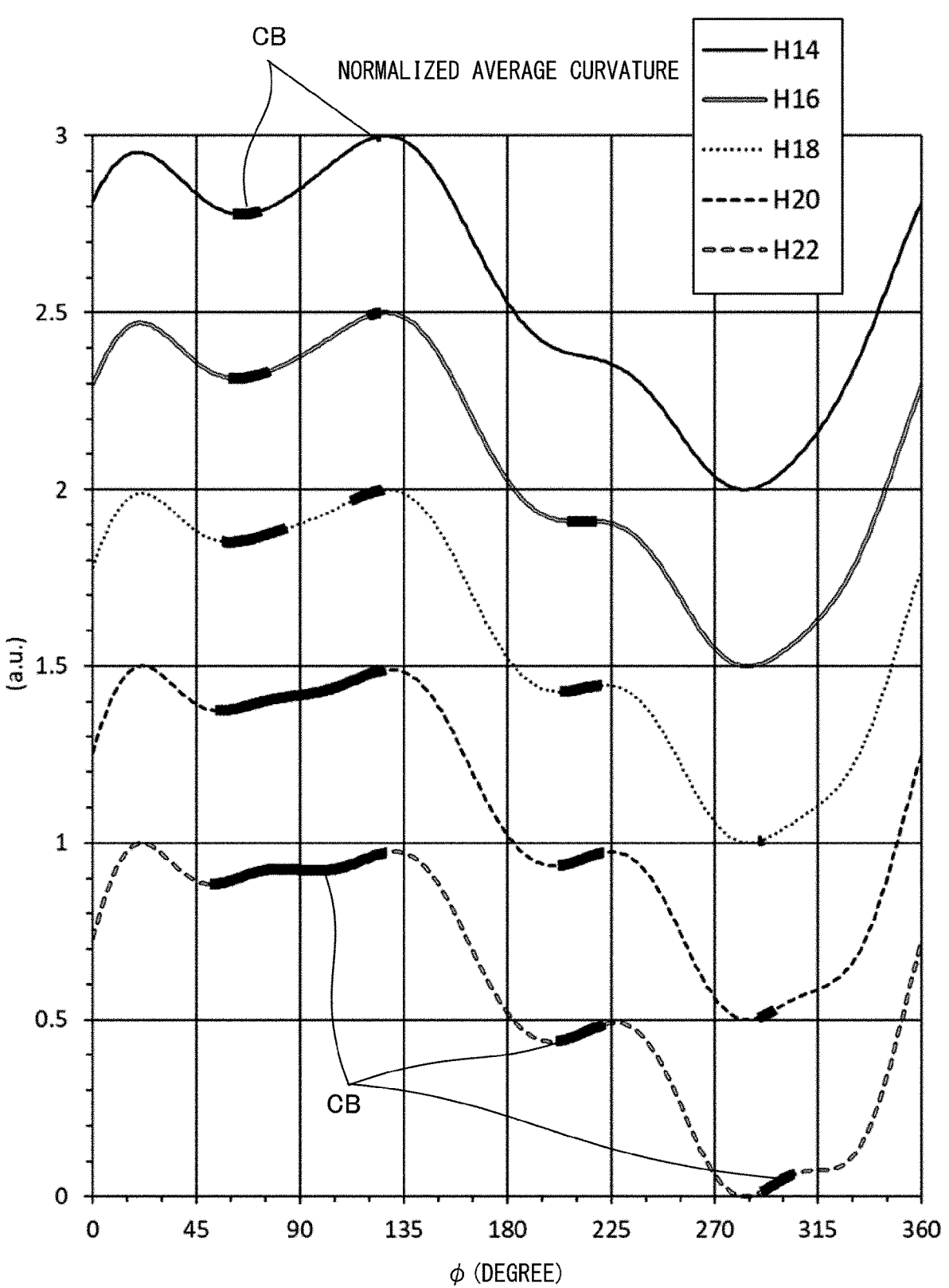

FIG. 37   EMBODIMENT EXAMPLE 4   RESIDUAL REFRACTIVE POWER
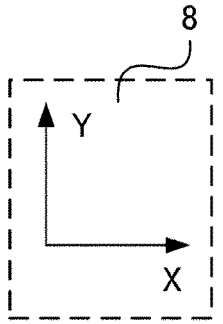

FIG. 38   EMBODIMENT EXAMPLE 4   RESIDUAL ASTIGMATISM
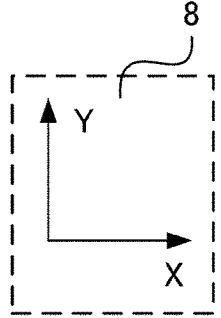

FIG. 39    EMBODIMENT EXAMPLE 4    AVERAGE CURVATURE
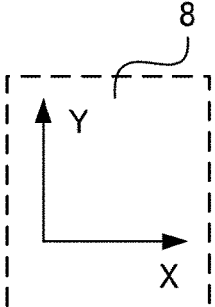

FIG. 40   EMBODIMENT EXAMPLE 4   NORMALIZED AVERAGE CURVATURE
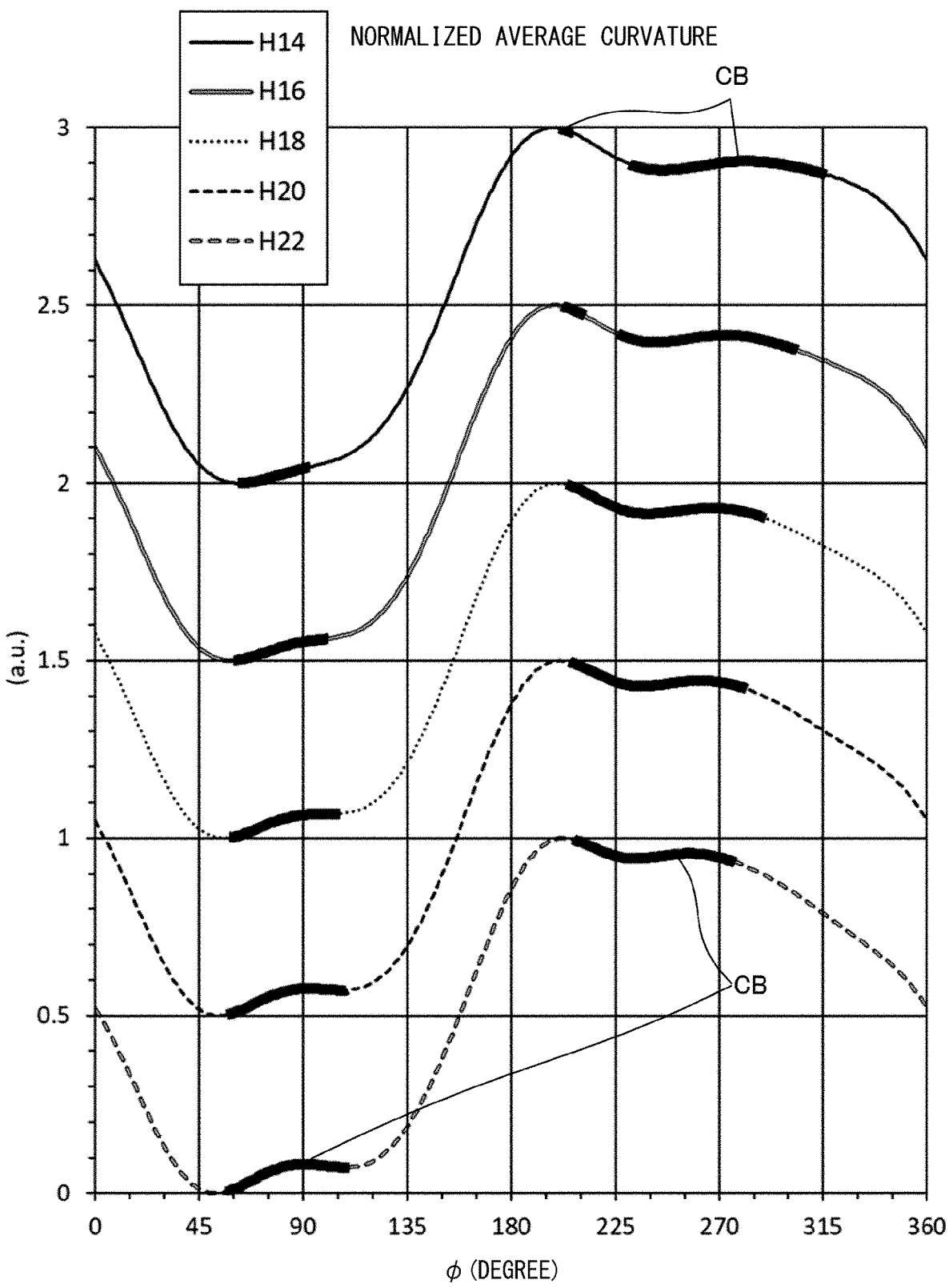

FIG. 41 <u>EMBODIMENT EXAMPLE 5 RESIDUAL REFRACTIVE POWER</u>
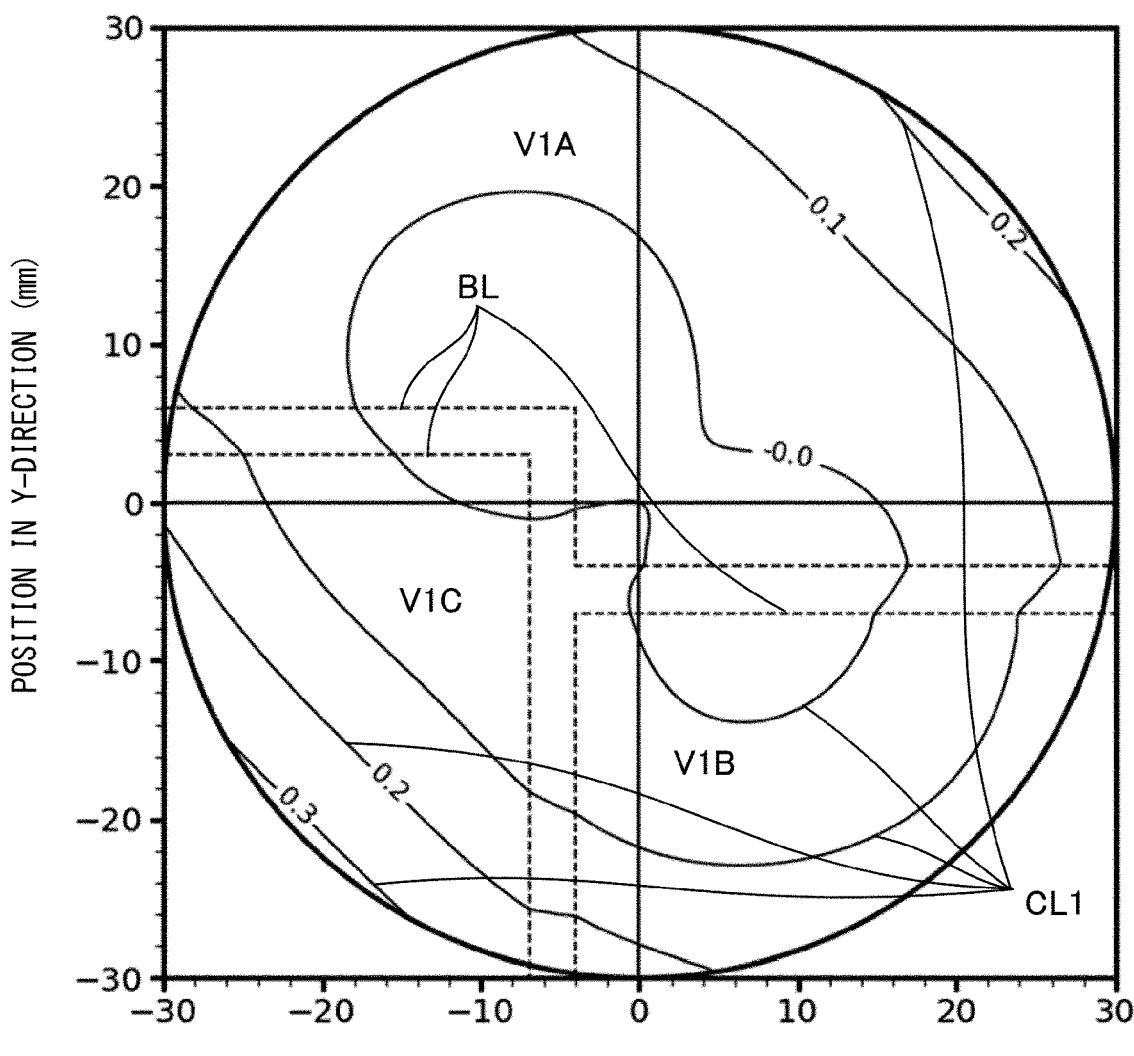
POSITION IN X-DIRECTION (mm)
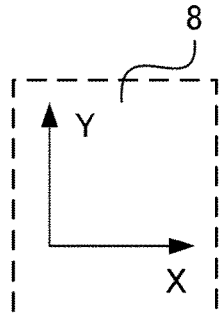

FIG. 42   EMBODIMENT EXAMPLE 5   RESIDUAL ASTIGMATISM
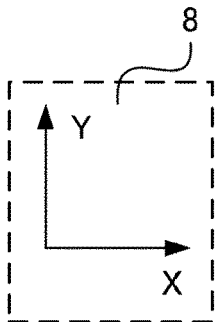
POSITION IN X-DIRECTION (mm)

FIG. 43 <u>EMBODIMENT EXAMPLE 5   AVERAGE CURVATURE</u>
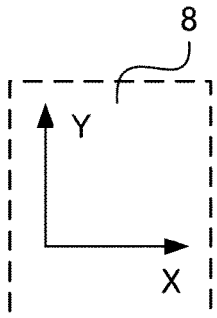

FIG. 44 <u>EMBODIMENT EXAMPLE 5   NORMALIZED AVERAGE CURVATURE</u>
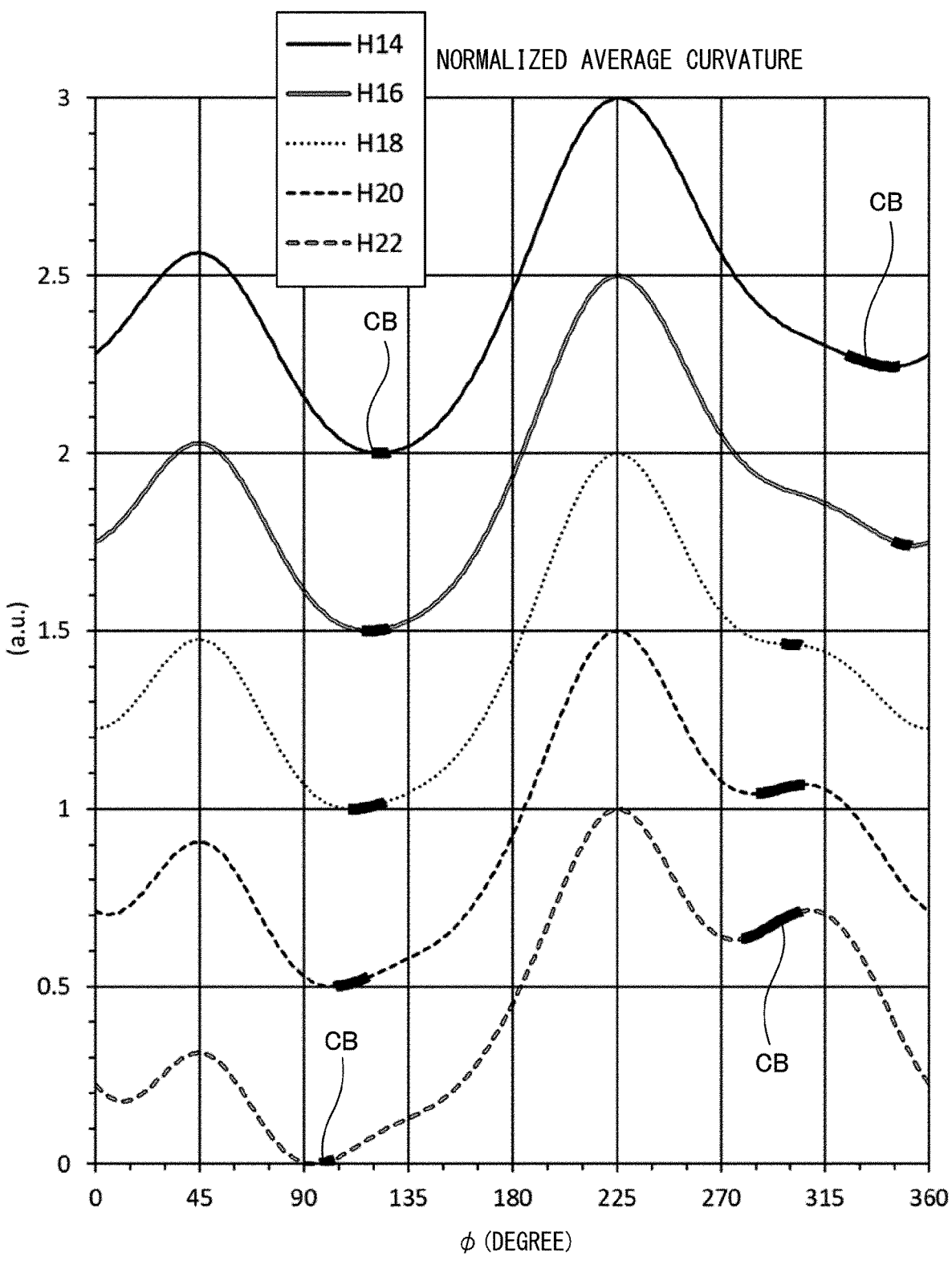

FIG. 45 <u>EMBODIMENT EXAMPLE 6   RESIDUAL REFRACTIVE POWER</u>
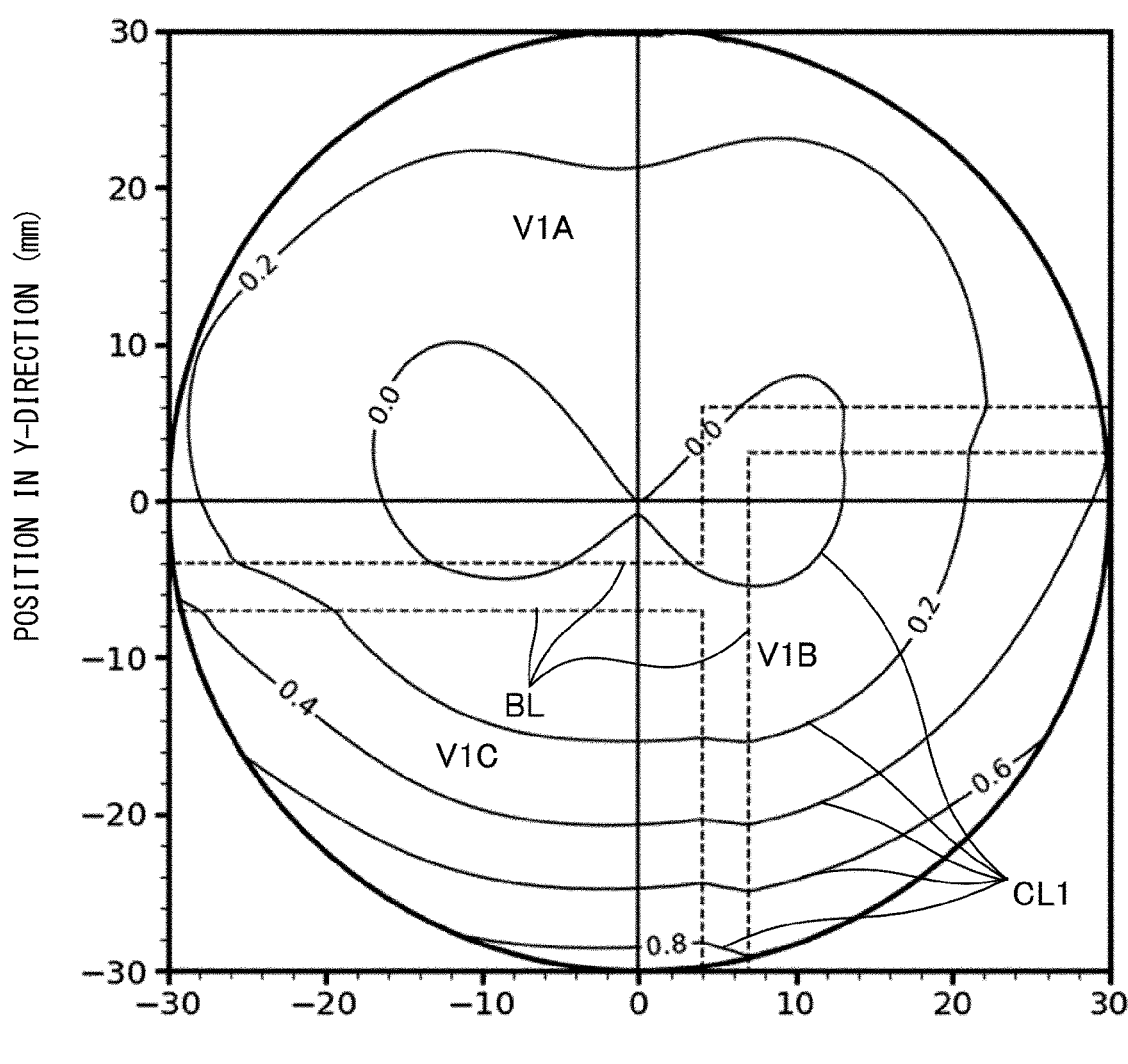
POSITION IN X-DIRECTION (mm)
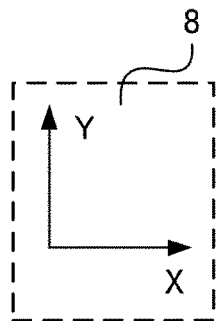

FIG. 46 EMBODIMENT EXAMPLE 6   RESIDUAL ASTIGMATISM
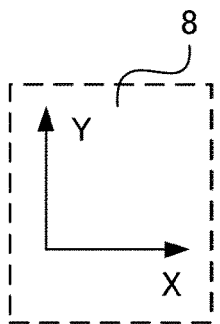
POSITION IN X-DIRECTION (mm)

FIG. 47  EMBODIMENT EXAMPLE 6  AVERAGE CURVATURE
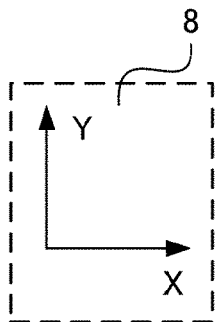
POSITION IN X-DIRECTION (mm)

FIG. 48  EMBODIMENT EXAMPLE 6   NORMALIZED AVERAGE CURVATURE
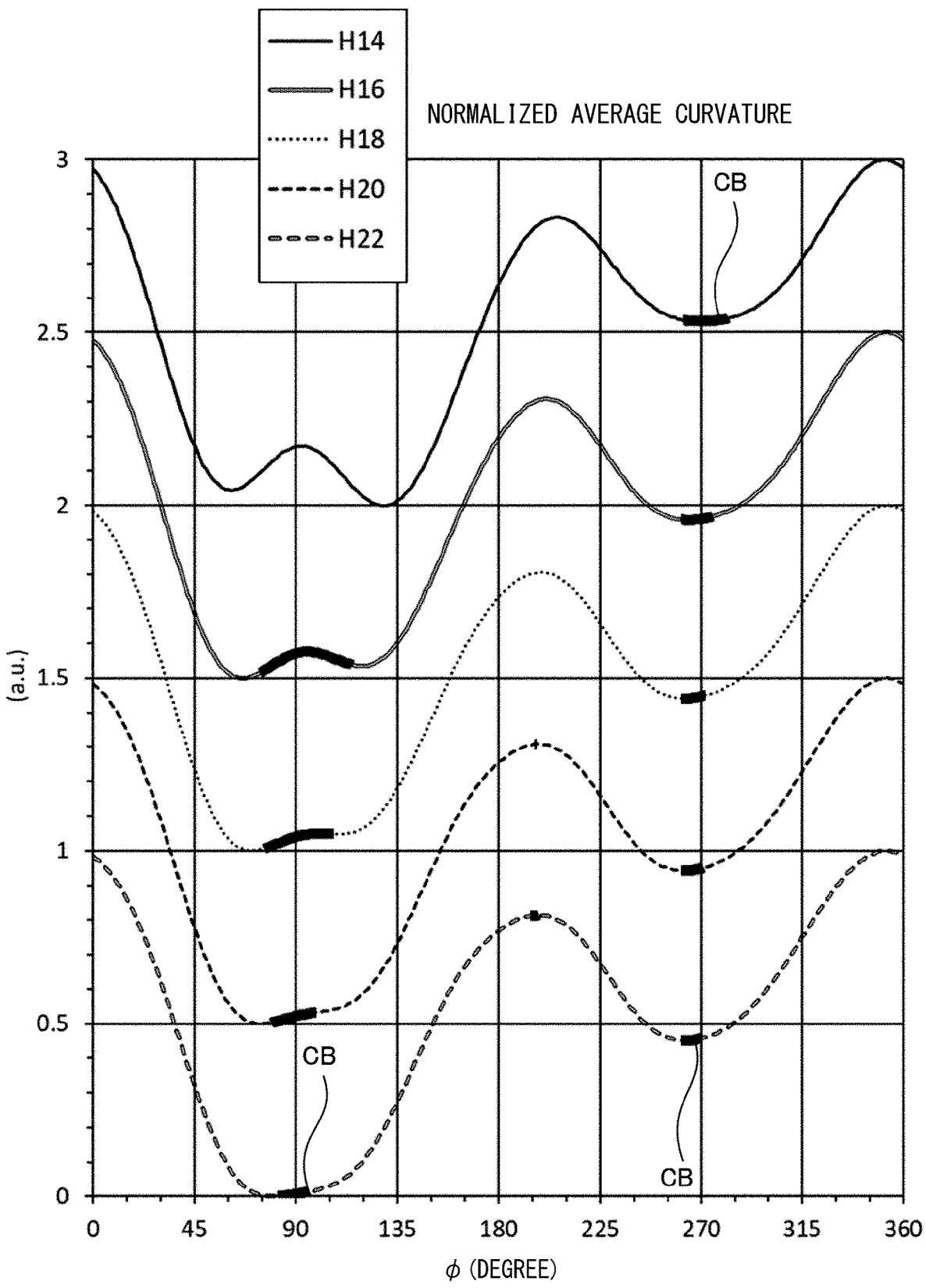

FIG. 49  EMBODIMENT EXAMPLE 7  RESIDUAL REFRACTIVE POWER
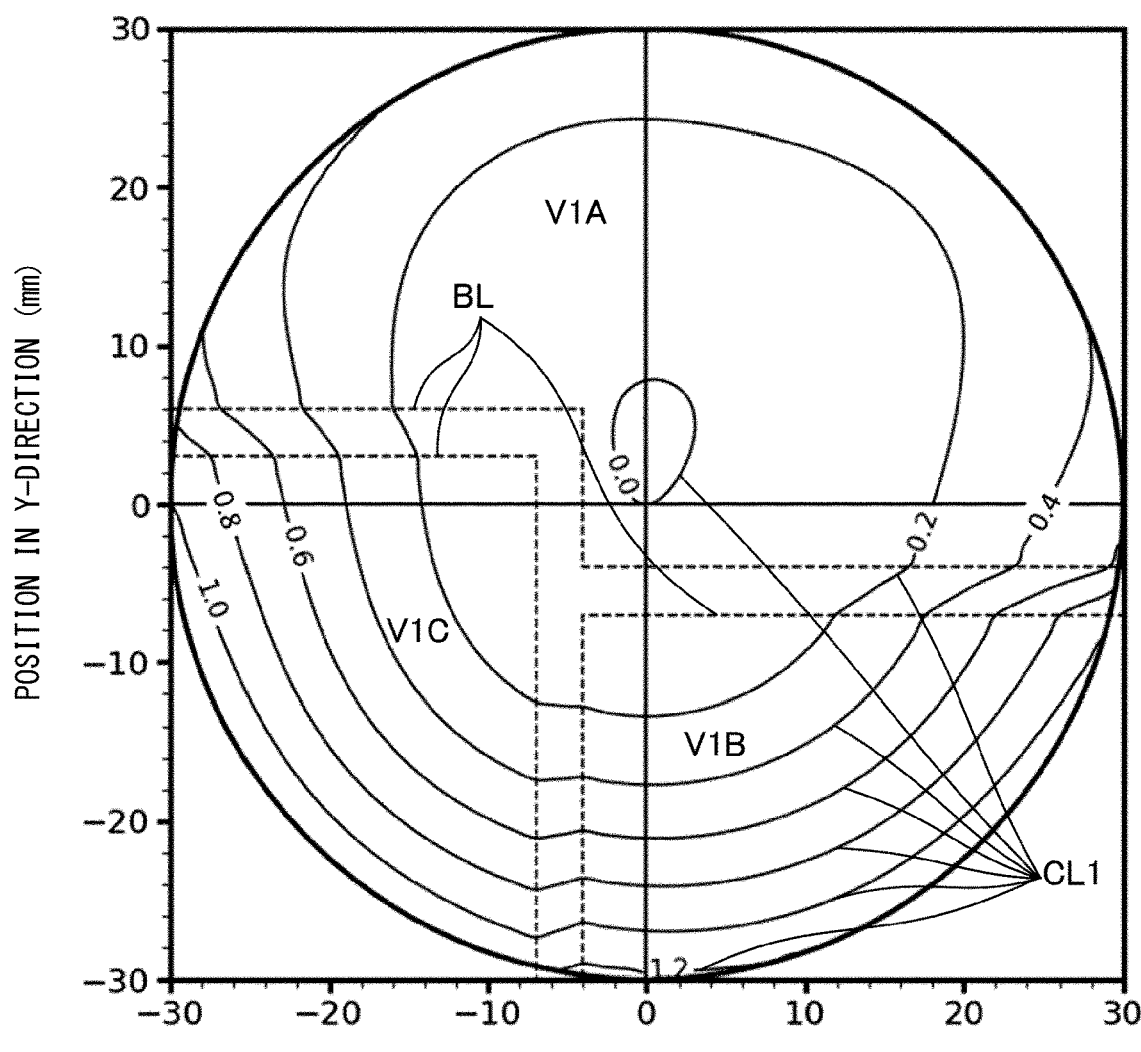
POSITION IN X-DIRECTION (mm)
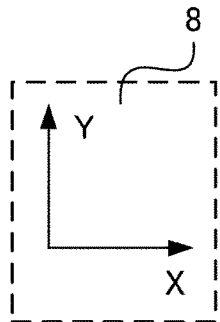

FIG. 50 EMBODIMENT EXAMPLE 7  RESIDUAL ASTIGMATISM
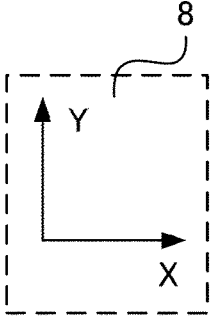

FIG. 51 EMBODIMENT EXAMPLE 7  AVERAGE CURVATURE
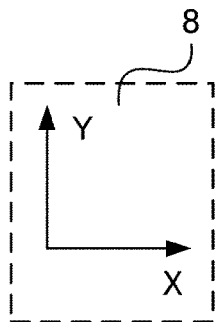

FIG. 52  EMBODIMENT EXAMPLE 7  NORMALIZED AVERAGE CURVATURE
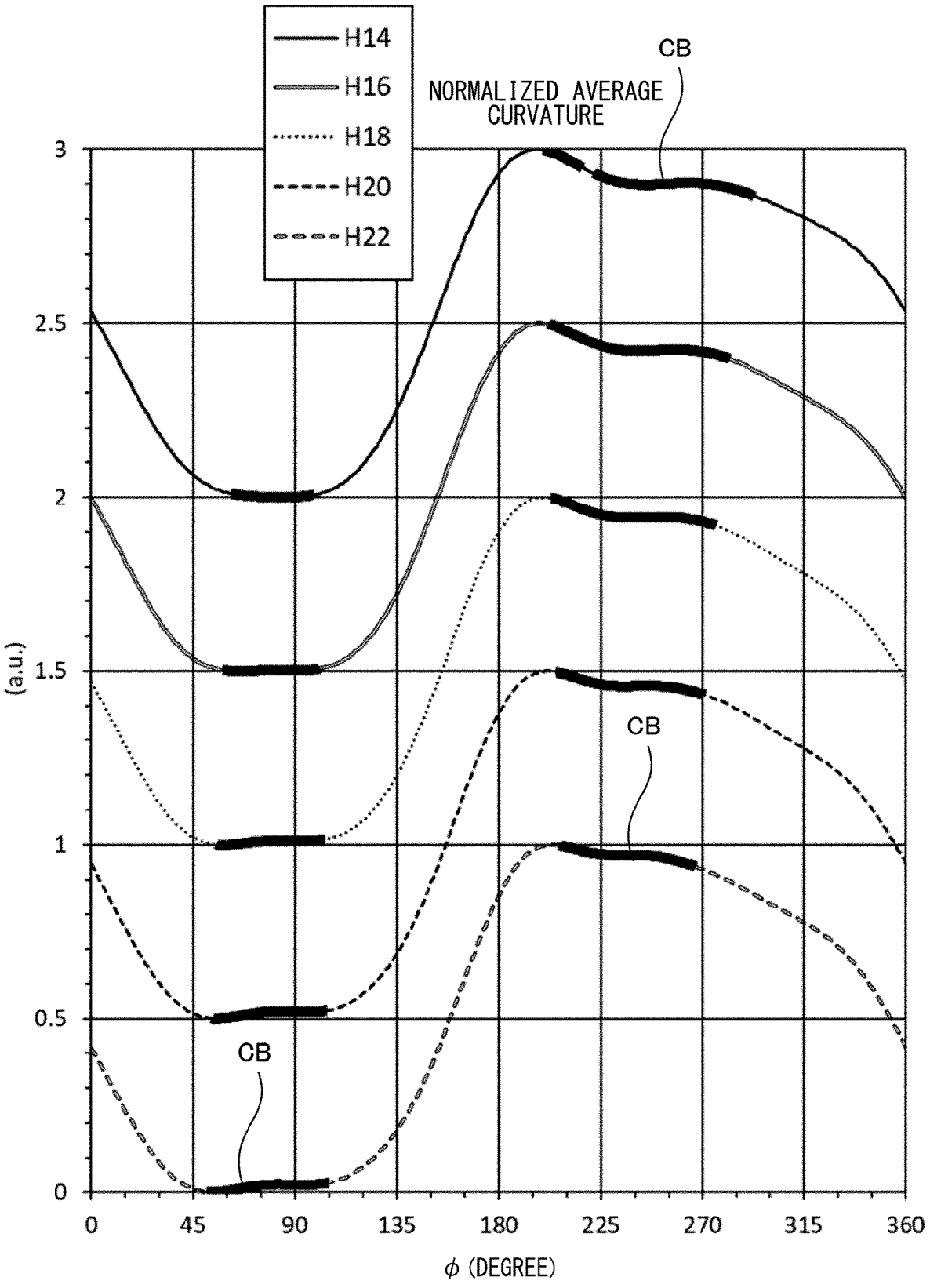

OPHTHALMIC LENS DESIGN METHOD, OPHTHALMIC LENS MANUFACTURING METHOD, OPHTHALMIC LENS, OPHTHALMIC LENS DESIGN DEVICE, OPHTHALMIC LENS ORDER RECEIVING/ORDERING SYSTEM, AND DESIGN PROGRAM

CROSS-REFERENCE TO RELATED APPLICATION

This is a Continuation Application of International Application No. PCT/JP2020/047280, filed on Dec. 17, 2020, which claims priority on Japanese Patent Application No. 2019-230891, filed on Dec. 20, 2019. The contents of the aforementioned applications are incorporated herein by reference.

BACKGROUND

Field of the Invention

The present invention relates to an ophthalmic lens design method, an ophthalmic lens manufacturing method, an ophthalmic lens, an ophthalmic lens design device, an ophthalmic lens order receiving/ordering system, and a design program.

Background

Technology for setting a plurality of regions on a lens surface of an ophthalmic lens and designing the ophthalmic lens on the basis of a distance viewed through each region has been reported (see Japanese Patent No. 5725646). It is desirable to provide an ophthalmic lens suitable for various situations when a wearer views a target object.

SUMMARY

According to a first aspect of the present invention, there is provided an ophthalmic lens design method including: acquiring first information about a purpose of an ophthalmic lens to be designed; acquiring second information about at least one of a visual line of a wearer of the ophthalmic lens for the purpose, a place, a use tool, and a body of the wearer; acquiring data indicating a number of first regions, positions, shapes, and sizes of a plurality of first regions set on a surface of the ophthalmic lens, and distances to a target viewed through the first regions based on the first information; setting a numerical value to be variably set among numerical values indicating the number of first regions, the positions, the shapes, and the sizes of the plurality of first regions, and the distances in the data based on the second information and setting the plurality of first regions and the distances on the surface of the ophthalmic lens; and setting a target aberration distribution of the ophthalmic lens based on the plurality of first regions and the distances that have been set.

According to a second aspect of the present invention, there is provided an ophthalmic lens manufacturing method including: manufacturing an ophthalmic lens designed by the ophthalmic lens design method according to the first aspect.

According to a third aspect of the present invention, there is provided an ophthalmic lens having a pair of refracting surfaces of an object-side surface formed on an object side and an eyeball-side surface formed on an eyeball side, wherein at least one of the object-side surface and the eyeball-side surface is an aspherical surface that is non-rotationally symmetric, wherein a fitting point set on the object-side surface is set as an origin, wherein a straight line parallel to a normal line of the object-side surface at a reference point for measuring prism power set on the object-side surface is set as a Z-axis and a direction from the object-side surface to the eyeball-side surface is set as a positive direction of the Z-axis, wherein, within a plane orthogonal to the Z-axis, an upward-downward direction when viewed from a wearer of the ophthalmic lens is set as a Y-axis, the upward direction is set as a positive direction of the Y-axis, and a left-right direction when viewed from the wearer is set as an X-axis, and the right direction is set as a positive direction of the X-axis, wherein the Z-axis is set as a rotation axis, an angle formed with respect to the X-axis is denoted by $\phi$ [°], a direction of rotation from the positive direction of the X-axis to the positive direction of the Y-axis is set as a positive direction, and a height along a radial direction from the Z-axis is denoted by h [mm], wherein a Z coordinate of a point at h and $\phi$ in the object-side surface is denoted by z1(h, $\phi$) and a Z coordinate of a point at h and $\phi$ in the eyeball-side surface is denoted by z2(h, $\phi$) when each of h and $\phi$ has a value corresponding to a position of any point on the object-side surface and average curvature of a synthetic sag surface at h and $\phi$ is denoted by C(h, $\phi$) when a virtual surface in which z3 obtained as z3(h, $\phi$)=z1(h, $\phi$)−z2(h, $\phi$) is set as a Z coordinate of a point at h and $\phi$ is defined as the synthetic sag surface, wherein, a maximum value of the average curvature C(h, $\phi$) of the synthetic sag surface is denoted by Cmax360(h) and a minimum thereof is denoted by Cmin360(h) when the angle $\phi$ changes in a range of a width of 360° from 0° to 360° at the height h and a maximum value of the average curvature C(h, $\phi$) of the synthetic sag surface is denoted by Cmax45(h, $\phi$1) and a minimum thereof is denoted by Cmin45(h, $\phi$1) when the angle $\phi$ changes in a range of a width of 45° from $\phi$=$\phi$1−22.5° to $\phi$=$\phi$1+22.5° centered on a specific angle $\phi$1 capable of having any value from 0° to 360° at the height h, wherein Cpp45(h, $\phi$1) and Cpp360(h) are set as values obtained from the following equations (C1) and (C2) of:

$$Cpp45(h,\phi1)=Cmax45(h,\phi1)-Cmin45(h,\phi1) \qquad \text{(C1) and}$$

$$Cpp360(h)=Cmax360(h)-Cmin360(h) \qquad \text{(C2)},$$

wherein, when an angle $\phi$1 satisfying a condition that Cpp360(h)×0.1 is greater than or equal to Cpp45(h, $\phi$1) is set as a corresponding reference angle $\phi$0 at at least one value of h greater than or equal to 14 mm and less than or equal to 22 mm, a plurality of corresponding reference angles $\phi$0 are present and corresponding reference angles $\phi$0 of at least one pair among the plurality of corresponding reference angles $\phi$0 are 450 or more apart from each other, wherein at least one of the plurality of corresponding reference angles $\phi$0 is a corresponding reference angle $\phi$0a included in a range of 5° to 175° and at least one of the plurality of corresponding reference angles $\phi$0 is a corresponding reference angle $\phi$0b included in a range of 185° to 355°, and wherein C(h, $\phi$0a) is different from C(h, $\phi$0b).

According to a fourth aspect of the present invention, there is provided an ophthalmic lens design device including: a first acquisition unit configured to acquire first information about a purpose of an ophthalmic lens to be designed and second information about at least one of a visual line of a wearer of the ophthalmic lens for the purpose, a place, a use tool, and a body of the wearer; a second acquisition unit configured to acquire data indicating a number of first regions, positions, shapes, and sizes of a plurality of first regions set on a surface of the ophthalmic lens, and distances to a target viewed through the first regions based on the first information; a region setting unit configured to set a numerical value to be variably set among numerical values indicating the number of first regions, the positions, the shapes, and the sizes of the plurality of first regions, and the distances in the data based on the second information and set the plurality of first regions and the distances on the surface of the ophthalmic lens; and a target aberration setting unit configured to set a target aberration distribution of the ophthalmic lens based on the plurality of first regions and the distances that have been set.

According to a fifth aspect of the present invention, there is provided an ophthalmic lens order receiving/ordering system including: the ophthalmic lens design device according to the fourth aspect; an ophthalmic lens ordering device including an input unit configured to receive inputs of the first information and the second information and a transmission unit configured to transmit the first information and the second information; and an ophthalmic lens order receiving device including a reception unit configured to receive the first information and the second information.

According to a sixth aspect of the present invention, there is provided a design program for causing a processing device to execute: a first acquisition process of acquiring first information about a purpose of an ophthalmic lens to be designed and second information about at least one of a visual line of a wearer of the ophthalmic lens for the purpose, a place, a use tool, and a body of the wearer; a second acquisition process of acquiring data indicating a number of first regions, positions, shapes, and sizes of a plurality of first regions set on a surface of the ophthalmic lens, and distances to a target viewed through the first regions based on the first information; a region setting process of setting a numerical value to be variably set among numerical values indicating the number of first regions, the positions, the shapes, and the sizes of the plurality of first regions, and the distances in the data based on the second information and setting the plurality of first regions and the distances on the surface of the ophthalmic lens; and a target aberration setting process of setting a target aberration distribution of the ophthalmic lens based on the plurality of first regions and the distances that have been set.

BRIEF DESCRIPTION OF THE DRAWINGS

FIG. 2 is a conceptual diagram showing an example of a distance distribution according to an embodiment.

FIG. 7 is a conceptual diagram showing an ordering screen.

FIG. 18 is a diagram showing an example of a distance distribution according to a modified example.

FIG. 20 is a conceptual diagram showing a position of an apparent optical axis of an ophthalmic lens according to a modified example.

FIG. 21 is a conceptual diagram showing a position of an apparent optical axis of an ophthalmic lens according to a modified example.

FIG. 22 is a diagram showing an example of a distance distribution according to a modified example.

FIG. 24 is a diagram showing residual refractive power of an ophthalmic lens according to Embodiment Example 1.

FIG. 25 is a diagram showing residual astigmatism of the ophthalmic lens according to Embodiment Example 1.

FIG. 26 is a diagram showing average curvature of the ophthalmic lens according to Embodiment Example 1.

FIG. 27 is a diagram showing residual refractive power of an ophthalmic lens according to a comparative example.

FIG. 28 is a diagram showing residual astigmatism of the ophthalmic lens according to the comparative example.

FIG. 29 is a diagram showing average curvature of the ophthalmic lens according to the comparative example.

FIG. 30 is a diagram showing residual refractive power of an ophthalmic lens according to Embodiment Example 2.

FIG. 31 is a diagram showing residual astigmatism of the ophthalmic lens according to Embodiment Example 2.

FIG. 32 is a diagram showing average curvature of the ophthalmic lens according to Embodiment Example 2.

FIG. 33 is a diagram showing residual refractive power of an ophthalmic lens according to Embodiment Example 3.

FIG. 34 is a diagram showing residual astigmatism of the ophthalmic lens according to Embodiment Example 3.

FIG. 35 is a diagram showing average curvature of the ophthalmic lens according to Embodiment Example 3.

FIG. 36 is a graph showing normalized average curvature of the ophthalmic lens according to Embodiment Example 3.

FIG. 37 is a diagram showing residual refractive power of an ophthalmic lens according to Embodiment Example 4.

FIG. 38 is a diagram showing residual astigmatism of the ophthalmic lens according to Embodiment Example 4.

FIG. 39 is a diagram showing average curvature of the ophthalmic lens according to Embodiment Example 4.

FIG. 40 is a graph showing normalized average curvature of the ophthalmic lens according to Embodiment Example 4.

FIG. 41 is a diagram showing residual refractive power of an ophthalmic lens according to Embodiment Example 5.

FIG. 42 is a diagram showing residual astigmatism of the ophthalmic lens according to Embodiment Example 5.

FIG. 43 is a diagram showing average curvature of the ophthalmic lens according to Embodiment Example 5.

FIG. 44 is a graph showing normalized average curvature of the ophthalmic lens according to Embodiment Example 5.

FIG. 45 is a diagram showing residual refractive power of an ophthalmic lens according to Embodiment Example 6.

FIG. 46 is a diagram showing residual astigmatism of the ophthalmic lens according to Embodiment Example 6.

FIG. 47 is a diagram showing average curvature of the ophthalmic lens according to Embodiment Example 6.

FIG. 48 is a graph showing normalized average curvature of the ophthalmic lens according to Embodiment Example 6.

FIG. 49 is a diagram showing residual refractive power of an ophthalmic lens according to Embodiment Example 7.

FIG. 50 is a diagram showing residual astigmatism of the ophthalmic lens according to Embodiment Example 7.

FIG. 51 is a diagram showing average curvature of the ophthalmic lens according to Embodiment Example 7.

FIG. 52 is a graph showing normalized average curvature of the ophthalmic lens according to Embodiment Example 7.

DESCRIPTION OF EMBODIMENTS

Figure 1:
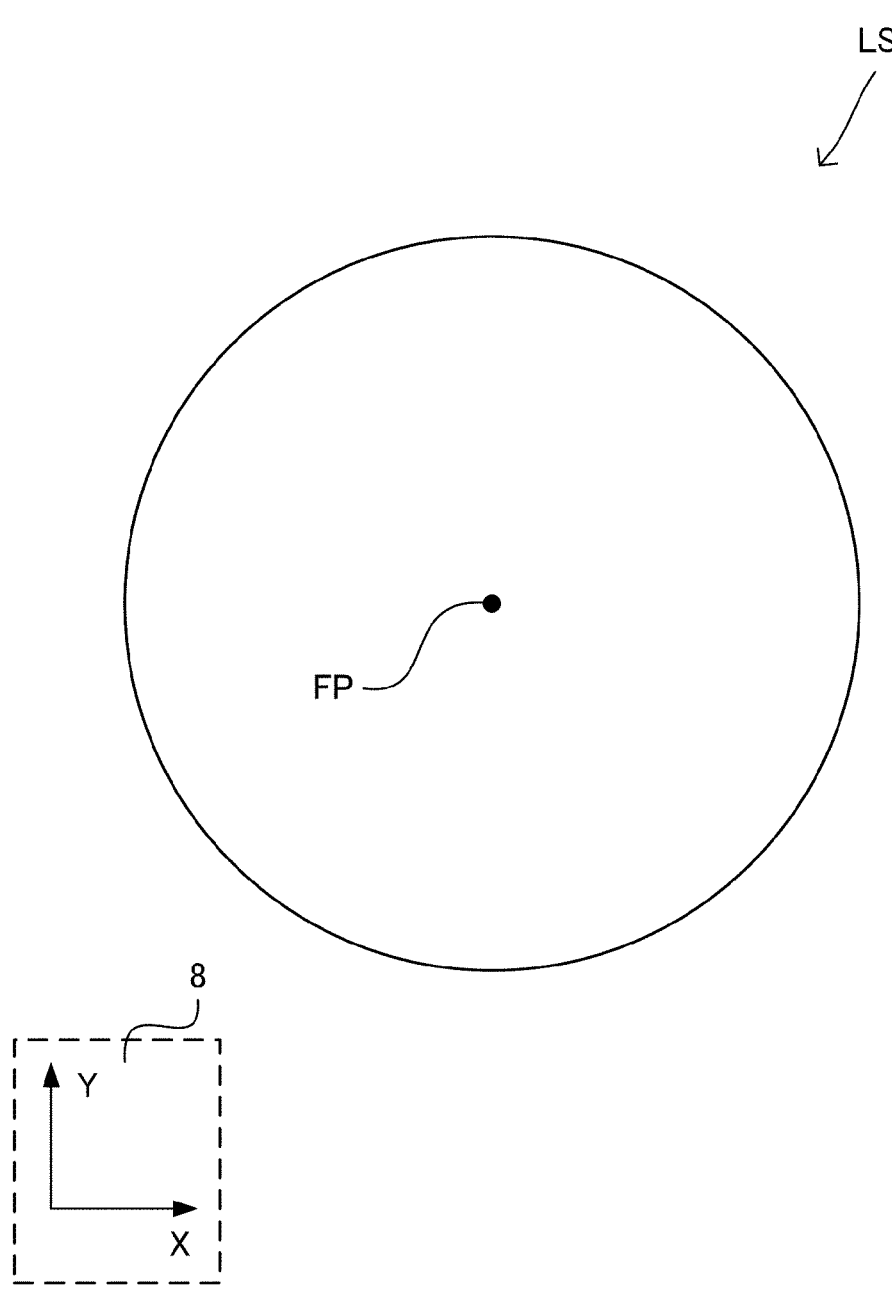
FIG. 1 is a conceptual diagram showing an ophthalmic lens according to an embodiment.

Hereinafter, an ophthalmic lens design method and the like of an embodiment will be described with reference to the drawings as appropriate. In the following description, it is assumed that the units of refractive power and astigmatism are represented by diopters (D) unless otherwise specified. Also, in the following description, when an "upper side," a "lower side," an "upper portion," a "lower portion" or the like of the ophthalmic lens is represented, it is based on a positional relationship of the lens when the ophthalmic lens is worn.

In the present description, when a light ray generated from a specific object point on an object side of the ophthalmic lens reaches an image formation position through the ophthalmic lens and through a rotation point (a rotation center) of an eyeball in a worn state assumed when the ophthalmic lens is designed, refractive power of this light ray affected by the ophthalmic lens is defined as refractive power when the ophthalmic lens is worn. This depends on a position of a point through which the light ray passes in the ophthalmic lens, i.e., a position of a point where the light ray is refracted on the object-side surface or the eyeball-side surface of the ophthalmic lens.

A value of the refractive power at the time of wearing is defined herein as follows. A distance from a specific object point on the object side to a passing point on the object-side surface of the ophthalmic lens along this light ray passing through the rotation point is denoted by Lo and a distance from a passing point on a reference spherical surface through which the light ray passes behind the ophthalmic lens to the image formation position is denoted by Li. Both of these are in units of meters (m). The sign of the distance Lo is positive. The sign of the distance Li is positive when the image formation position is on the eyeball side of the ophthalmic lens and is negative when the image formation position is on the object side of the ophthalmic lens. At this time, a sum of a reciprocal of the distance Lo and a reciprocal of the distance Li is set as the refractive power at the time of wearing and the unit is a diopter (D). Also, the reference spherical surface is a spherical surface centered on the rotation point of the eyeball through a posterior apex of the ophthalmic lens. As is well known, the image formation position in any cross section containing light rays depends on a direction of a cross section. Consequently, the distance Li depends on a direction of any cross section containing light rays. Therefore, the refractive power at the time of wearing depends on the direction of this cross section and there are maximum refractive power having a maximum value and minimum refractive power having a minimum value.

An arithmetic average of the maximum refractive power and the minimum refractive power is the average refractive power of the ophthalmic lens and an absolute value of a difference therebetween is set as the astigmatism of the ophthalmic lens. The presence of average refractive power and astigmatism in the ophthalmic lens helps to correct refractive power abnormalities in the wearer's eyes such as hyperopia, myopia, and astigmatism, and assists in eye adjustment such as presbyopia. In the following description, the "refractive power" is simply the average refractive power unless otherwise specified.

Values obtained by removing an amount for spherical power, cylindrical power, and an astigmatic axis angle determined by the wearer's prescription data and required to correct the wearer's eye aberration and make a complete correction from the refractive power of the ophthalmic lens and the astigmatism of the ophthalmic lens in consideration of Listing's law of eye movement are defined as the residual refractive power and the residual astigmatism, respectively. In the following description, when "aberration" is simply mentioned, it means both residual refractive power and residual astigmatism unless otherwise specified.

In the case of a single-focus ophthalmic lens, the presence of residual refractive power and residual astigmatism is usually not desired because the characteristics of the ophthalmic lens become erroneous with respect to the characteristics determined by prescription power. For example, when the residual astigmatism becomes large, an image viewed by the wearer of the ophthalmic lens through the ophthalmic lens is blurred due to the astigmatism. If there is residual refractive power, it may cause the eyes to use extra accommodation power and cause fatigue or may cause blurring due to an out-of-focus state. Consequently, an example of an ideal ophthalmic lens is an ophthalmic lens in which both the residual refractive power and the residual astigmatism are 0 D at all positions of the ophthalmic lens.

However, because it is impossible to independently control the refractive power and astigmatism at all positions of the ophthalmic lens in principle, it is difficult to design an ophthalmic lens in which both the residual refractive power and the residual astigmatism are 0 D at all positions.

Thus, the ophthalmic lens is designed by setting design target values appropriate for the residual refractive power and the residual astigmatism in consideration of the balance between the residual refractive power and the residual astigmatism such that the adverse effect on the wearing feeling of the ophthalmic lens is reduced and by setting the target values as the residual refractive power and the residual astigmatism. In the following description, the target aberration represents both the target residual refractive power and the target residual astigmatism, the target aberration distribution represents both the target residual refractive power distribution and the target residual astigmatism distribution, which will be described below, and target aberration distribution data represents data about both the target residual refractive power distribution and the target residual astigmatism distribution.

The balance between the residual refractive power and the residual astigmatism, or the balance between the target residual refractive power and the target residual astigmatism is referred to as an aberration balance, and quantitatively, for example, a ratio of the residual refractive power to the residual astigmatism or a ratio of the target residual refractive power to the target residual astigmatism can be expressed as a value between −∞ and +∞.

Quantitative notation of the aberration balance is also possible in addition to this, and can be used suitably. For example, the aberration balance can be expressed as a value of the square root of a sum of the square of the residual refractive power and the square of a value obtained by multiplying the residual astigmatism by a coefficient A or a value of the square root of a sum of the square of the target residual refractive power and the square of a value obtained by multiplying the target residual refractive power by the coefficient A. In the present description, these values are referred to as vision clarity or target vision clarity. Here, the coefficient A is 0.2 to 1.

The vision clarity is one of indices indicating a magnitude of an amount of blur experienced by the wearer and indicates that the amount of blur decreases as the vision clarity decreases. When the amount of blur is large, the human eye may try to reduce the amount of blur and try to focus the eye using excessive accommodation power, which may lead to eye fatigue. Thus, especially, an ophthalmic lens that is supposed to be used for a long time or the like may be designed with the goal of minimizing the vision clarity such that the wearer can use the ophthalmic lens with a relaxed and suitable wearing feeling.

The case of a progressive refractive power-specific ophthalmic lens such as an ophthalmic lens for both far and near visions has refractive power called an addition degree unlike the case of the above-described single-focus ophthalmic lens. The addition degree is used to intentionally set a larger positive value for the residual refractive power of the lower portion than for the residual refractive power of the upper portion by performing a design process of intentionally adding the target residual refractive power in a region of the lower side for near vision with respect to a region of the upper portion of the ophthalmic lens for far vision. This is associated with refractive power for assisting the accommodation power of the eye at the time of near vision.

A type of ophthalmic lens designed in the present embodiment is not particularly limited and may be a single-focus ophthalmic lens, a progressive refractive power-specific ophthalmic lens, or the like. The ophthalmic lens designed in the present embodiment is not particularly limited, but can be manufactured using a semi-finished lens. For example, a spherical surface is used for the object-side surface of the ophthalmic lens and this spherical surface is a surface having a fixed constant curve value in a predetermined power range defined by the base curve division. By designating the object-side surface of this semi-finished lens as reference, the eyeball-side surface to be processed is calculated and processed on the basis of prescription data of the wearer and the like. It is possible to process a complicated lens surface to which various corrections including limitation of astigmatism and the like are applied. Here, prescription data of the wearer can include at least one of far-vision power, near-vision power, astigmatism power, an astigmatic axis angle, addition power, and a prism.

Hereinafter, in the single-focus ophthalmic lens using a semi-finished lens, an example in which a shape of the eyeball-side surface of the lens is designed will be described. However, a method of designing the ophthalmic lens of the present embodiment is not limited to the following examples if the design is performed using distance distribution data to be described below.

FIG. 1 is a conceptual diagram showing an ophthalmic lens designed in an ophthalmic lens design method of the present embodiment. In the example of FIG. 1, an ophthalmic lens LS is a single-focus ophthalmic lens. The ophthalmic lens LS is in a state before the lens is processed according to a shape of an eyeglass frame (a state before a ball grinding process), and is formed in a circular shape in a plan view. An upper side of the ophthalmic lens LS in FIG. 1 is arranged on the upper portion at the time of wearing and a lower side thereof in FIG. 1 is arranged on the lower portion at the time of wearing. The ophthalmic lens LS has a fitting point FP (also referred to as an eyepoint). The fitting point FP is a reference point of a pupil when the wearer wears the ophthalmic lens LS and is a point where a visual line and a lens surface intersect when the wearer faces the front and takes a first eye position.

In the following embodiment, a left side when the wearer views the ophthalmic lens becomes a left side of the ophthalmic lens and a right side when the wearer views the ophthalmic lens becomes a right side of the ophthalmic lens. An X-axis is taken along a left-right direction, i.e., a horizontal direction, and the right side is a positive direction. A Y-axis is taken along an upward-downward direction, i.e., a vertical direction, and the upper side is a positive direction (see a coordinate system 8).

In the ophthalmic lens design method of the present embodiment, the design is performed using data indicating the number of regions and positions, shapes, and sizes of a plurality of regions set on a surface of the ophthalmic lens LS and a distance to a target to be viewed through each region. This data is referred to as distance distribution data, and the above region is referred to as a first region.

FIG. 2 is a conceptual diagram showing an example of a distance distribution represented by the distance distribution data. The distance distribution is a distribution of distances from a target expected to be viewed by the wearer to the ophthalmic lens LS through positions on the lens surface of the ophthalmic lens LS on the object side. Hereinafter, the lens surface on the object side is referred to as an object-side surface and the lens surface on the eyeball side is referred to as an eyeball-side surface. In the distance distribution data, the position on the object-side surface of the ophthalmic lens LS is represented by two-dimensional coordinates. In a distance distribution D1 of FIG. 2, the position on the object-side surface is shown in an XY orthogonal coordinate system with the fitting point FP as the origin. In the distance distribution data, the distance to the target viewed by the wearer through the ophthalmic lens LS at each position on the object-side surface is associated with XY coordinates. Hereinafter, this set distance is referred to as a set distance. In FIG. 2, a line Lx parallel to the X-axis and a line Ly parallel to the Y-axis passing through the fitting point FP are shown when the fitting point FP is designated as the origin of the XY Cartesian coordinate system. The same is also true for the drawings showing the following distance distributions.

Also, a configuration in which a position on the eyeball-side surface of the ophthalmic lens LS is associated with the set distance in the distance distribution data. Also, instead of the Cartesian coordinate system, a position on a lens surface through which a visual line from a rotation point of the eyeball passes may be indicated by a rotation angle.

Also, in the distance distribution data, the definition based on any method for use in the ophthalmic lens design method is used in the definition of the distance from the target expected to be viewed by the wearer to the ophthalmic lens LS. For example, there are a distance from the target to the object-side surface of the ophthalmic lens, a distance from the target to a reference spherical surface centered on a rotation point of the eyeball through a posterior apex of the ophthalmic lens, a distance from the target to the rotation point of the eyeball of the wearer of the ophthalmic lens, and the like. Although they are strictly different, they are substantially the same in practice and therefore they are not particularly distinguished below. Furthermore, it is sometimes referred to as the distance from the object to the eyeball more simply, but in this case, it is substantially the same distance in practice.

When a process of optimally designing the ophthalmic lens LS is performed using a light ray tracing method, the position of the object point at which the light ray is generated is decided on at an object-side position at a set distance set at a position on the object-side surface through which the light ray passes from the ophthalmic lens on the basis of the distance distribution data. At this time, the set distance set on the object-side surface can be expressed in any mathematical form. For example, each coordinate point in the distance distribution data can be represented as a large number of pieces of point cloud data discretely distributed in a grid pattern in the X and Y directions, and a design distance between the points can be linearly interpolated and set. Alternatively, the point cloud data may be interpolated by a spline using the point cloud data as control points or may be expressed in a method of performing an interpolation process using any mathematical formula representing a plane or a curved surface for each region.

A distance distribution shown in FIG. 2 is created according to a situation where the wearer plays golf, especially a situation where putting is performed. A distance distribution D1 includes first regions V1A, V1B, and V1C and second regions V2$h$, V2$i$, and V2$j$. Hereinafter, the first regions V1A, V1B, and V1C are referred to as a first region V1 when specific forms such as the first regions V1A, V1B, and V1C are indicated without distinction and the second regions V2$h$, V2$i$, and V2$j$ are referred to as a second region V2 when specific forms such as the second regions V2$h$, V2$i$, and V2$j$ are indicated without distinction.

In the distance distribution D1, positions of a plurality of first regions V1, particularly a position of the first region V1B, are set to be laterally asymmetric with respect to a vertical plane including a straight line passing through the fitting point FP of the ophthalmic lens LS and the design rotation point. The distance distribution D1 is a distance distribution for a right-handed wearer. In the distance distribution for the left-handed wearer, it is preferable to set a distance distribution in which the left and right sides of the distance distribution D1 are inverted with respect to a straight line Ly of the vertical direction passing through the fitting point FP.

The first region V1 is a region where the set distance is constant inside of each single first region V1. The set distance in the first region V1 is preferably set on the basis of the target object viewed by the wearer through the first region V1 in each purpose of the ophthalmic lens LS.

The first region V1A in FIG. 2 is arranged on the upper portion of the ophthalmic lens LS and is a region for far vision. For example, the wearer looks over the entire golf course from a teeing area to a cup and views far away when thinking about how to play. When playing golf and viewing far away, the wearer tends to stand up straight and view through the vicinity of the fitting point FP of the ophthalmic lens and a side thereabove. Accordingly, the first region V1A preferably includes the fitting point FP and preferably includes a region as wide as possible above the fitting point FP. The set distance of the first region V1A is set to correspond to 0 D such that the wearer can obtain the optimum performance of the ophthalmic lens when viewing to infinity.

The first region V1B in FIG. 2 is a region for gazing at the ball when trying to hit the ball or when swinging. Hereinafter, the act of positioning oneself to hit the ball in golf is referred to as addressing.

Figure 3:
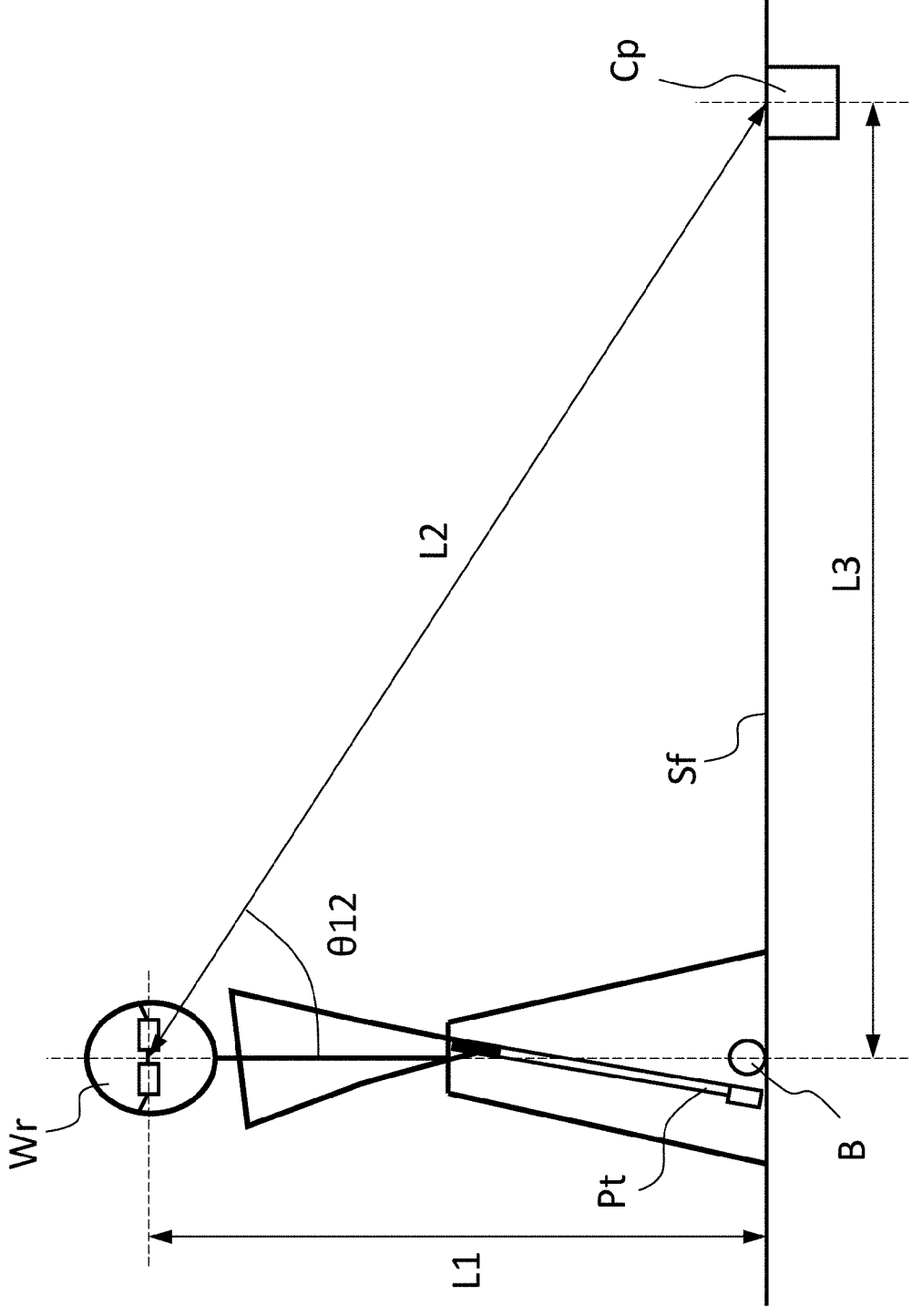
FIG. 3 is a conceptual diagram for describing the setting of distance distribution data.

FIG. 3 is a conceptual diagram for describing a situation of putting in golf. In putting, a wearer Wr performs an addressing process by holding a putter Pt and standing in the vicinity of a ball B after determining a hitting direction and strength by viewing a distance from the ball B to a cup Cp, an inclination on a green Sf, and a direction of the turf. The wearer Wr gazes at the ball B until he/she swings from the addressing and hits the ball B. Here, a distance between the eye of the wearer Wr and the ball B at the time of addressing or swing is defined as a first distance L1, a distance between the eye of the wearer Wr and the cup Cp is defined as a second distance L2, and a distance between the ball B and the cup Cp is defined as a third distance L3. Here, the eye may indicate exactly the center between the left and right eyes.

The position and shape of the first region V1B in FIG. 2 are set on the basis of the rotation angle of the eye of the wearer Wr at the time of the addressing or swing (hereinafter referred to as the addressing or the like), a range of the first region V1C to be described below, and the like. The first region V1B includes a position directly below the fitting point FP and a portion of the ophthalmic lens on the dominant arm side when viewed from the wearer Wr. The rotation angle at the time of addressing or the like can be calculated from an image when a plurality of golfers are performing addressing or the like. In one example of such statistical data, a downward rotation angle is in a range of −16 degrees to −33 degrees when an angle in the upward direction from the first eye position is positive and an angle in the downward direction from the first eye position is negative. Assuming that the ophthalmic lens LS is a thin parallel flat plate and a distance from the posterior apex of the ophthalmic lens LS to the center of rotation of the eyeball is 25 inn, this downward rotation angle corresponds to a range in which a Y coordinate is in a range of about −7 mm to −16 mm in the coordinate system of FIG. 2. Accordingly, preferably, the first region V1B is a position directly below the fitting point FP in the ophthalmic lens LS and includes a range of −7 mm to −16 mm in the Y coordinate. The upper limit of the first region V1B in the Y direction (a Y coordinate y4 in FIG. 2) is set such that the second region V2$i$ does not include the fitting point FP. From this point of view, for example, assuming that the width of the second region V2$i$ in the Y direction is 3 mm, the upper limit of the first region V1B in the Y direction is −3 mm.

The horizontal range of the first region V1B is preferably wide, but it is set on the basis of the range of the first region V1C.

The set distance of the first region V1B is preferably set to a first distance L1 (FIG. 3). Measuring the first distance L1 may be complicated. Accordingly, the set distance of the first region V1B is preferably calculated on the basis of the height of the wearer Wr and is preferably set to a length that is 85% to 90% of the height of the wearer Wr in terms of meters. For example, if the height of the wearer Wr is 1.7 m, the refractive power may be 0.66 D corresponding to 1.5 m, which is 88% of the height. Alternatively, the set distance of the first region V1B may be set on the basis of the length of the putter Pt possessed or used by the wearer Wr. In this case, it is more desirable to set the set distance of the first region V1B to a length that is 160% to 180% of a length of the putter Pt. In this case, even if the height of the wearer Wr is unknown, the set distance is set as described above from information about the length of the putter Pt, such that the set distance can be set in consideration of the habit of putting of the wearer Wr. For example, if the length of the putter Pt is 34 inches, the refractive power may be 0.68 D corresponding to 1.47 m, which is 170% of the length.

The distance distribution data is stored as a pattern in an ophthalmic lens order receiving device, a design device, or the like, in correspondence with the purpose of the ophthalmic lens LS. For example, in the distance distribution data associated with golf that is the purpose of the ophthalmic lens LS, the set distance of the first region V1B among the first regions V1 and the second regions V2 is variably set. In this case, in the store of the ophthalmic lens LS, the set distance of the first region V1B is set on the basis of a numerical value of the height of the wearer Wr obtained from the wearer Wr. For numerical values that are not set variably other than the set distance of the first region V1B, preset numerical values can be used. In this way, the distance distribution data is provided as a pattern associated with the purpose of the ophthalmic lens LS and some of the numerical values relating to the first regions V1 and the second regions V2 are variable and are set such that there is room for adjustment to some extent according to the wearer Wr for each pattern. Hereinafter, a variably set numerical value is referred to as a variable value and a numerical value that is not set variably is appropriately referred to as a fixed value. As an example, in the example of FIG. 2, x1 of −7 mm, x2 of −4 mm, y1 of 6 mm, y2 of 3 mm, y3 of −4 mm, and y4 of −7 mm can be set as fixed values on the basis of the Japanese average height of 1.7 m.

Also, when the numerical value is set to be variable, a configuration in which the numerical value is appropriately selected from a plurality of preset numerical values or a preset numerical value range may be adopted.

At least one selected from the number of first regions V1 and a position, a shape, a size, and a set distance of the first region V1 can be set to a variable value. At least one selected from the number of second regions V2 and a position, a shape, a size, and a set distance of the second region V2 may be set to a variable value. For example, in the example of FIG. 2, at least one of the X coordinate x1 at the left end and the X coordinate x2 at the right end of the second region V2j, the Y coordinate y1 at the upper end and the Y coordinate y2 at the lower end of the second region V2h, and the Y coordinate y3 at the upper end and the Y coordinate y4 at the lower end of the second region V2i can be set to a variable value.

The first region V1C is a region for viewing a target object determined in a direction in which the wearer Wr hits the ball B at the time of putting. The target object defined in the direction in which the ball B is hit is the center of the cup Cp if the putting line is a straight line that does not bend or a mark such as, for example, dead grass on a straight line connecting the ball B and the cup Cp. If the putting line is a line (a hook line or a slice line) that bends to the left or right, it is a mark defined at any place on the straight line in the direction in which the ball B is hit. These target objects can be arbitrarily determined by the wearer Wr. Hereinafter, it is assumed that the center of the cup Cp is determined to be the target object. A horizontal range of the first region V1C is set as follows. For example, the wearer Wr having the Japanese average height of 1.7 m slightly leans forward at the time of putting and it is assumed that the cup Cp is at a distance of 3 m (a second distance L2) from the eye of the wearer Wr when the distance from the eye to the ball B becomes 1.5 m. At that time, a distance from the ball B to the cup Cp (the third distance L3) is about 2.6 m. In this situation, the direction of the cup Cp as viewed from the right-handed wearer Wr is at about 55 degrees (θ12 of FIG. 3) to the left in a direction in which the ball B is viewed at the feet in the plane including the wearer's eyes, the cup Cp, and the ball B. Accordingly, the wearer Wr views the target object determined in the direction in which the ball B is hit toward the left in coordination with the head and eyes. It is assumed that a ratio of angles to the left of the head and the eye varies greatly from person to person, but it seems that the posture of the correct addressing cannot be maintained if the person tries to turn to the left by 55 degrees only by rotating the head. Therefore, the assistance of the rotation of the eyeball by the rotation of the head is performed until a range of an effective visual field is reached at the maximum. The effective visual field is a range in which information can be instantly received according to gazing only in eye movements and a range of up to 15 degrees on one side in the horizontal direction. Assuming that the ophthalmic lens LS is a thin parallel flat plate and the distance from the posterior apex of the ophthalmic lens LS to the center of rotation of the eyeball is 25 mm, the angle of 15 degrees to the left in the horizontal direction corresponds to an X coordinate of about −7 mm in the coordinate system of FIG. 2. Consequently, preferably, the X coordinate (x1) at the right end of the first region V1C is at a position of X=−7 mm or on the left of the position.

The vertical range of the first region V1C is set as follows. When a target object determined in the direction in which the ball B is hit is viewed at the time of putting, the target object is viewed by rotating the eyeball downward while taking a forward-leaning posture. An angle of downward rotation is at most in about the same range as when the ball B is viewed through the first region V1B. Although the target object determined in the direction in which the ball B is hit through the first region V1C, it is desirable that the vertical range of the first region V1C be wide under the assumption that the target object is determined at a position far away from the ball due to a long-distance putt. Accordingly, preferably, the Y coordinate (y2) at the upper end of the first region V1C is in a range from Y=about 0 mm, which is the height of the fitting point FP at minimum, to Y=about 4 mm corresponding to 8 degrees, which is an angle on the upper side of the effective visual field at maximum.

The set distance of the first region V1C can be set to a distance that is frequently used when a target object determined in the direction in which the ball B is hit is viewed. A salesperson of an optician or the like may hear the distance of putting to be emphasized from the wearer Wr and perform a setting process on the basis of the distance. The refractive power for the set distance of the first region V1C, which is frequently used, is 0.55 D to 0.14 D for general users, 0.63 D to 0.3 D for beginners, and 0.4 D to 0.1 D for users from intermediate to advanced users. As more preferable representative values, 0.3 D for general users, 0.52 D for beginners, and 0.19 D for users from intermediate to advanced users are set. For these, the first distance L1 (FIG. 3) is set to 1.5 m and the distance from the ball B to the cup Cp corresponds to an assumed distance of 1 m to 7 m for general users, a distance of 0.5 m to 3 m for beginners, and a distance of 2 m to 10 m for users from intermediate to advanced users. The more preferable representative value corresponds to 3 in, which is frequently used for general users, 1.2 m for beginners, which is suitable for putting practice, and 5 m, which is slightly longer for users from intermediate to advanced players.

The second region V2 is arranged between a plurality of first regions V1 in which different set distances are set and the set distances of these first regions V1 are continuously connected. The second region V2h is a region arranged between the first region V1A and the first region V1C. The second region V2i is a region arranged between the first region V1A and the first region V1B. The second region V2j is a region arranged between the first region V1C and the first region V1A and the first region V1B.

In the second region V2h, the set distance changes linearly along the Y-axis direction in units of diopters and the set distance of the first region V1A and the set distance of the first region V1C are connected. In the second region V2i, the set distance changes linearly along the Y-axis direction in units of diopters and the set distance of the first region V1A and the set distance of the first region V1B are connected. In the second region V2j, the set distance changes linearly along the X-axis direction in units of diopters, the set distance of the first region V1C and the set distance of X=x2 of the first region V1A, the first region V1B, and the second region V2i are connected, and the set distance on X=x1 of the second region V2h and the set distance of the first region V1A are connected.

Because the second region V2 is a region where the set distance changes in this way, it may be expressed using a spline function. When it is expressed using a spline function in combination with the first region V1 and the second region V2, because the expression is possible such that the set distance changes continuously and smoothly, the change in refractive power depending on a refraction position may be convenient for designing the smooth ophthalmic lens LS.

Figure 4:
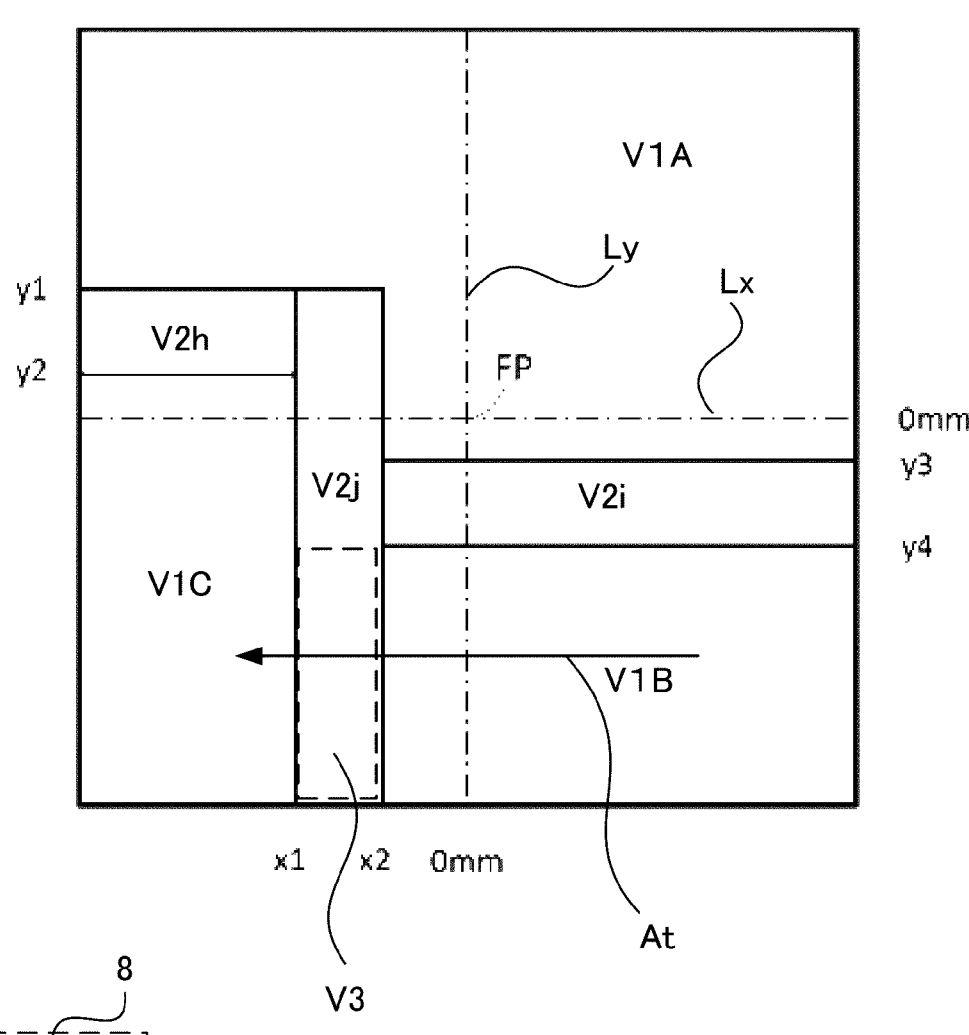
FIG. 4 is a conceptual diagram for describing a third region.

FIG. 4 is a conceptual diagram showing the third region V3. When the set distance of the second region V2j is set as described above, the set distance is changed in the X-axis direction in the third region V3 that is inside of the second region V2j and is between the first region V1B and the second region V1C. This third region V3 is a region through which the visual line for viewing the ball B passes when the putted ball B heads for the cup Cp. Accordingly, the trajectory of the visual line that is frequently used in the third region V3 is a trajectory along the X-axis direction. This trajectory is schematically shown by an arrow At. In the third region V3, the change in the set distance along the Y-axis direction is smaller than the change in the set distance along the X-axis direction, such that when the visual line passes in the X-axis direction, the distortion of the ball B or the like that is a target to be viewed becomes small. It is preferable that there be no change or substantially no change in the set distance in a direction orthogonal to a movement direction of the most frequent visual line passing through the third region V3.

Although it is preferable to set the set distance in the third region V3 as described above, a method of setting the set distance in the second region V2 is not particularly limited as long as set distances between the first regions V1 are continuously connected. For example, in addition to a case where the distance changes linearly in units of diopters as described above, the distance in units of diopters may change smoothly in a non-linear manner.

The fixed value in the distance distribution data can use statistical values or values obtained by machine learning with respect to at least one of a visual line of the wearer Wr for the purpose of the ophthalmic lens LS, a place, a use tool, and a body of the wearer Wr in addition to values set under the assumption of the purpose of the ophthalmic lens LS as described above. Such machine learning can be performed by collecting images on the Internet, and it is particularly preferable to perform learning using images of advanced golfers. Also, the fixed value may be set on the basis of the characteristics of movements or postures and the like when a famous golfer plays golf.

Variable values in the distance distribution data can be set on the basis of information about at least one of a visual line, a place, and a use tool of the wearer Wr for the purpose of the ophthalmic lens LS, and a body of the wearer Wr. Hereinafter, this information about the wearer Wr is referred to as wearer information. Here, the above-described place includes, for example, the distance between the cup Cp at the time of putting or the target object determined in the direction in which the ball B is hit and the wearer Wr. The above-described use tool includes, for example, the putter Pt possessed or used by the wearer Wr. The wearer information includes at least one piece of information about the height of the wearer Wr described above, the posture of the wearer Wr when the wearer Wr takes action for the purpose of golf or the like, a position or a range of the ophthalmic lens LS through which the visual line of the wearer Wr passes, and a position of the wearer Wr or a visual target. Information about the posture of the wearer Wr includes extends such as a distance between the eye of the wearer Wr and the ball B at the addressing of golf, a rotation angle of a head when the cup Cp or the target object determined in the direction in which the ball B is hit at the time of putting is viewed, a distance to the ball B to be emphasized at the time of putting, a width of a part of the ophthalmic lens used when the target object determined in the direction in which the ball B is hit is viewed, and the like. If the wearer information cannot be obtained, statistical values or values obtained by machine learning and the like can be used as described above.

It is preferable to use the same distance distribution data for the left eye lens and the right eye lens in the ophthalmic lens LS. Accordingly, in the distance distribution D1, in the case of right-handedness, the first region V1C for viewing the ball B, the cup Cp, or the target object determined in the direction in which the ball B is hit as described above is set on the left side when viewed from the wearer Wr of the left eye lens and the right eye lens. In the distance distribution D1, in the case of left-handedness, a first region V1C for viewing the ball B, the cup Cp, or the target object determined in the direction in which the ball B is hit as described above is set on the right side when viewed from the wearer Wr of the left eye lens and the right eye lens.

After each numerical value of the distance distribution data is set, target aberration distribution data indicating the target aberration distribution of the ophthalmic lens LS is generated on the basis of the set distances set in the first region V1 and the second region V2 of the distance distribution data and a predetermined aberration balance. In the target aberration distribution data, each position in the ophthalmic lens LS is associated with the target aberration, i.e., the target residual refractive power and the target residual astigmatism at the position. The method of generating the target aberration distribution data is not particularly limited and a known method or the like can be used.

The aberration balance is a value set for each position or each part of the ophthalmic lens LS and represents a target value of a relative magnitude of the other of the residual refractive power and the residual astigmatism to one of the residual refractive power and the residual astigmatism with respect to the residual refractive power and the residual astigmatism at the position or part. Consequently, the aberration balance is represented by, for example, a ratio of the target residual refractive power and the target residual astigmatism.

For example, the aberration balance can be set to have a rotationally symmetric distribution centered on a straight line passing through the fitting point FP and the design rotation point, regardless of the set distance. Alternatively, the aberration balance can be set to have a rotationally symmetric distribution centered on a straight line passing through the fitting point FP and the design rotation point on the basis of an appropriately set distance for each region of the first region V1 or the second region V2.

If the target aberration distribution data is obtained, the distance distribution data and the target aberration distribution data are converted into a coordinate system for performing a light ray tracing process and an optimized design process using light ray tracing is performed for the ophthalmic lens LS. In the optimized design process, the residual refractive power and the residual astigmatism in the ophthalmic lens LS are calculated by light ray tracing and it is determined whether the calculated residual refractive power and residual astigmatism and the like are within a predetermined range from the target value. When the residual refractive power, the residual astigmatism, and the like that have been calculated are not within the predetermined range, the shape of the ophthalmic lens LS is changed and the light ray tracing and determination are performed again. When the calculated residual refractive power and residual astigmatism and the like are within the predetermined range, the design of the ophthalmic lens LS is completed.

The ophthalmic lens order receiving/ordering system relating to the design of ophthalmic lenses will be described. The ophthalmic lens LS according to the present embodiment is preferably provided by the ophthalmic lens order receiving/ordering system to be described below.

Figure 5:
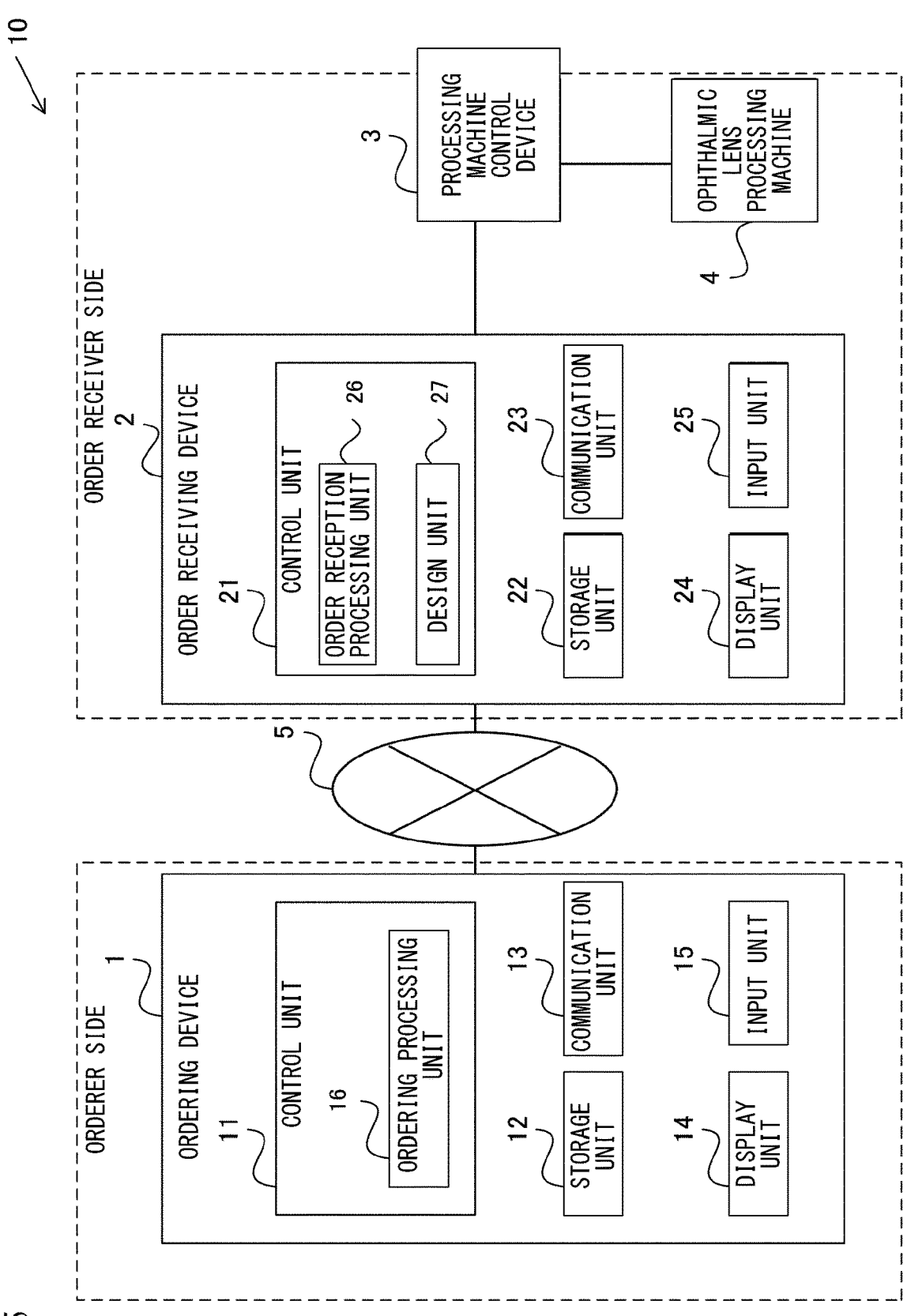
FIG. 5 is a conceptual diagram showing an ophthalmic lens order receiving/ordering system according to an embodiment.

FIG. 5 is a diagram showing a configuration of the ophthalmic lens order receiving/ordering system 10 according to the present embodiment. The ophthalmic lens order receiving/ordering system 10 is configured to include an ordering device 1 installed in an optician store on the ordering side and an order receiving device 2, a processing machine control device 3, and an ophthalmic lens processing machine 4 installed by a lens manufacturer on the order receiving side. The ordering device 1 and the order receiving device 2 are communicatively connected to each other via a network 5 such as the Internet. Also, the processing machine control device 3 is communicatively connected to the order receiving device 2 and the ophthalmic lens processing machine 4 is communicatively connected to the processing machine control device 3.

Although, only one ordering device 1 is shown for convenience of illustration in FIG. 5, a plurality of ordering devices 1 installed in a plurality of optician stores are connected to the order receiving device 2 in reality.

The ordering device 1 is a computer for ordering the ophthalmic lens LS, and includes a control unit 11, a storage unit 12, a communication unit 13, a display unit 14, and an input unit 15. The control unit 11 controls the ordering device 1 by executing a program stored in the storage unit 12. The control unit 11 includes an ordering processing unit

16 that performs an ordering process for the ophthalmic lens LS. The communication unit 13 communicates with the order receiving device 2 via the network 5. The display unit 14 is, for example, a display device such as a liquid crystal monitor, and displays an ordering screen or the like for inputting information (ordering information) of the ophthalmic lens to be ordered. The input unit 15 includes, for example, a mouse, a keyboard, and the like. For example, ordering information according to content of an ordering screen is input via the input unit 15.

The display unit 14 and the input unit 15 may be integrally configured by a touch panel or the like.

The order receiving device 2 is a computer that performs an order receiving process, a design process, and the like for the ophthalmic lens and includes a control unit 21, a storage unit 22, a communication unit 23, a display unit 24, and an input unit 25. The control unit 21 controls the order receiving device 2 by executing a program stored in the storage unit 22. The control unit 21 includes an order processing unit 26 that performs the order receiving process for the ophthalmic lens LS, and a design unit 27 that performs the design process for the ophthalmic lens LS. The communication unit 23 communicates with the ordering device 1 via the network 5 and communicates with the processing machine control device 3. The storage unit 22 stores various types of data for designing the ophthalmic lens such that the data is readable. The display unit 24 is a display device such as a liquid crystal monitor and displays a result of designing an ophthalmic lens or the like. The input unit 25 is configured to include, for example, a mouse, a keyboard, and the like.

Also, the display unit 24 and the input unit 25 may be integrally configured by a touch panel or the like.

Figure 6:
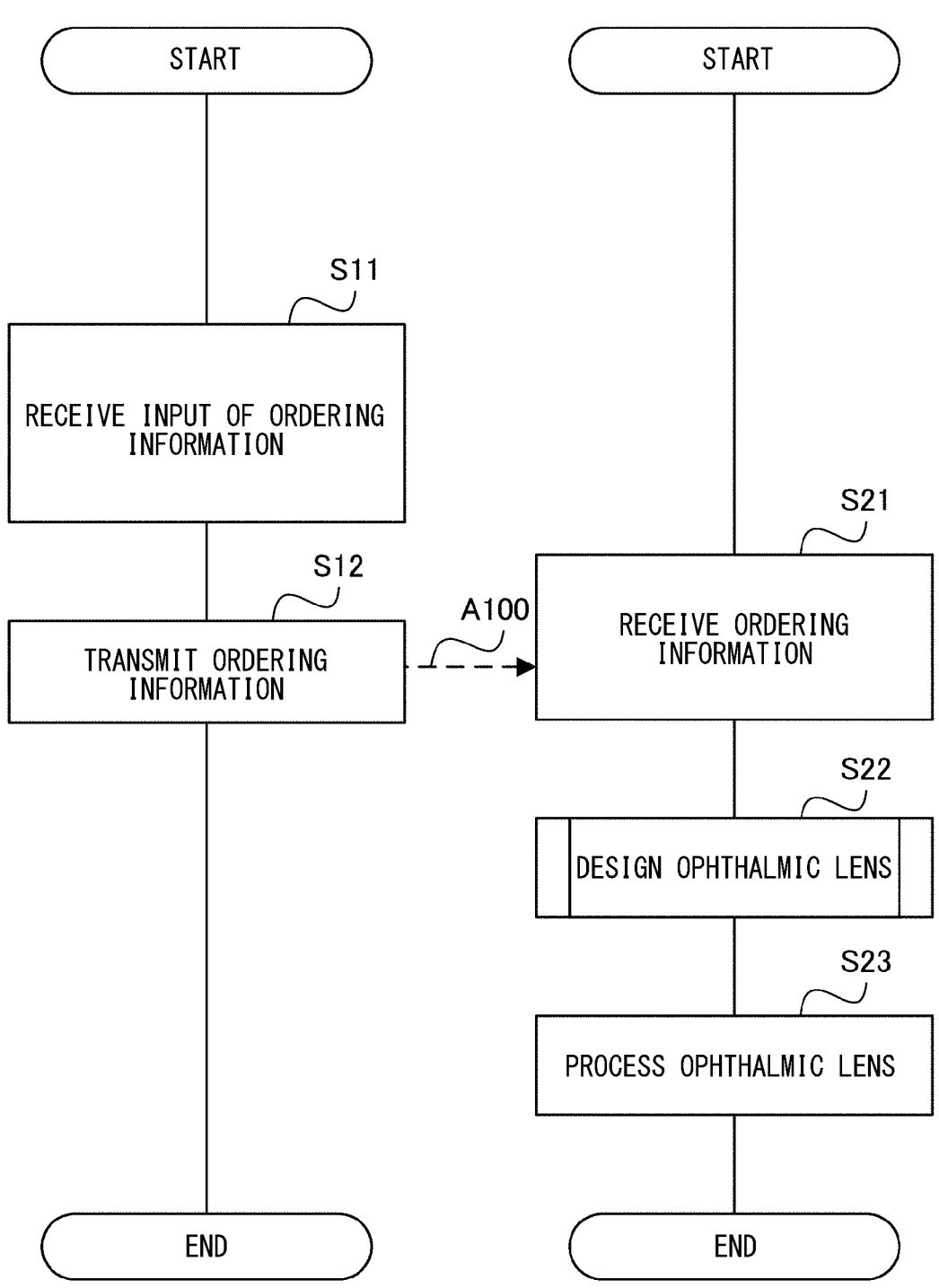
FIG. 6 is a flowchart showing a flow of a process of providing an ophthalmic lens according to an embodiment.

Next, a procedure for providing the ophthalmic lens LS in the ophthalmic lens order receiving/ordering system 10 will be described with reference to the flowchart shown in FIG. 6. The left side of FIG. 6 shows a procedure performed by an orderer, and the right side of FIG. 6 shows a procedure performed by an order receiver. In an ophthalmic lens manufacturing method for use in the ophthalmic lens order receiving/ordering system 10, the ophthalmic lens LS designed on the basis of the above-described ophthalmic lens design method is designed and manufactured.

In step S11, the ordering device 1 receives an input of ordering information. The ordering information is information about the ophthalmic lens LS to be ordered, which is input on the ordering screen to be described below, and the ordering information includes purpose information which is information about the purpose of the ophthalmic lens LS and wearer information. For example, in an ophthalmic lens store, a salesperson hears the purpose of the ophthalmic lens and the height of the wearer Wr from the wearer Wr. The orderer such as the salesperson causes the display unit 14 of the ordering device 1 to display the ordering screen, and inputs the ordering information via the input unit 15.

When the salesperson of the optician store inputs the purpose information and a grade to the ordering device 1, a configuration in which an input screen of a variable value to be set in the distance distribution D1 is displayed and the salesperson inputs the variable value to the input screen after the variable value to be set is obtained from the wearer Wr may be adopted.

FIG. 7 is a diagram showing an example of an ordering screen 100. In a lens information item 101, items related to a product name of the lens to be ordered, spherical power (S power), astigmatism power (C power), an astigmatism axis angle (an axis angle), and ordered lens power such as an addition degree are input. A processing designation information item 102 is used when an outer diameter of the lens to be ordered is designated or when any point thickness is designated. A dyeing information item 103 is used when the color of the lens is designated. In a fitting point (FP) information item 104, position information of the eyes of the wearer Wr such as a pupillary distance (PD) representing an interpupillary distance is input. In a frame information item 105, a frame model name, a frame type, and the like are input.

In an additional information item 106, purpose information, grade information, and wearer information are input. In the example of FIG. 7, "golf" is input as the purpose information. The grade information is information about the grade of the ophthalmic lens LS and indicates that the performance of the ophthalmic lens becomes higher when the grade becomes higher. The additional information item 106 can include information about the grade of the ophthalmic lens LS as shown in FIG. 7, but is omitted if the ophthalmic lens LS has only one grade. It is preferable to adopt a configuration in which distance distribution data having more variable values is used when the grade of the ophthalmic lens LS becomes higher. When the number of variable values is larger, more detailed wearer information can be used and the ophthalmic lens LS more suitable for the wearer Wr can be provided. In the example of FIG. 7, the grade of the ophthalmic lens LS is not as high as "1," and the variable value is only the set distance of the first region V1B. The set distance of the first region V1B is set as described above on the basis of a height value input in the additional information item 106.

In the additional information item 106, item names and the number of items associated with input items of the wearer information are appropriately changed on the basis of the purpose information and the grade information that have been input. For example, in another example of FIG. 7, when the purpose information of "golf" and the grade information of "2" larger than "1" have been input, an item for inputting a putting distance is displayed in addition to the height as an input item of the wearer information. In this case, there are two variable values such as the set distance of the first region V1B and the set distance of the first region V1C and the set distance of the first region V1C is set on the basis of the input value of the height and the input value of the putting distance. In this way, the control unit 11 controls the display unit 14 such that the display element of the ordering screen 100 for inputting the wearer information changes on the basis of the purpose information or the grade information input via the input unit 15.

When the orderer inputs each item of the ordering screen 100 and clicks a send button (not shown), the ordering processing unit 16 of the ordering device 1 acquires ordering information. When step S11 is completed, step S12 (FIG. 6) is started.

In addition to the above-described items, various information such as information about the accommodation power for the wearer Wr or the like can be added to the ordering screen 100.

In step S12, the ordering device 1 transmits the ordering information to the order receiving device 2 via the communication unit 13. In FIG. 6, a point at which the ordering information is transmitted from the ordering device 1 to the order receiving device 2 is schematically indicated by an arrow A100. When step S12 is completed, step S21 is started.

In the ordering device 1, the control unit 11 of the ordering device 1 performs a process of displaying the ordering screen 100, a process of acquiring ordering information input to the ordering screen 100, and a process of transmitting the ordering information to the order receiving device 2 when a predetermined program pre-installed in the storage unit 12 is read into a memory or the like and is executed.

In step S21, the order processing unit 26 of the order receiving device 2 receives ordering information from the ordering device 1 via the communication unit 23. When step S21 is completed, step S22 is started.

In step S22, the design unit 27 of the order receiving device 2 designs the ophthalmic lens LS on the basis of the received ordering information.

Figure 8:
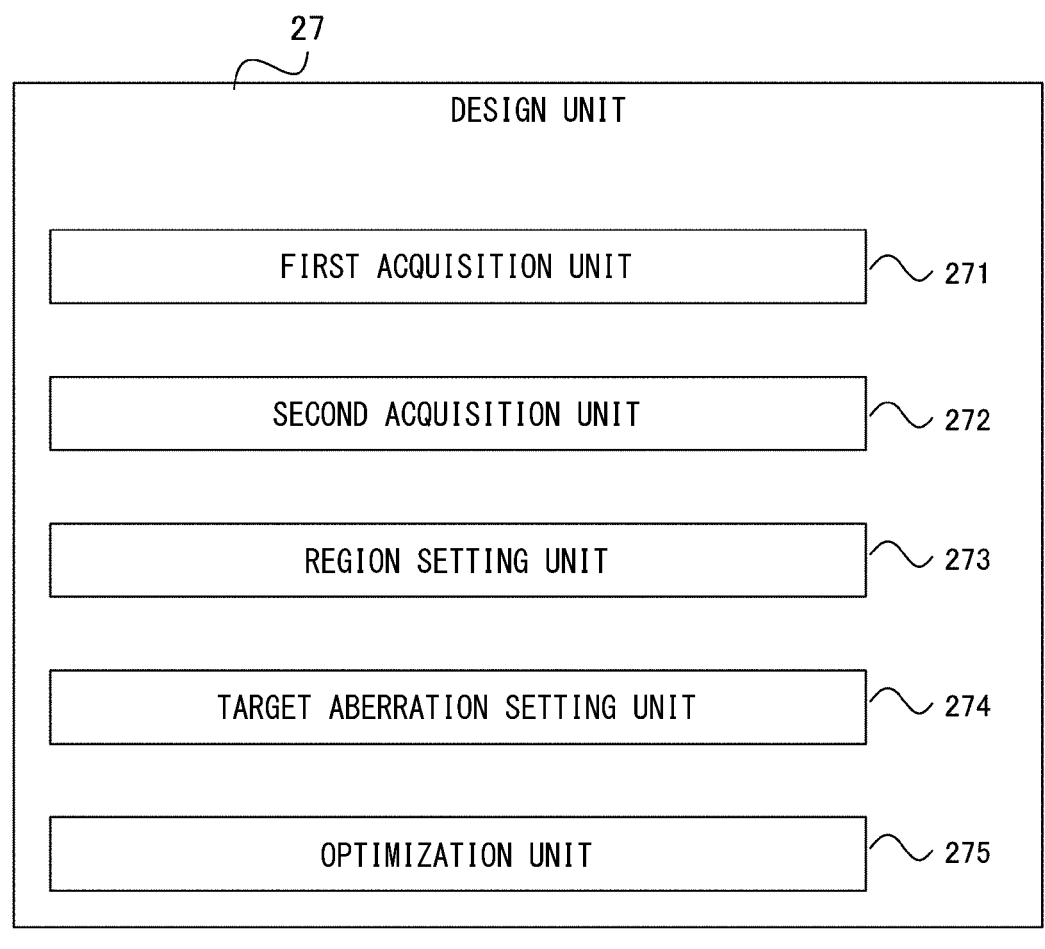
FIG. 8 is a conceptual diagram showing a configuration of a design unit.

FIG. 8 is a conceptual diagram showing a configuration of the design unit 27. The design unit 27 includes a first acquisition unit 271, a second acquisition unit 272, a region setting unit 273, a target aberration setting unit 274, and an optimization unit 275.

Figure 9:
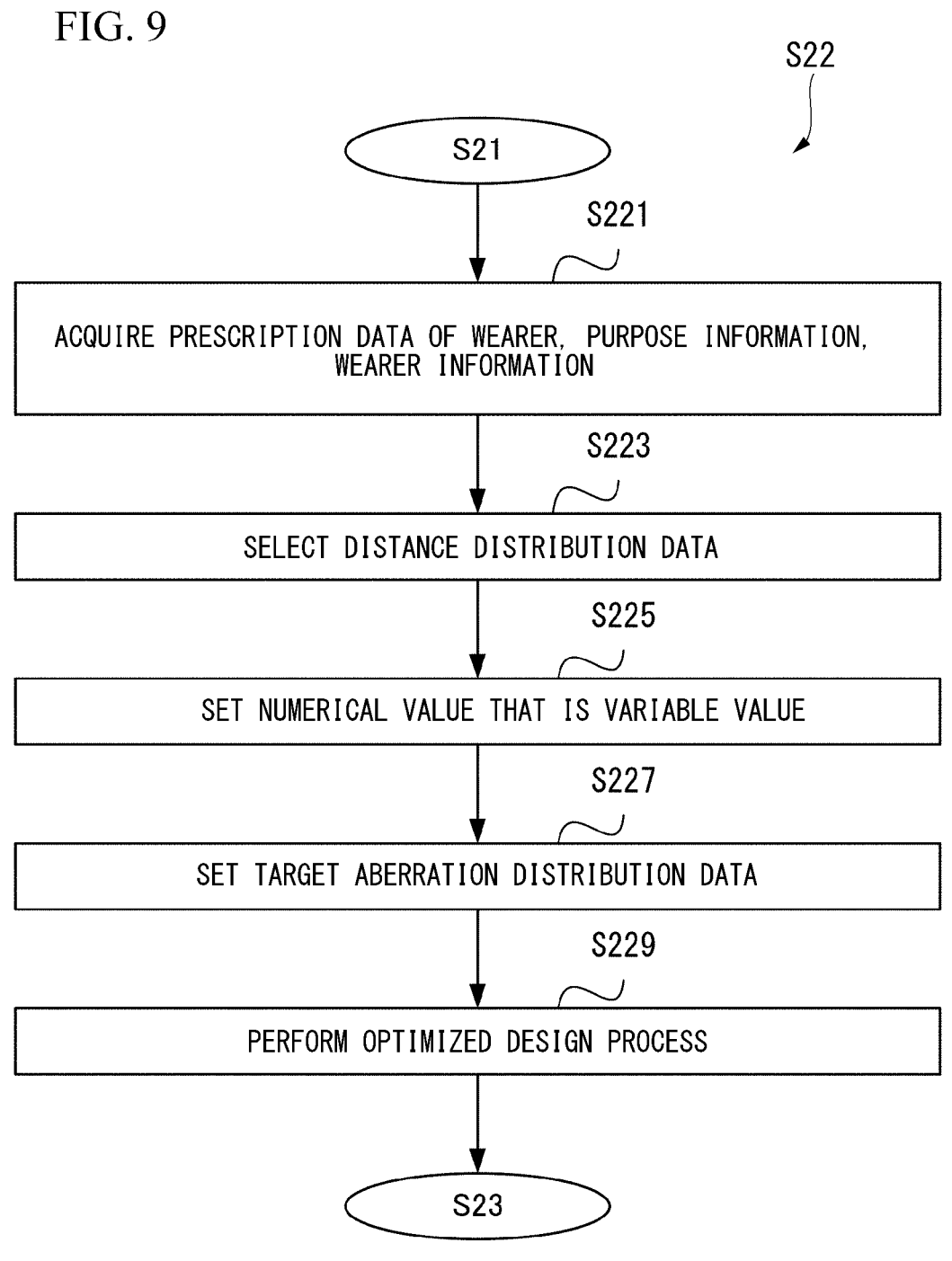
FIG. 9 is a flowchart showing a flow of an ophthalmic lens design method according to an embodiment.

FIG. 9 is a flowchart showing a flow of step S22 of the flowchart of FIG. 6. In step S221, the first acquisition unit 271 of the design unit 27 acquires prescription data, purpose information, and wearer information of the wearer Wr. The first acquisition unit 271 causes the memory, the storage unit 22 of the order receiving device 2, or the like to store the prescription data, the purpose information, and the wearer information in the received order information such that they can be referred to. When step S221 is completed, step S223 is started.

In step S223, the second acquisition unit 272 of the design unit 27 acquires distance distribution data. The second acquisition unit 272 selects distance distribution data of a pattern associated with the purpose from the distance distribution data of a plurality of different patterns stored in advance in the storage unit 22 or the like on the basis of the purpose information. For example, in the case of the example of FIG. 7, distance distribution data of grade 1 associated with golf is selected. When step S223 is completed, step S225 is started. In step S225, the region setting unit 273 of the design unit 27 sets numerical values that are variable values of the first region V1, the second region V2, and their set distances in the distance distribution data on the basis of the wearer information. In the case of the example of FIG. 7, the region setting unit 273 sets the set distance of the first region V1B on the basis of a height value of the wearer Wr. When step S225 is completed, step S227 is started.

In step S227, the target aberration setting unit 274 of the design unit 27 sets target aberration distribution data on the basis of the set first region V1, the set distance, and the like. When step S227 is completed, step S229 is started. In step S229, the optimization unit 275 of the design unit 27 performs an optimized design process for the ophthalmic lens LS. In this optimized design process, after the shape of the ophthalmic lens LS is designed, a value indicating how much design conditions such as residual refractive power and residual astigmatism are satisfied is calculated and the ophthalmic lens LS is appropriately redesigned such that the value becomes an optimum value. When the design data of the shape of the ophthalmic lens satisfying a certain preset standard is obtained, the design of the ophthalmic lens LS is completed. When step S229 is completed, step S23 is started.

In step S23 (FIG. 6), the order receiving device 2 outputs the design data of the ophthalmic lens LS designed in step S22 to the processing machine control device 3 (FIG. 5). The processing machine control device 3 sends a processing instruction to the ophthalmic lens processing machine 4 on the basis of the design data output from the order receiving device 2. As a result, the ophthalmic lens processing machine 4 processes and manufactures the ophthalmic lens LS on the basis of the design data. The ophthalmic lens LS manufactured by the ophthalmic lens processing machine 4 is delivered to the optician store, fitted into an eyeglass frame, and provided to a customer (the wearer).

Also, in the order receiving device 2, the control unit 21 of the order receiving device 2 performs a process of receiving ordering information from the ordering device 1, a process of designing the ophthalmic lens LS on the basis of the received ordering information, and a process of outputting design data of the ophthalmic lens LS to the processing machine control device 3 when a predetermined program pre-installed in the storage unit 22 is read into a memory or the like and is executed.

Also, the design unit 27 of the order receiving device 2 may be arranged in the ophthalmic lens design device connected to the order receiving device 2. Also, as long as the design process of the present embodiment can be performed, a physical configuration of a device that performs the design process is not particularly limited.

The ophthalmic lens LS obtained in the above-described design method will be described. Here, a synthetic sag surface, which is a virtual surface created by synthesizing a shape of the object-side surface of an ophthalmic lens and a shape of the eyeball-side surface thereof, will be described.

The ophthalmic lens has a reference point for measuring prism power, which is one of prescription powers. This reference point is referred to as a prism reference point. The manufacturer of the ophthalmic lens may define the prism reference point as a point referred to as a prism reference point or the like on the object-side surface of the ophthalmic lens. Alternatively, unless otherwise specified, the prism reference point coincides with the fitting point on the object side. When an ophthalmic lens is designed, the normal line of the object-side surface at the prism reference point is designed as an optical axis. Although the prism reference point is the same as the fitting point in many single-focus ophthalmic lenses, the prism reference point is at a position different from the fitting point in ophthalmic lenses designed in a state in which the fitting point is intentionally shifted from the optical axis such as some single-focus ophthalmic lenses and progressive refractive power-specific ophthalmic lenses.

Figure 10:
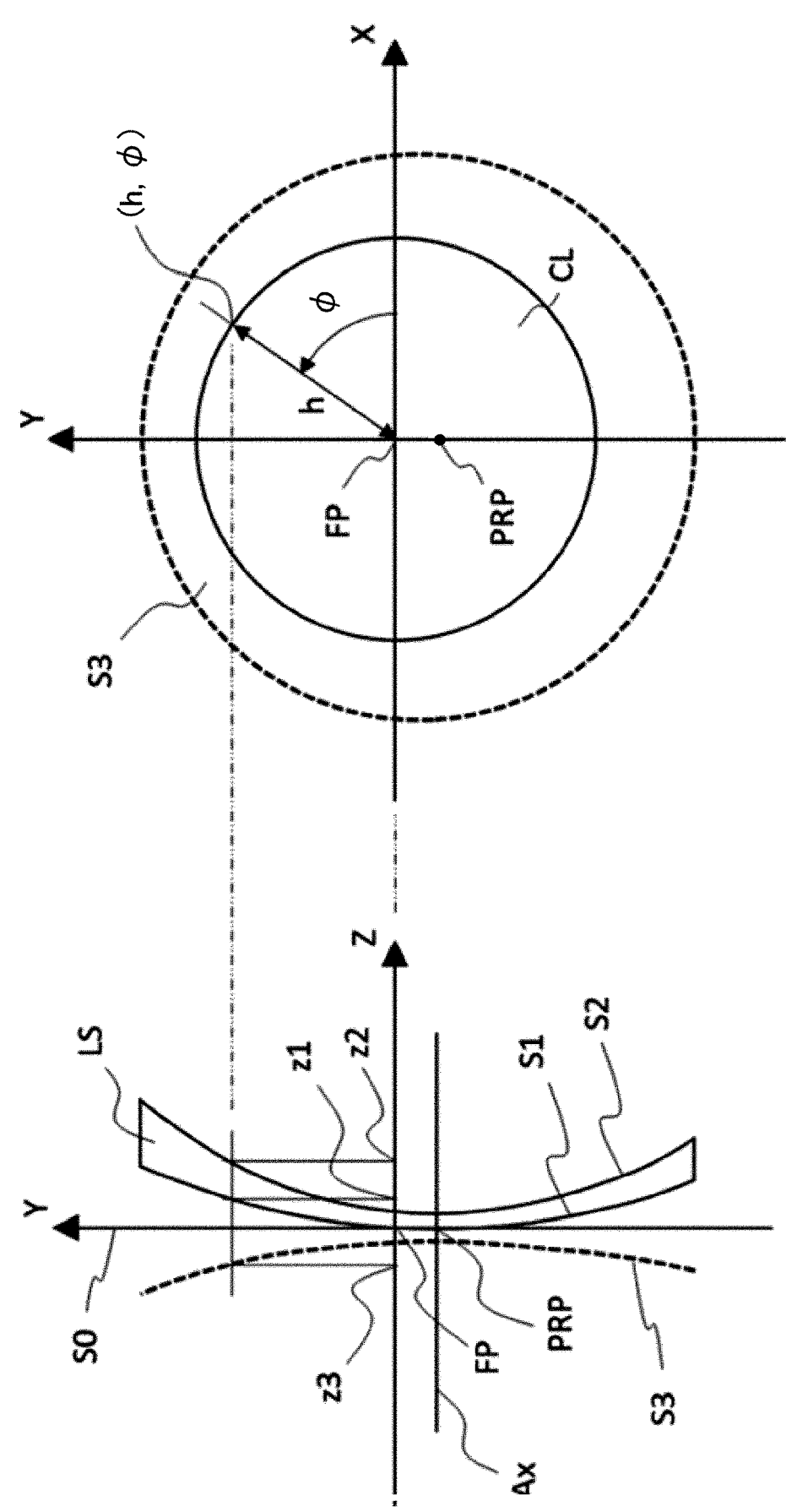
FIG. 10 is a conceptual diagram for describing a synthetic sag surface.

FIG. 10 is a conceptual diagram for describing the synthetic sag surface. The ophthalmic lens LS according to the present embodiment has a prism reference point PRP. Although the prism reference point PRP and the fitting point FP are set at different positions in FIG. 10, they may be set at the same position. For the shape of the ophthalmic lens designed in the following embodiment, the orthogonal coordinate system is set as follows when the fitting point FP on the object-side surface S1 is designated as the origin. The normal line of the object-side surface S1 at the prism reference point PRP on the object-side surface S1 is defined as an optical axis Ax. A direction from the object-side surface S1 to the eyeball-side surface S2 is defined as positive direction of the Z-axis when the straight line passing through the origin and parallel to the optical axis Ax is designated as the Z-axis. Within a plane S0 including the origin and orthogonal to the Z-axis, an upward-downward direction is set as the Y-axis when viewed from the wearer Wr, the upward direction of the Y-axis is set as a positive direction, a left-right direction is designated as the X-axis when viewed from the wearer Wr, and the right direction is set as a positive direction of the X-axis. Also, the Z-axis is set as a rotation axis, an angle formed with respect to the X-axis is denoted by $\phi$ [°], a direction of rotation from the positive direction of the X-axis to the positive direction of the Y-axis is set as a positive direction, and a height along a radial direction from the Z-axis is denoted by h [mm].

A point on the object-side surface S1, a point on the eyeball-side surface S2, and a point on the synthetic sag surface S3 can all indicate positions on the surfaces using the height h and the angle $\phi$. Hereinafter, the positions of the points on these surfaces indicated by h and $\phi$ are referred to as (h, $\phi$). (h, $\phi$) is assumed to correspond to the position of any point on the object-side surface S1. The Z coordinate of the point on the object-side surface S1 corresponding to the position (h, $\phi$) is set as z1(h, $\phi$), and the Z coordinate of the eyeball-side surface S2 is set as z2(h, $\phi$). At this time, a virtual surface whose Z coordinate is z3 when z3(h, $\phi$)=z1(h, $\phi$)−z2(h, $\phi$), in other words, a surface formed by a set of points represented by Z=z3(h, $\phi$) is a synthetic sag surface S3 (indicated by a broken line). In FIG. 10, the position (h, $\phi$) on the synthetic sag surface S3 and circumference CL which is a set of points where $\phi$ at the height h is in a range of 0° to 360° are shown.

Average curvature at the position (h, $\phi$) on the synthetic sag surface S3 of the ophthalmic lens LS is set as C(h, $\phi$). The average curvature is a value obtained by dividing a sum of two principal curvatures, which are the maximum and minimum values of normal curvature of the curved surface at a point on the curved surface, by 2. The sign of the normal curvature is positive when the synthetic sag surface is convex toward the object side. Consequently, as shown in FIG. 10, when the ophthalmic lens LS is a negative lens, the average curvature C(0,0) of the synthetic sag surface S3 is negative. However, when the average curvature of the synthetic sag surface S3 is illustrated in the present description, the average curvature C(0,0) at the position (0,0) may be used as reference and a relative value or the like offset by subtracting C(0,0) from the average curvature C(h, $\phi$) at each point may be used as appropriate.

When the angle $\phi$ changes in a range of a width of 360° from 0° to 360° at the height h, a maximum value of the average curvature C(h, $\phi$) of the synthetic sag surface S3 is denoted by Cmax360(h) and a minimum thereof is denoted by Cmin360(h). In other words, when the height h is fixed to any value, the maximum and minimum values of the average curvature C(h, $\phi$) can be represented as a function of the height h if $\phi$ changes arbitrarily from 0° to 360°, the maximum value is denoted by Cmax360(h), and the minimum value is denoted by Cmin360(h).

When the angle $\phi$ at the height h changes in a range of a width of 45° from $\phi$1−22.5° to $\phi$=$\phi$1+22.5° in a state in which a specific angle $\phi$1 capable of having any value from 0° to 360° is designated as the center, a maximum value of the average curvature C(h, $\phi$) of the synthetic sag surface S3 is denoted by Cmax45(h) and a minimum thereof is denoted by Cmin45(h). In other words, when the height h is fixed to any value, the angle $\phi$1 is fixed to any value in a range of 0° to 360°, the maximum and minimum values of the average curvature C(h, $\phi$) when the angle is changed from $\phi$1−22.5° to $\phi$1+22.5° in the state in which the angle $\phi$1 is designated as the center can be expressed as a function of the height h and the angle $\phi$1, the maximum value is denoted by Cmax45(h, $\phi$1), the minimum value is denoted by Cmin45(h, $\phi$1).

Also, Cpp45(h, $\phi$1) and Cpp360(h) are set to values obtained by the following equations (C1) and (C2).

$$Cpp45(h,\phi1)=Cmax45(h,\phi1)-Cmin45(h,\phi1) \qquad (C1)$$

$$Cpp360(h)=Cmax360(h)-Cmin360(h) \qquad (C2)$$

In the ophthalmic lens of the present embodiment, the height h satisfying the following conditions (A), (B), and (C) exists in the range of 14 mm or more and 22 mm or less.

(A) A condition that Cpp360(h)×0.1 is Cpp45(h, $\phi$1) or more is set as a condition (A1), an angle satisfying the condition (A1) among angles $\phi$1 is set as a corresponding reference angle $\phi$0, a plurality of corresponding reference angles $\phi$0 are present, and corresponding reference angles $\phi$0 of at least one pair of the plurality of corresponding reference angles $\phi$0 are 45° or more apart from each other.

(B) At least one of the plurality of corresponding reference angles $\phi$0 satisfying the above-described condition (A) is included in a range of 5° to 175° and the at least one is included in a range of 185° to 355°.

(C) In the condition (B), when the corresponding reference angle $\phi$0 included in a range of 5° to 175° is denoted by $\phi$0a and the corresponding reference angle $\phi$0 included in a range of 1850 to 355° is denoted by $\phi$0b, the average curvature C(h, $\phi$0a) and the average curvature C(h, $\phi$0b) are different in all combinations of $\phi$0a and $\phi$0b. Here, it is preferable to satisfy the above-described conditions (A), (B), and (C) in all values of h greater than or equal to 14 mm and less than or equal to 22 mm.

Figure 11:
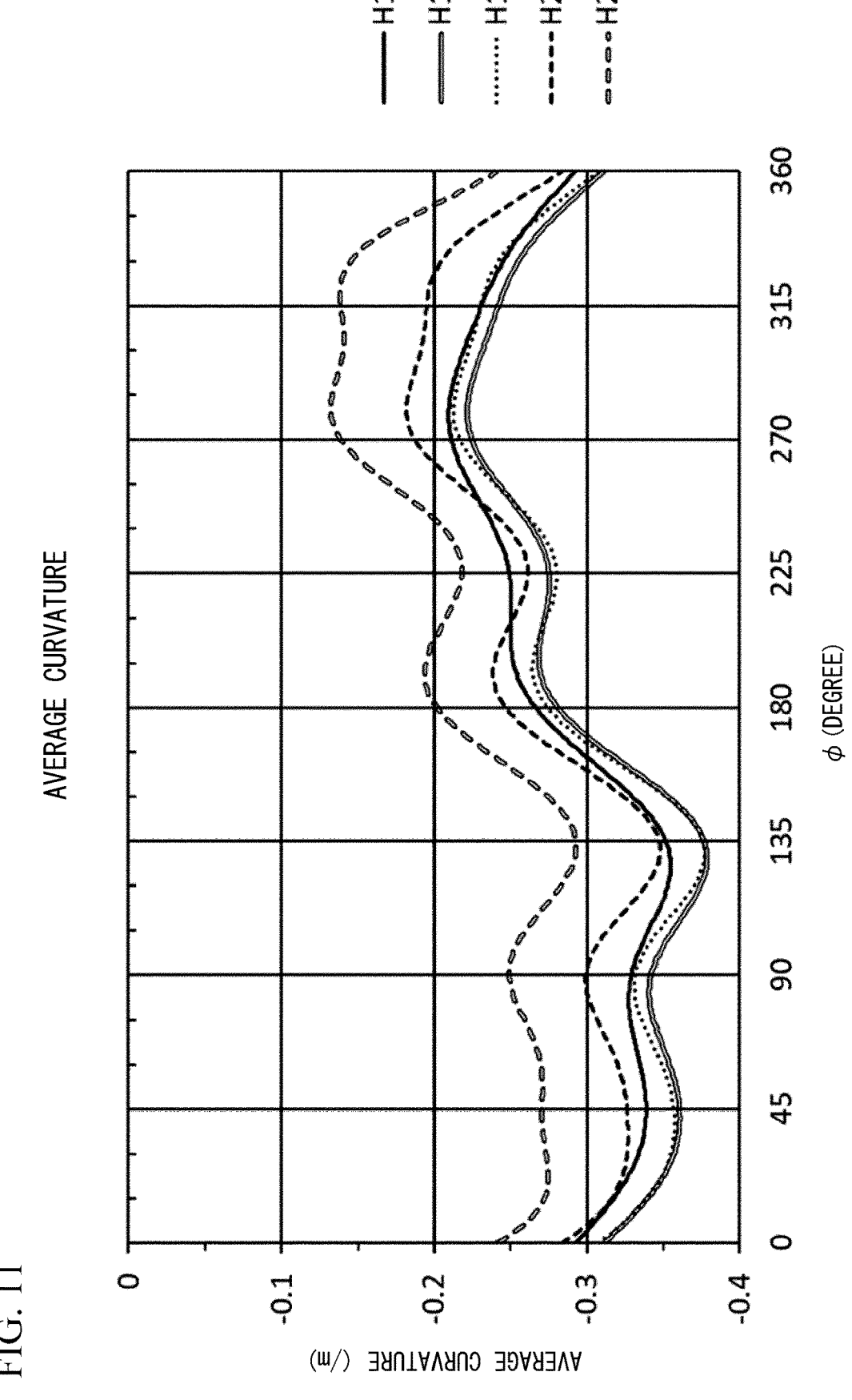
FIG. 11 is a graph showing an example of average curvature of the synthetic sag surface of the ophthalmic lens according to an embodiment.

FIG. 11 is a graph showing an example of the average curvature C(h, $\phi$) at a height h and an angle $\phi$ on the synthetic sag surface S3 of the ophthalmic lens of the present embodiment. Lines indicated by H14, H16, H18, H20, and H22 indicate average curvatures C on the circumference corresponding to heights h of 14 mm, 16 mm, 18 mm, 20 mm, and 22 mm along the radial direction from the Z-axis, respectively. The graph of FIG. 11 is an example for describing the ophthalmic lens LS according to the present embodiment and the present invention is not limited to the specific numerical values of the graph. In the present example, the optical axis of the ophthalmic lens LS passes through the fitting point FP.

In each graph of FIG. 11, a change in the average curvature C at an angle $\phi$ in a range of about 0° to 90°, a range of about 180° to 225°, and a range of about 270° to 315° tends to be less than those at the other angles. This is because these ranges correspond to the first regions V1A, V1C, and V1B in the distance distribution D1 of FIG. 2, respectively, and the set distance is constant in the first regions V1A, V1C, and V1B. Furthermore, this is because the aberration balance is rotationally symmetric with respect to the fitting point FP in each of the first regions V1A, V1C, and V1B.

Each of the above-described conditions (A), (B), and (C) is considered. In relation to condition (A), Cpp360(h) indicates a change range obtained by subtracting the minimum value from the maximum value of the average curvature C in a range of 0° to 360° at the height h. Cpp45(h, $\phi$1) indicates a change range obtained by subtracting the minimum value from the maximum value of the average curvature C in the range of plus or minus 22.5° centered on a specific angle $\phi$1 at the height h. That is, Cpp360(h) is an index of the change range of the average curvature C for all angles and Cpp45(h, $\phi$1) is an index of the change range of the local average curvature C for a specific angle that can be in the range of 0° to 360°. Condition (A) corresponds to a case where there are a plurality of corresponding reference angles $\phi$0 having a distance of 45 degrees or more with a small local change in the average curvature C according to the design based on the distance distribution for which the plurality of first regions V1 are set and further the design based on the aberration balance set for each of the plurality of first regions V1.

Condition (B) corresponds to a case where at least one first region V1 is set on the upper side of the ophthalmic lens LS corresponding to the angle range of 5° to 175° and the lower side of the ophthalmic lens LS corresponding to the angle range of 185° to 355°.

Condition (C) corresponds to a case where the set distance of the first region V1 corresponding to each of the plurality of corresponding reference angles $\phi$0 satisfying the condition (A) is different.

Figure 12:
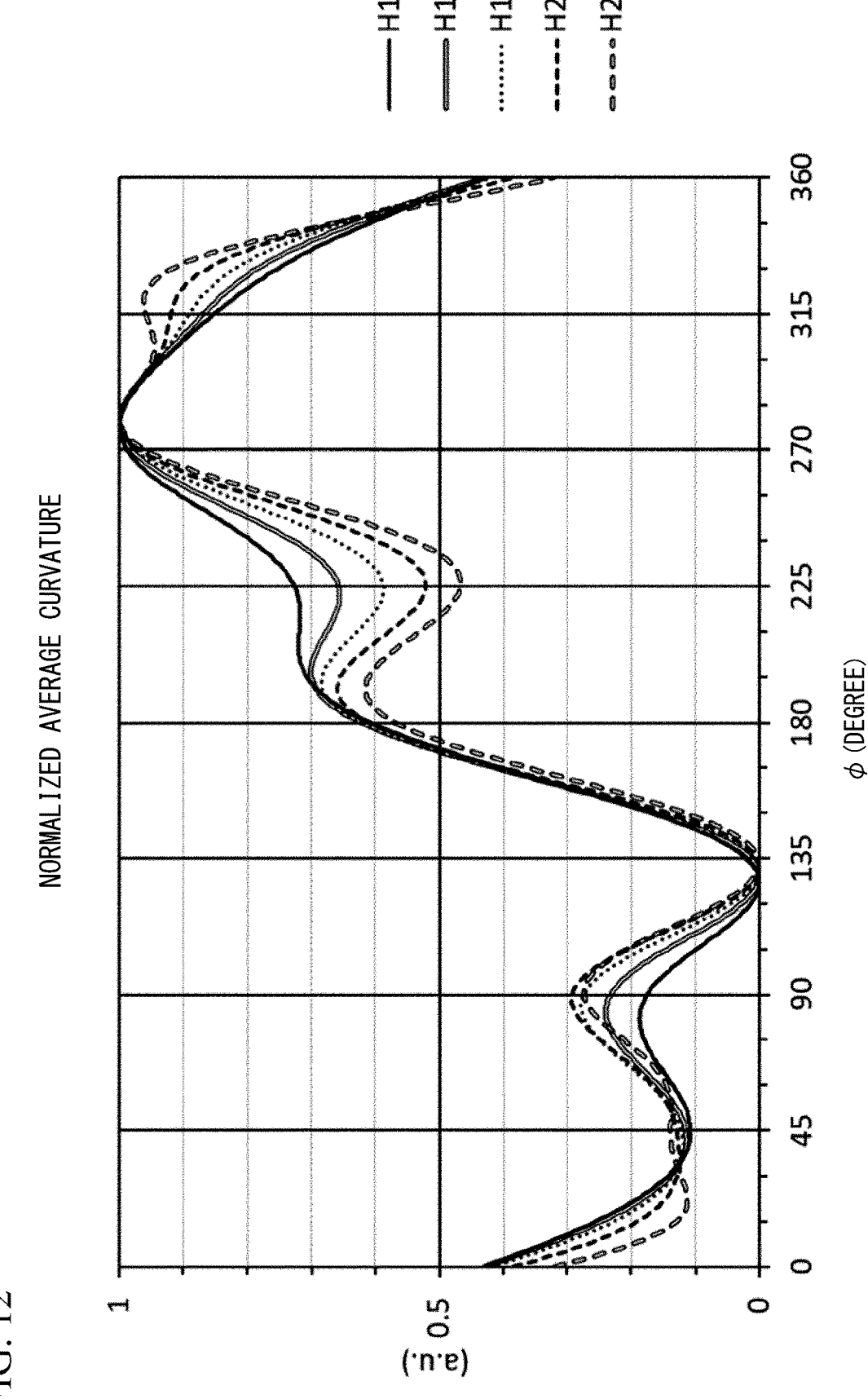
FIG. 12 is a graph showing an example of normalized average curvature of the synthetic sag surface of the ophthalmic lens according to an embodiment.

FIG. 12 is a graph showing normalized average curvature subjected to linear conversion such that the maximum value Cmax360(h) and the minimum value Cmin360(h) of the average curvature C are 1 and 0, respectively, with respect to each height of FIG. 11. In the following graph, a curve showing the normalized average curvature is simply called the curve.

Figure 13:
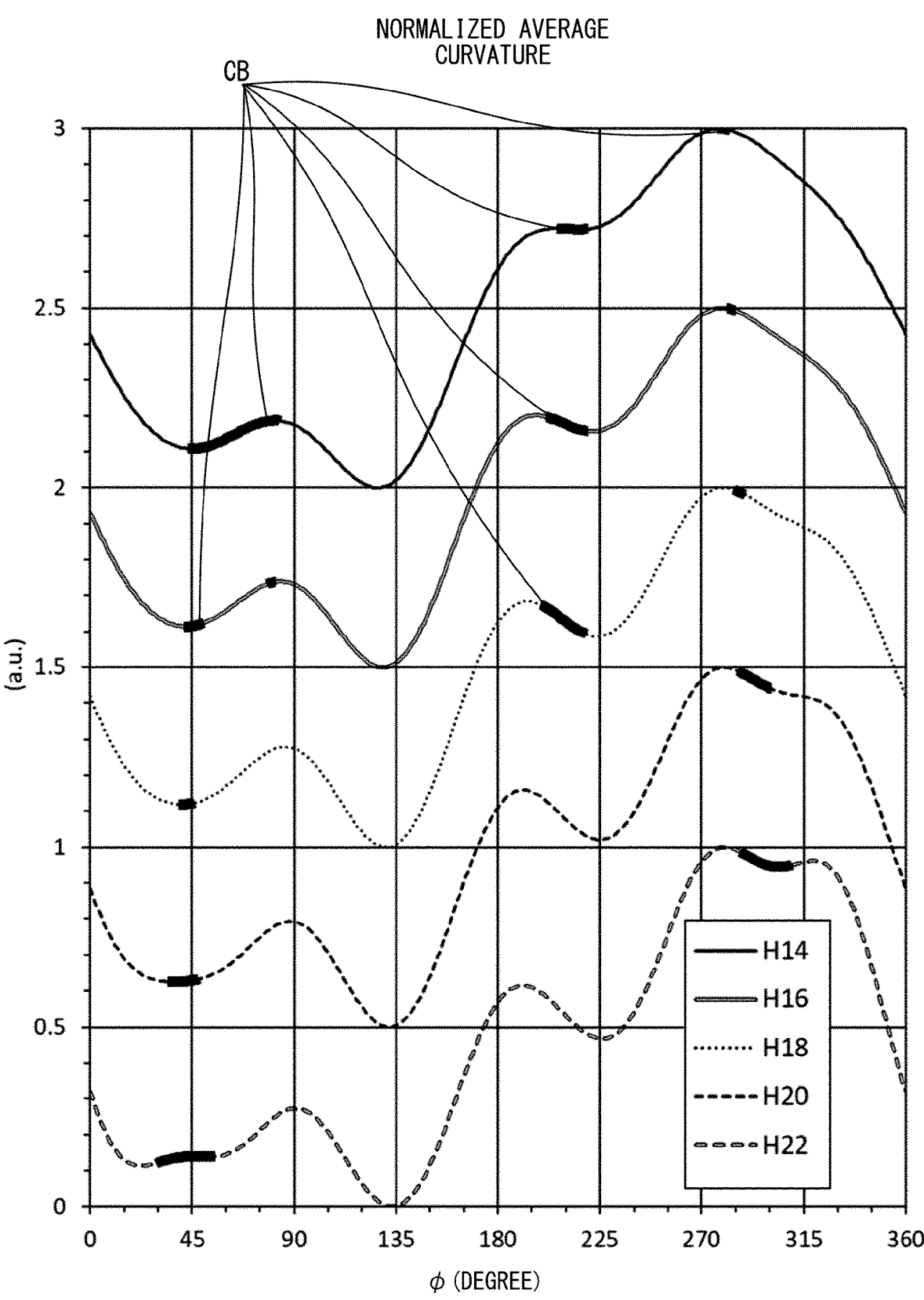
FIG. 13 is a graph showing an example of normalized average curvature of the synthetic sag surface of the ophthalmic lens according to an embodiment.

FIG. 13 shows the normalized average curvature obtained by shifting the position of the reference vertical axis by 0.5 for each curve such that the curves of the graph of FIG. 12 do not overlap. In H20, H18, H16, and H14, values obtained by adding 0.5, 1.0, 1.5 and 2.0 to the normalized average curvature are shown, respectively. A portion CB plotted overlaid with a thick solid line in each curve is a portion corresponding to the corresponding reference angle $\phi$0 that satisfies the condition (A1). An are corresponding to an angle range of 45° centered on the corresponding reference angle $\phi$0 at the height h of the ophthalmic lens LS is referred to as a low curvature change arc.

When the normalized average curvature is used, the average curvature C is normalized such that Cpp360(h) is 1. Accordingly, for example, attention is paid to the point of the angle $\phi$1 on the circumference of the height h in the radial direction from the Z-axis. If the change range of the normalized average curvature of the synthetic sag surface S3 is 0.1 or less when the angle changes in a range of $\phi$1−0.5×45° to $\phi$1+0.5×45° with the height h constant in a state in which the above point is designated as the center, the angle $\phi$1 is considered to be the corresponding reference angle $\phi$0. At this time, the low curvature change arc is a part on the circumference of the height h along the radial direction in a state in which the Z-axis passing through the fitting point FP is designated as the center on the synthetic sag surface S3 and becomes an arc in which $\phi$ is in a range of $\phi$0−0.5×45° to $\phi$0+0.5×45°.

Also, one low curvature change arc was defined to cover an angle range of 45°. In the portion where the plurality of corresponding reference angles $\phi$0 are continuous without being 45° or more apart from each other, a plurality of low curvature change arcs overlap. The condition that corresponding reference angles $\phi$0 of at least one pair among corresponding reference angles $\phi$0 are 45° or more apart from each other in the description of the above-described condition (A) corresponds to the fact that the plurality of low curvature change arcs corresponding to the set do not overlap each other. In the example of FIG. 13, there are low curvature variable arcs without overlapping with different average curvatures at three positions where $\phi$ is near 60°, 210°, and 280° as indicated by the curve showing the normalized average curvature on the circumference where the height h of the ophthalmic lens LS is 14 mm. Also, there are shown low curvature variable arcs without overlapping with different average curvatures at two positions where $\phi$ is near 45° and 295° as indicated by the curve showing the normalized average curvature on the circumference where the height h of the ophthalmic lens LS is 22 mm.

In the ophthalmic lens LS according to the present embodiment, it is desirable that there be at least one of the corresponding reference angle $\phi0c$ when the angle $\phi$ is present in the range of 175° to 265° and the corresponding reference angle $\phi0d$ when the angle $\phi$ is present in the range of 275° to 365°, i.e., 5°, at at least one height h in a range of 14 mm to 22 mm. When both the corresponding reference angles $\phi0c$ and $\phi0d$ are present, it is desirable that the distribution of the angle range in which the corresponding reference angles $\phi0c$ and $\phi0d$ are present be asymmetric with respect to the Y-axis. This is based on the fact that the positions of the first regions V1B and V1C are asymmetrically present on both sides of the Y-axis as a boundary in the example of the distance distribution D1. In the example of FIG. 13, as indicated by the curve showing the normalized average curvature on the circumference of the ophthalmic lens LS in a range of 14 mm to 18 mm, a distribution of an angle range in which the corresponding reference angles $\phi0c$ and $\phi0d$ are present in the vicinity of $\phi$ of 210° and $\phi$ of 285° and the corresponding reference angles $\phi0c$ and $\phi0d$ are present at $\phi=270°$ corresponding to the position of the Y-axis as a boundary is different. Thereby, the ophthalmic lens LS is designed such that the residual aberration has a small change in the aberration balance even if they are asymmetric with respect to $\phi=270°$ as a boundary.

In the ophthalmic lens LS according to the present embodiment, it is preferable that at least one of the corresponding reference angles $\phi0$ be in an angle range of 270–22.5 [°] to 270+22.5 [°], in other words, an angle range of 247.5° to 292.5°, at at least one height h or preferably all heights h in the range of 14 mm to 22 mm. The corresponding reference angle present in this angle range is denoted by $\theta0e$. Such an ophthalmic lens is provided on the basis of the distance distribution D1 or the like in which the first region V1 is present in the lower portion of the ophthalmic lens LS. Even in the example of the ophthalmic lens LS shown in FIG. 13, the corresponding reference angle $\phi0e$ is present in this angle range.

The ophthalmic lens LS of FIG. 13 is an ophthalmic lens for hyperopia having a prescription-specific spherical power of +4 D and a prescription-specific astigmatism power of 0 D and is optimized and designed by setting the aberration balance to be the same on the entire surface of the ophthalmic lens LS. A sum of the prescription-specific spherical power, which is the equivalent spherical power of the ophthalmic lens LS, and half of the prescription-specific astigmatism power is +4 D. In the example of FIG. 13, the normalized average curvature at the corresponding reference angle $\phi0e$ when 4 is near 280° on the circumference where the height of the ophthalmic lens LS is 14 mm is about 1 and the normalized average curvature when $\phi$ rotated by 180° is near 100° is greater than about 0.2 (it is should be noted that the values on the vertical axis are shifted and plotted for each height h in FIG. 13). The same is true for the circumference of another height h of the ophthalmic lens LS. This is a trend when the aberration balance is the same on the entire surface.

The example of FIG. 13 is obtained by performing a design process such that the aberration balance is constant in each of the first regions V1A, V1B, and V1C of the distance distribution D1 and a change in the aberration balance is particularly limited in the $\phi$ direction in each of the first regions V1. As shown in FIG. 13, it is possible to limit a change in the aberration balance in the $\phi$ direction by designing the shape of the ophthalmic lens such that the low curvature change arc is present in the range of $\phi$ corresponding to the first region V1.

In the ophthalmic lens, the residual aberration becomes larger especially for an ophthalmic lens with higher prescription power and for light rays passing through a position farther from the prism reference point through which the optical axis passes. Consequently, in an ophthalmic lens whose fitting point is relatively close to the prism reference point, for example, at a position only a few millimeters away therefrom, it can be generally considered that the magnitude of the residual aberration depends on the height along the radial direction from the Z-axis passing through the fitting point and the residual aberration increases as the height increases. By the way, in a part where the height is low, i.e., a part near the fitting point, because the influence of the difference in the prescription and the design of the ophthalmic lens on the magnitude of the residual aberration of the light ray passing there is small, a change in the aberration balance is also small. On the other hand, because the residual aberration of the light rays passing through the ophthalmic lens depending on the difference in the prescription or the design becomes excessively large and the wearer cannot obtain sufficient visual acuity in a part where this height is higher than a certain level, the part is not important as an ophthalmic lens. Also, a part of the height that does not fit in the eyeglass frame is not important. This also equally applies to an ophthalmic lens in which the fitting point is located relatively far from the prism reference point. Accordingly, when the average curvature of the synthetic sag surface is considered, it is important that the height is neither excessively low nor excessively high. This important part is specifically a height h in the range of 14 mm to 22 mm that overlaps most of a stable gaze field overlap. Because a size of a frame of an optometry lens used for optometry at an optician store is substantially the same as a size of a frame of the trial lens used in combination with the optometry lens when the wearing feeling of the progressive refractive power-specific ophthalmic lens is tested, it can be seen that this range of the height h is important. Consequently, when more low curvature change arcs are included in the range where the height h of the ophthalmic lens LS is in the range of 14 mm to 22 mm, it is possible to provide an ophthalmic lens with a small change in the aberration balance in the part corresponding to the first region V1.

According to the above-described embodiment, the following operations and effects can be obtained.

(1) According to the present embodiment, there is provided an ophthalmic lens design method including: acquiring purpose information (first information) about a purpose of an ophthalmic lens LS to be designed; acquiring wearer information (second information) about at least one of a visual line of a wearer Wr of the ophthalmic lens LS for the purpose, a place, a use tool, and a body of the wearer Wr; acquiring distance distribution data indicating the number of first regions V1, positions, shapes, and sizes of a plurality of first regions V1 set on a surface of the ophthalmic lens LS, and distances (distances to be set) to a target viewed through the first regions on the basis of the first information; setting a numerical value to be variably set among numerical values indicating the number of first regions V1, the positions, the shapes, and the sizes of the plurality of first regions V1, and the distances to be set in the distance distribution data on the basis of the second information and setting the plurality of first regions V1 and the distances to be set on the surface of the ophthalmic lens LS; and setting a target aberration distribution of the ophthalmic lens LS on the basis of the plurality of first regions V1 and the set distances that have been set. Thereby, the ophthalmic lens LS suitable for various situations when the wearer Wr views a target object is provided.

(2) In the ophthalmic lens design method according to the present embodiment, the positions and set distances of the plurality of first regions V1 are set to be asymmetric with respect to a vertical plane including a straight line passing through the fitting point FP and the rotation point of the ophthalmic lens LS. Thereby, even if the position of the object in the visual field is asymmetrical, the wearer Wr can clearly view the target object through the ophthalmic lens LS.

(3) In the ophthalmic lens design method according to the present embodiment, the first region V1C for viewing the same target object based on the purpose such as golf is set on a left side of a left eye lens when viewed from the wearer Wr and a left side of a right eye lens when viewed from the wearer Wr or a right side of the left eye lens when viewed from the wearer Wr and a right side of the right eye lens when viewed from the wearer Wr. This can allow the wearer Wr to clearly view the target object on one side of the visual field through the ophthalmic lens LS in binocular vision.

(4) In the ophthalmic lens design method according to the present embodiment, in each of the plurality of first regions V1, a distribution of values (aberration balances) indicating a relative magnitude of the other of target residual refractive power and target residual astigmatism with respect to one of the target residual refractive power and the target residual astigmatism is rotationally symmetric with respect to a straight line passing through a fitting point FP of the ophthalmic lens LS and a design rotation point or an optical axis of the ophthalmic lens LS as an axis. Thereby, it is possible to provide the ophthalmic lens LS having rotationally symmetric aberration characteristics, which is less uncomfortable for the wearer Wr.

(5) In the ophthalmic lens design method according to the present embodiment, a second region V2 is set on a surface of the ophthalmic lens LS to be designed, the second region V2 is set between two first regions V1 having different set distances, and the set distance in the second regions V2 changes such that a connection between the different set distances is made. Thereby, because the ophthalmic lens can be optimized and designed even at the position of the ophthalmic lens LS where there is no particularly expected target object for the purpose of the ophthalmic lens LS, it is possible to achieve performance sufficient for sale of an ophthalmic lens in an entire region large enough to be fit into the eyeglass frame of the ophthalmic lens LS.

(6) The ophthalmic lens design method according to the present embodiment includes setting a third region V3 inside of the second region V2, wherein, in the third region V3, a change in the set distance in a direction orthogonal to a trajectory of the visual line is set to be less than a change in the set distance in a direction along the trajectory on the basis of a frequency at which the visual line of the wearer Wr passes through the surface of the ophthalmic lens LS. Thereby, the target object in the trajectory of the visual line, which is frequently used, can be viewed without distortion.

(7) In the ophthalmic lens design method according to the present embodiment, at least the set distance in the second region V2 is expressed by a spline function. Thereby, it is possible to efficiently interpolate the value of the set distance in the distance distribution data.

(8) In the ophthalmic lens design method of the present embodiment, the second information can include at least one piece of information about a height of the wearer Wr, a posture of the wearer Wr when the wearer Wr takes action with respect to the purpose such as golf, a position or a range of the ophthalmic lens LS through which a visual line of the wearer Wr passes, and a position of the wearer Wr or a visual target. Thereby, the wearer Wr can be allowed to view the target object more clearly through the ophthalmic lens LS in accordance with these characteristics of the wearer Wr.

(9) In the ophthalmic lens design method of the present embodiment, the purpose can be used for putting of the golf, an entire region of at least one first region V1 (a first region V1B) where the set distance is set in a range of 85% to 90% of the height of the wearer Wr among the plurality of first regions V1 is arranged below the fitting point FP of the ophthalmic lens LS and an entire region of at least one first region V1 (a first region V1C) where the set distance is set in a range of 2 m to 4 m can be arranged on an opposite side to the dominant arm of the wearer Wr between the left and right sides of the fitting point FP when viewed from the wearer Wr. Thereby, the wearer Wr can be allowed to clearly view the target object through the ophthalmic lens LS in golf putting or the like.

(10) The ophthalmic lens manufacturing method according to the present embodiment manufactures an ophthalmic lens LS designed in the above-described ophthalmic lens design method. Thereby, an ophthalmic lens LS suitable for various situations when the wearer Wr views a target object is provided.

(11) A single-focus ophthalmic lens according to the present embodiment is an ophthalmic lens LS manufactured in the above-described ophthalmic lens manufacturing method. Thereby, a single-focus ophthalmic lens suitable for various situations when the wearer Wr views a target object is provided.

(12) According to the present embodiment, there is provided an ophthalmic lens design device (the order receiving device 2 or the like) including: the first acquisition unit 271 configured to acquire purpose information (first information) about a purpose of an ophthalmic lens LS to be designed and wearer information (second information) about at least one of a visual line of a wearer Wr of the ophthalmic lens LS for the purpose, a place, a use tool, and a body of the wearer Wr; the second acquisition unit 272 configured to acquire distance distribution data indicating the number of first regions V1, positions, shapes, and sizes of a plurality of first regions V1 set on a surface of the ophthalmic lens LS, and distances to a target viewed through the first regions on the basis of the first information; the region setting unit 273 configured to set a numerical value to be variably set among numerical values indicating the number of first regions V1, the positions, the shapes, and the sizes of the plurality of first regions V1, and the distances to be set in the distance distribution data on the basis of the second information and set the plurality of first regions V1 and the distances to be set on the surface of the ophthalmic lens LS; and the target aberration setting unit 274 configured to set a target aberration distribution of the ophthalmic lens LS on the basis of the plurality of first regions V1 and the distances that have been set. Thereby, an ophthalmic lens LS suitable for various situations when the wearer Wr views a target object is provided.

(13) According to the present embodiment, there is provided an ophthalmic lens order receiving/ordering system including: the above-described ophthalmic lens design device (the order receiving device 2 or the like); the ophthalmic lens ordering device including the input unit 15 configured to receive inputs of the first information and the second information and a transmission unit (the communication unit 13) configured to transmit the first information and the second information; and an ophthalmic lens order receiving device including a reception unit (the communication unit 23) configured to receive the first information and the second information. Thereby, an ophthalmic lens LS suitable for various situations when the wearer Wr views a target object can be provided.

(14) According to the present embodiment, there is provided an ophthalmic lens having a pair of refracting surfaces of an object-side surface S1 and an eyeball-side surface S1, wherein a fitting point FP set on the object-side surface S1 is set as an origin, wherein a straight line passing through the origin and parallel to a normal line of the object-side surface S1 at a prism reference point PRP is set as a Z-axis and a direction from the object-side surface S1 to the eyeball-side surface S2 is set as a positive direction of the Z-axis, wherein, within a plane orthogonal to the Z-axis, an upward-downward direction when viewed from a wearer Wr is set as a Y-axis, the upward direction is set as a positive direction of the Y-axis, and a left-right direction when viewed from the wearer Wr is set as an X-axis, and the right direction is set as a positive direction of the X-axis, wherein the Z-axis is set as a rotation axis, an angle formed with respect to the X-axis is denoted by $\phi$ [°], a direction of rotation from the positive direction of the X-axis to the positive direction of the Y-axis is set as a positive direction, and a height along a radial direction from the Z-axis is denoted by h [mm], wherein a Z coordinate of a point at h and $\phi$ in the object-side surface S1 is denoted by z1(h, $\phi$) and Z coordinates of a point at h and $\phi$ in the eyeball-side surface S2 is denoted by z2(h, $\phi$) when each of h and has a value corresponding to a position of any point on the object-side surface and average curvature of the synthetic sag surface S3 at h and $\phi$ is denoted by C(h, $\phi$) when a virtual surface in which z3 obtained as z3(h, $\phi$)=z1(h, $\phi$)−z2(h, $\phi$) is set as a Z coordinate of a point at h and $\phi$ is defined as a synthetic sag surface S3, wherein a maximum value of the average curvature C(h, $\phi$) of the synthetic sag surface S3 is denoted by Cmax360(h) and a minimum thereof is denoted by Cmin360(h) when the angle $\phi$ changes in a range of a width of 360° from 0° to 360° and a maximum value of the average curvature C(h, $\phi$) of the synthetic sag surface S3 is denoted by Cmax45(h, $\phi$1) and a minimum thereof is denoted by Cmin45(h, $\phi$1) when the angle $\phi$ changes in a range of a width of 45° from $\phi$=$\phi$1−22.5° to 4)=$\phi$1+22.5° centered on a specific angle $\phi$1 capable of having any value from 0° to 360° at the height h, wherein Cpp45(h, $\phi$1) and Cpp360(h) are set as values obtained from Eqs. (C1) and (C2), wherein, when an angle $\phi$1 satisfying a condition that Cpp360(h)×0.1 is greater than or equal to Cpp45(h, $\phi$1) is set as a corresponding reference angle $\phi$0 at at least one value of h greater than or equal to 14 mm and less than or equal to 22 mm, a plurality of corresponding reference angles $\phi$0 are present and corresponding reference angles $\phi$0 of at least one pair among the plurality of corresponding reference angles $\phi$0 are 45° or more apart from each other, wherein at least one of the plurality of corresponding reference angles $\phi$0 is a corresponding reference angle $\phi$0a included in a range of 5° to 175° and at least one of the plurality of corresponding reference angles $\phi$0 is a corresponding reference angle $\phi$0b included in a range of 185° to 355°, and wherein C(h, $\phi$0a) is different from C(h, $\phi$0b). Thereby, an ophthalmic lens LS suitable for various situations when the wearer Wr views a target object can be provided.

(15) In the ophthalmic lens according to the present embodiment, there are a plurality of corresponding reference angles $\phi$0 satisfying the condition (A1) at all heights h greater than or equal to 14 mm and less than or equal to 22 mm and corresponding reference angles $\phi$0 of at least one pair of the plurality of corresponding reference angles $\phi$0 are 45 degrees or more apart from each other, at least one of the plurality of corresponding reference angles $\phi$0 satisfying the condition (A1) is the corresponding reference angle $\phi$0a included in a range of 5° to 175°, at least one corresponding reference angles $\phi$0 is a corresponding reference angle $\phi$0b included in a range of 185° to 355°, and C(h, $\phi$0a) is different from C(h, $\phi$0b). Thereby, in a wide range centered on the fitting point FP of the ophthalmic lens LS, it is possible to provide the ophthalmic lens LS suitable for various situations when the wearer Wr views the target object.

(16) In the ophthalmic lens according to the present embodiment, at least one of the corresponding reference angles $\phi$0 is either the corresponding reference angle $\phi$0c present in the range of 175° to 265° or the corresponding reference angle $\phi$0d present in the range of 275° to 5°. Thereby, it is possible to provide an ophthalmic lens LS suitable for various situations when a target object is viewed through the center left side or the center right side of the lower part of the ophthalmic lens LS.

(17) In the ophthalmic lens according to the present embodiment, at least one of the plurality of corresponding reference angles $\phi$0 is the corresponding reference angle $\phi$0e present at any one angle in the range of 247.5° (27°−22.5°) to 292.5° (270+22.5)°. Thereby, it is possible to provide the ophthalmic lens LS with a small change in the aberration balance in a wide range below the prism reference point of the ophthalmic lens LS.

The following modified example are also within the scope of the present invention and can be combined with the above-described embodiments and other modified examples. Parts denoted by reference signs that are the same as those in the above-described embodiment have the same functions and description thereof will be omitted as appropriate.

Modified Example 1

In the above-described embodiment, in the first regions V1A, V1B, and V1C (FIG. 2) in which different set distances are set, the aberration balance may be set to a different value on the basis of the set distances. The set distance of the first region V1A is 0 D (infinity). Accordingly, an appropriate aberration balance for minimizing the influence of the residual refractive power and the residual astigmatism on the wearing feeling in the first region V1A is set such that the wearer Wr can view relaxedly without using the accommodation power. Because the first regions V1B and V1C are regions in which the wearer Wr makes near viewing using accommodation power and residual refractive power can be reduced by the accommodation power, the need to take into account the influence of the residual refractive power is low as compared with the first region V1A. From this point of view, in the first region V1B and the first region V1C, the aberration balance can be set such that the residual astigmatism is reduced as compared with the first region V1A.

Aberration in the ophthalmic lens tends to increase as the distance from the fitting point FP increases. Accordingly, in the first region V1A and the first region V1B, it is preferable to compare aberration values at positions where magnitudes of the rotation angles taken from the straight line passing through the rotation point and the fitting point FP are the same when the design rotation point is designated as the center. The rotation angle can be taken in any direction with respect to the above-described straight line. In the first regions V1B and V1C where a finite set distance is set at the position where the above-described magnitude of the rotation angle is the same, it is preferable to set the target residual astigmatism having a smaller value than residual astigmatism in the first region V1A in which the set distance is set to infinity.

Figure 14:
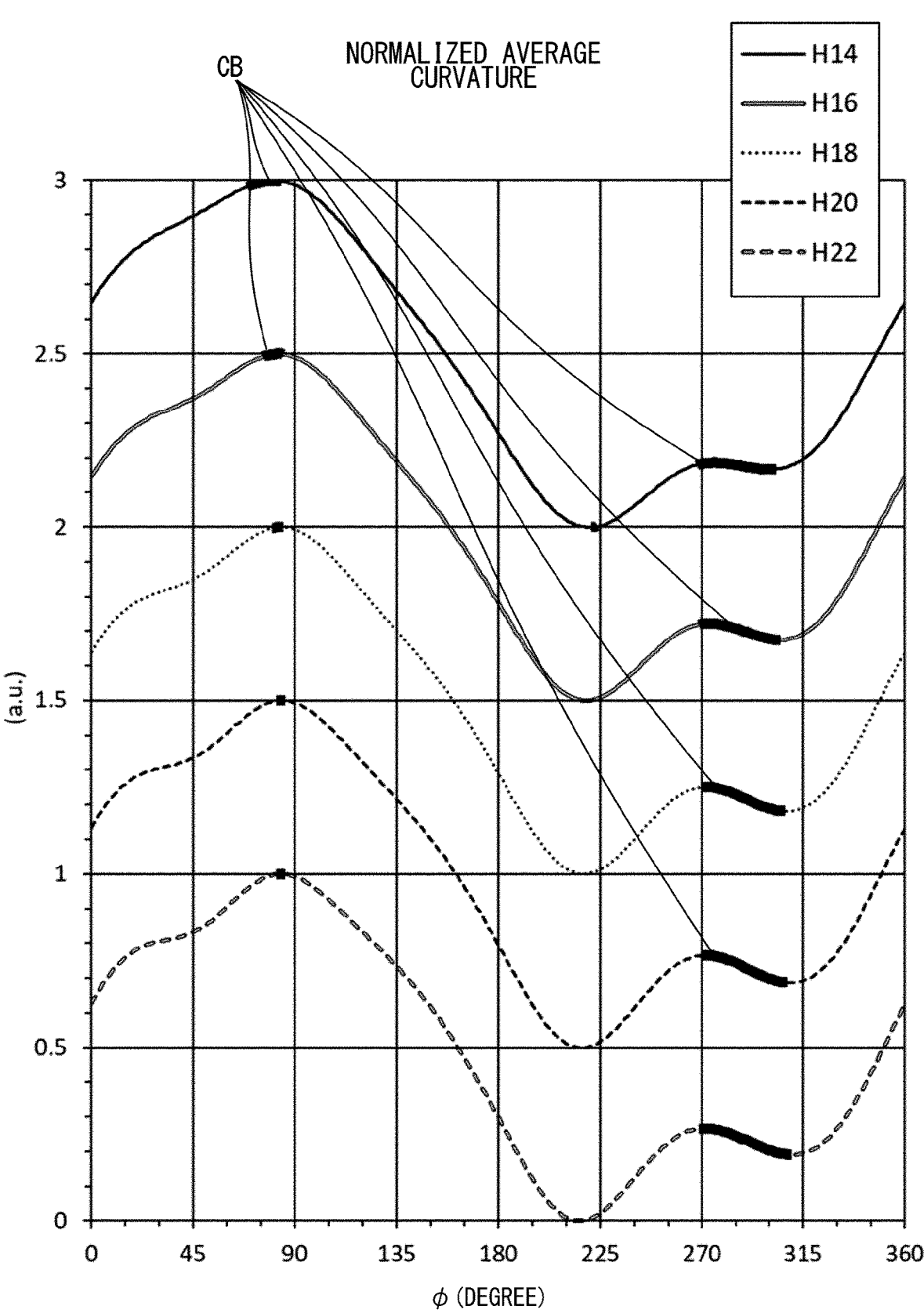
FIG. 14 is a graph showing an example of normalized average curvature of a synthetic sag surface of an ophthalmic lens according to a modified example.

FIG. 14 is a graph showing an example of the normalized average curvature of the synthetic sag surface at the height h and the angle $\phi$ of the ophthalmic lens LS according to this modified example. For curves H20, H18, H16, and H14, values obtained by adding 0.5, 1.0, 1.5, and 2.0 to normalized average curvatures are shown such that the curves H14, H16, H18, H20, and H22 show the normalized average curvatures on circumferences corresponding to heights h of 14 mm, 16 mm, 18 mm, 20 mm and 22 mm along the radial direction from each Z-axis by shifting the reference position of the vertical axis in a state in which they do not overlap. A portion CB plotted overlaid with a thick solid line in each curve is a portion corresponding to the corresponding reference angle $\phi$0 that satisfies a condition (A1). The graph of FIG. 14 is an example for describing the ophthalmic lens LS according to the modified example and the present invention is not limited to the specific numerical values of the graph. Here, the optical axis of the ophthalmic lens LS passes through the fitting point FP.

As can be seen from FIG. 14, in the example of this ophthalmic lens LS, there are low curvature variable arcs where average curvatures of synthetic sag surfaces are different at at least two positions where $\phi$ is near 80° and 290° in all heights h in a range of 14 mm to 22 mm.

The equivalent spherical power, which is a sum of the prescription-specific spherical power of the ophthalmic lens LS and half of the prescription-specific astigmatism power is denoted by Se and a corresponding reference angle $\phi$0 present in an angle range of 270−22.5 [L] to 270+22.5[°], in other words, an angle range of 247.5° to 292.5°, is denoted by $\phi$0e. In this case, at at least one height h or preferably all heights h in the range of 14 mm to 22 mm in the ophthalmic lens LS, it is preferable to satisfy C(h, $\phi$0e)<C(h, $\phi$0e−180°) with respect to the average curvature C when transmissive spherical power Se is positive and it is preferable to satisfy C(h, $\phi$0e)>C(h, $\phi$0e−180°) when the transmissive spherical power Se is negative. Thereby, it is possible to provide an aberration-balanced ophthalmic lens LS in which the residual astigmatism is more suitably corrected regardless of the prescription power below the ophthalmic lens used for near vision than above the ophthalmic lens used for far vision.

In the example of the ophthalmic lens LS of FIG. 14, the normalized average curvature at the corresponding reference angle $\phi$0 where $\phi$ is near 290° is smaller than the normalized average curvature when $\phi$ is near 110° at any height h. This is associated with a characteristic of the average curvature of the synthetic sag surface with respect to h and $\phi$ corresponding to the first region such that the residual astigmatism becomes smaller when the distance to the object to be viewed is closer to the first region V1 of the ophthalmic lens LS for the aberration balance at the time of designing. This characteristic can be implemented by designing the ophthalmic lens LS as follows. When the equivalent spherical power is positive, the curvature of the corresponding synthetic sag surface S3 is designed to be smaller in the first region V1 having the aberration balance in which the distance to the object to be viewed is shorter and the residual astigmatism is smaller as compared with a region obtained by rotating the first region V1 by 180° around the origin. When the equivalent spherical power is negative, the curvature of the corresponding synthetic sag surface S3 is designed to be larger in the first region V1 having the aberration balance in which the distance to the object to be viewed is shorter and the residual astigmatism is smaller as compared with a region obtained by rotating the first region V1 by 180° around the origin.

In the ophthalmic lens design method according to the present modified example, in the first region V1 where a finite set distance is set at positions where the magnitude of the rotation angle taken from the straight line passing through the design rotation point and the fitting point FP in the ophthalmic lens LS is the same, the target residual astigmatism is set to be less than residual astigmatism in another first region V1 in which the set distance is set to be longer. Thereby, it is possible to allow the wearer Wr to view the target object more clearly through the first region V1 where a finite set distance is set.

In the ophthalmic lens according to the present modified example, if the sum of the prescription-specific spherical power and half of the prescription-specific astigmatism power of the ophthalmic lens LS is denoted by Se, C(h, $\phi$0e)<C(h, $\phi$0e−180°) when Se is positive and C(h, $\phi$0e)>C(h, $\phi$0e−180°) when Se is negative. Thereby, it is possible to provide an aberration-balanced ophthalmic lens LS in which the residual astigmatism is more suitably corrected regardless of the prescription power in the lower portion of the ophthalmic lens used for near vision than in the upper portion of the ophthalmic lens used for far vision.

Modified Example 2

In the above-described embodiment, the ophthalmic lens LS was designed using a left-right asymmetrical distance distribution D1. However, when the power of left-right asymmetry in the optical characteristics of the ophthalmic lens is high, the wearer Wr may feel uncomfortable immediately after wearing the ophthalmic lens. In the distance distribution D1 in the above-described embodiment, because the set distance is set left-right asymmetrically, the wearing feeling is likely to deteriorate if the set distance between two or more first regions V1 is extremely different. From this point of view, such a possibility can be reduced by setting the region corresponding to the first region V1C on both sides.

Figure 15:
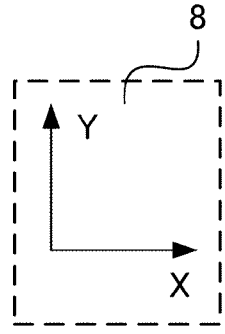
FIG. 15 is a diagram showing an example of a distance distribution according to a modified example.

FIG. 15 is a conceptual diagram showing the distance distribution D2 of this modified example. The distance distribution D2 includes a first region V1A1, a first region V1B1, a first region V1C, a first region V1D, a second region V2*h*, a second region V2*i*1, a second region V2*j*, a second region V2*k*, and a second region V2*l*.

The first region V1D, the second region V2*k*, and the second region V2*l* are formed at positions line-symmetrical to a straight line Ly as an axis extending in the vertical direction through the fitting point FP with respect to the first region V1C, the second region V2*j*, and the second region V2*h*. The set distances in the first region V1D, the second region V2*k*, and the second region V2*l* are also preferably set line-symmetrically with respect to the straight line Ly as the axis. In particular, it is preferable that the set distance of the first region V1D be set to be the same as or substantially the same as the set distance of the first region V1C.

Preferably, the first region V1A1, the first region V1B1, and the second region V2*i*1 have positions, forms, and set distances similar to those of the first region V1A, the first region V1B and the second region V2*i* of the above-described embodiment, except that the first region V1A1, the first region V1B1, and the second region V2*i*1 are based on the first region V1A, the first region V1B and the second region V2*i* of the above-described embodiment and some regions are set to the first region V1D, the second region V2k, and the second region V2l.

It is preferable that the X coordinate x3 at the left end and the X coordinate x4 at the right end of the second region V2k have the same absolute values or be substantially the same as the X coordinate x2 at the right end and the X coordinate x1 at the left end of the second region V2j, respectively. It is preferable that the Y coordinates at the upper and lower ends of the second region V2l be the same as or substantially the same as the Y coordinate y1 at the upper end and the Y coordinate y2 at the lower end of the second region V2h, respectively.

It is preferable to use the same distance distribution data for both the left eye lens and the right eye lens in the ophthalmic lens LS.

In the ophthalmic lens design method of the present modified example, the first region V1 for viewing the same target object based on the purpose such as golf is set on the left side of the left eye lens, the left side of the right eye lens, and the right side of the left eye lens, and the right side of the right eye lens and the first region V1C set on the left side and the first region V1D set on the right side are at left-right symmetrical positions. Thereby, it is possible to reduce the discomfort due to the asymmetry in the left-right direction when the ophthalmic lens LS has been worn.

Modified Example 3

Although a boundary between regions including the plurality of first regions V1 and the plurality of second regions V2 extends in the X-axis direction or the Y-axis direction in the distance distribution in the above-described embodiment, the boundary between the regions can be configured to extend in any direction.

Figure 16:
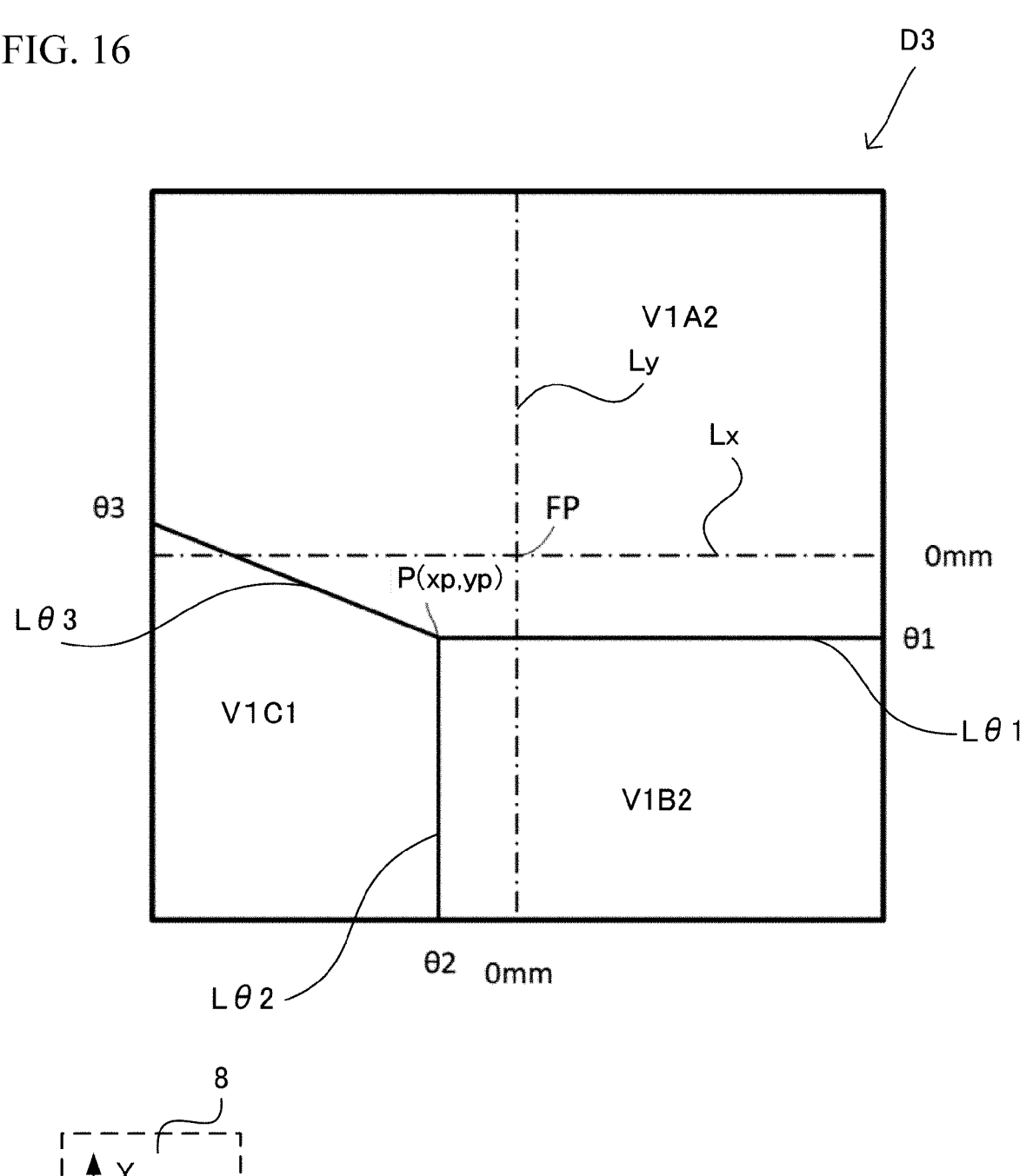
FIG. 16 is a diagram showing an example of a distance distribution according to a modified example.

FIG. 16 is a conceptual diagram showing a distance distribution D3 of the present modified example. The distance distribution D3 includes a first region V1A2, a first region V1B2, and a first region V1C1. The first region V1A2 is a region for far vision during golf and a set distance is set as in the above-described first region V1A. The first region V1B2 is a region for gazing at the ball B at addressing or the like and a set distance is set as in the above-described first region V1B. The first region V1C1 is a region for viewing the cup Cp or the turf at the time of putting and the set distance is set as in the above-described first region V1C.

Regions in the distance distribution D3 is defined by boundary lines L$\theta$1, L$\theta$2, and L$\theta$3 extending radially from a point P in the distance distribution D3. The X coordinate of the point P is denoted by xp and the Y coordinate of the point P is denoted by yp. Hereinafter, a reference direction when angles of the boundary lines L$\theta$1, L$\theta$2, and L$\theta$3 are defined will be the positive direction of the X-axis (a right direction in FIG. 11). The angle is 0° in the reference direction and the angle is positive in the counterclockwise direction. The first boundary line L$\theta$1 between the first region V1A2 and the first region V1B2 extends from the point P in the direction of the first angle $\theta$1. The second boundary line L$\theta$2 between the first region V1B2 and the first region V1C1 extends from the point P in the direction of the second angle $\theta$2. The third boundary line L$\theta$3 between the first region V1C1 and the first region V1A2 extends from the point P in the direction of the third angle $\theta$3.

At least one of the coordinates x1 and y1 of the point P, the first angle $\theta$1, the second angle $\theta$2, and the third angle $\theta$3 may be a variable value or a fixed value. When these values are fixed values, they can be set as follows. When these values are variable values, they can be set on the basis of the characteristics of the wearer Wr from the similar point of view.

The first boundary line L$\theta$1 is taken into account. If there is distortion in the visual field when the visual line moves in the upward-downward direction from the vicinity of the fitting point FP in the first region V1A2, an error occurs in spatial recognition up to the cup Cp and is not desirable. Thus, the first boundary line L$\theta$1 needs to be substantially horizontal and the first angle $\theta$1 is preferably 0°. Also, because the Y coordinate yp of the point P is preferably between y3 and y4 of the above-described embodiment, it is set to −7 mm, which corresponds to, for example, y4.

The second boundary line L$\theta$2 is taken into account. As in the above-described embodiment, the visual line may shift from the ball B to the cup Cp during putting and the distortion of the visual field at this time is preferably low. Accordingly, it is preferable that the set distance be not substantially changed in the vertical direction (the Y-axis direction) in the vicinity of the second boundary line L$\theta$2 and it is preferable that the second angle $\theta$2 not be more preferably 270°. Also, because the X coordinate xp of the point P is preferably between x1 and x2 of the above-described embodiment, for example, it is set to −7 mm corresponding to x1 which is the right end of the first region V1C.

The third boundary line L$\theta$3 is taken into account. It is desirable to widen the first region V1C1 for viewing a wide range from the ball B to the cup Cp or the target object in the direction in which the ball B is hit that is arbitrarily determined at the time of putting. However, as in this modified example, priority is given to securing the first region V1A2 widely and the distance distribution D3 may be configured such that the region A roughly includes a position of 45 degrees on the left side, which is the visual field angle corresponding to the left end of the stable gazing field. In this case, the first angle $\theta$3 can be 160 degrees.

The second region V2 is not set in the distance distribution D3. When a difference between the set distances of two adjacent first regions V1 is relatively small as in the distance distribution D3 and does not exceed, for example, 1 D, it can be ignored because an influence on the lens optimization design is small even if the second region V2 is not provided. Also, in the present modified example, an example is in which the shape of the first region V1 is determined by determining the first angle $\theta$1, the second angle $\theta$2, and the third angle $\theta$3 is shown. That is, the shape of the first region V1 can be changed by changing the first angle $\theta$1, the second angle $\theta$2, and the third angle $\theta$3 to different angles. Alternatively, the shape of the first region V1 may be changed in another method of changing the angle of the boundary line such as changing the coordinates of the point P.

Also, the first angle $\theta$1, the second angle $\theta$2, and the third angle $\theta$3 can be appropriately changed on the basis of an eye characteristic such as a position of a rotation point of the wearer Wr, a position of a target object assumed for the purpose of the ophthalmic lens LS, a priority level of the appearance of the target object, or wearing parameters such as a model and a forward tilt angle of the ophthalmic lens LS. For example, the first angle $\theta$1 and the second angle $\theta$2 are set in a range in which a value of −20° to +200 or −10° to +10° is added from the values exemplified above, such that the apparent deviation of the first angle $\theta$1 and the second angle $\theta$2 due to a forward tilt angle and a camber angle of the ophthalmic lens LS can be corrected. Further, the third angle $\theta$3 can be set in a range in which a value of −70° to +20° is added from the values exemplified above and therefore it is possible to cope with a change in the priority levels of the first regions V1A2 and V1C1.

Modified Example 4

Although the case where the wearer Wr plays golf is used as the purpose of the ophthalmic lens LS in the above-described embodiment, the case where the wearer Wr rides a bicycle may be used as the purpose of the ophthalmic lens LS. In particular, when the wearer Wr rides a bicycle for a bicycle race, it is effective and preferable to use the ophthalmic lens LS for that purpose.

The following modified example associated with the bicycle is similar to the case where the wearer Wr rides a motorcycle and can be applied to a two-wheeled vehicle including a bicycle and a two-wheeled vehicle.

Figure 17:
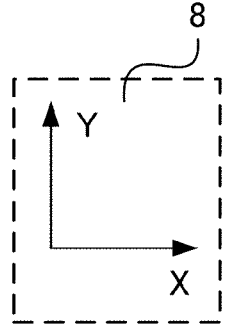
FIG. 17 is a diagram showing an example of a distance distribution according to a modified example.

FIG. 17 is a conceptual diagram showing a distance distribution D4 of the present modified example. The distance distribution D4 includes a first region V1A3, a first region V1B3, and a second region V2i2. A fitting point FP is arranged in the second region V2i2.

Here, it is assumed that the purpose of the ophthalmic lens LS is for riding a bicycle that travels at a relatively high speed such as a road bike (called a road racer in Japan or the like). In a race using such a bicycle, a bicycle instrument called a cycle computer that displays the traveling state of the bicycle such as a position, a traveling distance, or a speed of the own vehicle using a GPS device is normally directly fixed to the handlebar of the bicycle or the vicinity of the handlebar such as a support column for the bicycle connected to the handlebar by a fixing band or the like or fixed via a holder for mounting an instrument or the like. As the instrument, a dedicated product or a mobile terminal (a smartphone or the like) equipped with a GPS device is used. During traveling, the racer of the bicycle race moves his/her visual line to the handlebar where the instrument is placed in a timely and instantaneous manner while gazing at the front of 10 m or more, reads the display, and returns the visual line to the front. Consequently, if the aberration characteristics of the ophthalmic lens LS are poor when the instrument is viewed, a process of reading the instrument is time-consuming and therefore an accident due to carelessness in the forward direction may be caused. Accordingly, it is preferable to provide the ophthalmic lens LS that can obtain visual acuity for reading information for a period of time that is short if at all possible.

When the wearer Wr rides a motorcycle for the purpose of the ophthalmic lens LS, the instrument for displaying the traveling state includes a speedometer and the like that are pre-installed on the motorcycle. Places where the instrument is installed also include a support column and a meter panel for fixing the built-in speedometer and the like.

The first region V1A3 is a region for a bicycle racer wearing the ophthalmic lens LS to view far ahead of the visual field. When riding a road bike type bicycle, the wearer Wr is in a forward-leaning posture, such that the wearer Wr views far away through the region further above the fitting point of the ophthalmic lens. From the posture of the racer when he/she rides a bicycle, the position on the eyeglass lens for viewing a target having a refractive power of 0.1 D (10 m), which can be regarded as almost infinity, was investigated. As a result, it was found that a position at a distance of about 2 mm or more upward from the fitting point of the ophthalmic lens was used. Consequently, it is preferable to set the Y coordinate y10 at the lower end of the first region V1A3 to about 2 mm. The set distance of the first region V1A3 can be set to a value in a range of 0 D to 0.1 D or the like for far vision and 0 D is preferred.

Also, it is desirable that a center of gravity CM of a region V100 included in a circle C100 having a radius of 30 mm centered on the fitting point FP in the first region V1A3 be arranged above the fitting point FP. In this case, the first region V1A3 is not limited to the mode shown in FIG. 17 and may include the fitting point FP.

The first region V1B3 is a region for viewing the handlebar or an instrument for displaying the traveling state of the bicycle arranged near the handlebar. It is preferable that the entire region of the first region V1B3 be arranged below the fitting point FP. From the posture of the racer when he/she rides a bicycle, the distance from the eye to the instrument and the downward rotation angle were investigated. As a result, the distance from the eye to the instrument was 25 cm at the shortest or was approximately in a range of 30 cm to 50 cm and the downward rotation angle was often 25 degrees or more. Assuming that the ophthalmic lens LS is a thin parallel flat plate and the distance from the posterior apex of the ophthalmic lens LS to the center of rotation of the eyeball is 25 mm, the downward rotation angle of 25 degrees corresponds to about −12 mm in the coordinate system of FIG. 17. Accordingly, the Y coordinate y20 at the upper end of the first region V1B3 is preferably about −12 mm. The refractive power corresponding to the set distance of the first region V1B3 is preferably 4 D corresponding to 25 cm in the shortest case or between 3.3 D corresponding to approximately 30 cm and 2 D corresponding to 50 cm.

The second region V2i2 is arranged between the first region V1A3 and the first region V1B3. The set distance of the second region V2i2 is set such that the set distance of the first region V1A3 and the set distance of the first region V1B3 are linearly connected or smoothly connected using any mathematical formula.

The setting of aberration balance in the present modified example is taken into account. For the first region V1A3, an aberration balance that reduces the adverse effects of the residual refractive index and residual astigmatism is desirable as in the case of a normal single-focus ophthalmic lens. For the first region V1B3, when the accommodation power for the wearer Wr is sufficiently high, an aberration balance for emphasizing a process of maintaining sufficiently small astigmatism is desirable. Specifically, when the focus can be adjusted from 25 cm or 30 cm to 50 cm, which is the set distance of the first region V1B3, using about half of the accommodation power, the accommodation power is sufficient and the focus can be adjusted quickly. Accordingly, an aberration balance for emphasizing a process of maintaining small residual astigmatism as described above is desirable.

However, when the accommodation power for the wearer Wr is weak accordingly, a process of staring at and determining the display of the instrument is time-consuming because it is necessary to make extra adjustments by an amount of shift if the residual refractive power shifts to the negative side. Consequently, in this case, it is desirable to have an aberration balance for emphasizing a process of limiting the shift of the residual refractive power to the negative side by limiting the residual astigmatism.

Actually, the aberration in the ophthalmic lens tends to increase as the distance from the fitting point FP increases. Accordingly, in a plurality of first regions V1, it is preferable to compare aberration values at positions where the magnitudes of the rotation angles taken from the straight lines passing through the rotation points and the fitting point FP are the same when the design rotation point is designated as the center. The rotation angle can be taken in any direction with respect to the above straight line. For example, because the residual refractive power tends to be on the negative side in an ophthalmic lens for hyperopia correction in which the spherical power has a positive value, it is desirable to adjust the aberration balance on the basis of the prescription of the wearer Wr. More preferably, in the first region V1B3 where a finite set distance is set at positions where rotation angles are the same, it is preferable to set the target residual refractive power to a value on the more negative side than in the first region V1A3 where the set distance is set to infinity.

Furthermore, if the accommodation power for the wearer Wr is too small to adjust a focus from 25 cm or 30 cm to 50 cm, it is preferable to design the ophthalmic lens LS as a progressive refractive power-specific ophthalmic lens for both far and near visions with the set addition power. As described above, the present modified example can be applied to the progressive refractive power-specific ophthalmic lens.

In the ophthalmic lens design method of the present modified example, the purpose of the ophthalmic lens LS is to ride a two-wheeled vehicle and the center of gravity CM of the region V100 included in the range of a radius of 30 mm centered on the fitting point FP of the first region V1A3 in which the set distance is set to an infinite distance among a plurality of first regions V1 is arranged above the fitting point FP of the ophthalmic lens LS. The set distance is set in a range of 25 cm to 50 cm and the entire region of the first region V1B3 for viewing the instrument for displaying the traveling state of the two-wheeled vehicle arranged near the handlebar is arranged below the fitting point FP. Thereby, when the wearer Wr rides a two-wheeled vehicle, the wearer Wr can clearly view the target object through the ophthalmic lens LS.

In the ophthalmic lens design method of the present modified example, in the first region V1B3 where a finite set distance is set at positions where the magnitudes of the rotation angles taken from the straight lines passing through the design rotation points and the fitting point FP in the ophthalmic lens LS are the same, the target residual refractive power can be set to a larger value on the positive side than in the first region V1A3 where the set distance is set to an infinite distance. Thereby, it is possible to more reliably provide an ophthalmic lens in which the wearer Wr can clearly view the target object through the first region V1 in which a finite set distance is set.

Modified Example 5

In the above-described Modified Example 4, the first region V1 for lateral or rear confirmation may be further set. The present modified example can also be applied to two-wheeled vehicles including motorcycles as well as bicycles.

FIG. 18 is a conceptual diagram showing a distance distribution D5 according to a modified example. The distance distribution D5 includes a first region V1A3, a first region V1B4, a first region V1C2, a first region V1D1, a second region V2h1, a second region V2i3, a second region V2j1, a second region V2k1, and a second region V2l1.

The first region V1C2 is a region for viewing bicycles traveling in parallel to the left or diagonally rear left of the wearer Wr. The first region V1D1 is a region for viewing a bicycle traveling in parallel to the right or diagonally rear right of the wearer Wr. The wearer Wr can move his/her head or eyeball as appropriate to view laterally or diagonally backward through the first region V1C2 or the first region V1D1.

Because it is natural to use a height equal to that of the fitting point FP of the ophthalmic lens LS at the time of viewing in a directly horizontal direction, it is preferable that Y coordinates y30 at the upper ends of the first region V1C2 and the first region V1D1 be 0 mm or more that is a height equal to that of the fitting point FP. For example, y30 is set to 0 mm. Here, when the distance to the bicycle traveling parallel in a directly horizontal direction is 1 m and the height of the eyeball or the height of the ophthalmic lens LS is 1.5 m, a position where the tire of the bicycle traveling parallel touches the ground is assumed to be viewed through the first region V1C2 or the first region V1D1. In this case, a lateral component of the rotation angle of the eyeball when the position is instantaneously viewed only by the eye movement is at about 34 degrees. Assuming that the ophthalmic lens LS is a thin parallel flat plate, the distance from the posterior apex of the ophthalmic lens LS to the center of rotation of the eyeball is 25 mm and it is preferable that the X coordinate x10 at the right end of the first region V1C2 be −17 mm and the X coordinate x40 at the left end of the first region V1D1 be 17 mm if this rotation angle is converted into the X coordinate in the ophthalmic lens LS. The wearer Wr can view through the portion below the fitting point FP in the first region V1C2 and the first region V1D1 at the time of turning diagonally backward.

Because a distance from the ophthalmic lens LS at a height of 1.5 m to a position where the tire of the bicycle traveling parallel in a directly horizontal direction at a distance of 1 m touches the ground is 1.8 m, the refractive power corresponding to the set distances of the first region V1C2 and the first region V1D1 can be set to 0.6 D corresponding to the distance.

The second region V2h1 is a region arranged between the first region V1A3 and the first region V1C2. The set distance of the second region V2h1 is set such that the set distance of the first region V1A3 and the set distance of the first region V1C2 are linearly connected or smoothly connected using any mathematical formula. The second region V2l1 is a region arranged between the first region V1A3 and the first region V1D1. The set distance of the second region V2l1 is set such that the set distance of the first region V1A3 and the set distance of the first region V1D1 are linearly connected or smoothly connected using any mathematical formula.

The second region V2j1 is a region arranged between the first region V1C2 and the second region V2h1 and the second region V2i3 and the first region V1B4. The second region V2k1 is a region arranged between the first region V1D1 and the second region V2l1 and the second region V2i3 and the first region V1B4. The set distance of the second region V2j1 and the set distance of the second region V2k1 are set such that set distances of portions in contact with the second region V2l1 or the second region V2k1 among the first regions V1 and the second regions V2 facing left and right across the second region V2j1 or the second region V2k1 are connected linearly or smoothly connected using any mathematical formula.

The first region V1B4 is set like the first region V1B3 (FIG. 17) except that the range is narrowed because the first region V1C2, the second region V2j1, the first region V1D1, and the second region V2k1 are set. The second region V2i3 is set like the second region V2i2 (FIG. 17) except that the range is narrowed because the first region V1C2, the second region V2j1, the second region V2h1, the first region V1D1, the second region V2k1, and the second region V2l1 are set. If the widths of the first region V1B4 and the second region V2i3 in the X-axis direction become excessively narrow, this is not desirable because the appearance of the instrument changes just by shaking the head slightly from side to side and the feeling of wearing is adversely affected. Accordingly, assuming that the swing angle of the head to the left and right is in a range of −25 degrees to 25 degrees with a margin, the X coordinate x20 at the left end of the first region V1B4 can be set to −12 mm, and the X coordinate x30 at the right end thereof can be set to 12 mm.

The distance distribution D5 has a larger number of parameters that can be set variably than the distance distribution D4 (FIG. 17). Consequently, the ophthalmic lens LS designed using the distance distribution data corresponding to the distance distribution D5 can be set to have a grade higher in price and superior in performance than the ophthalmic lens LS designed using the distance distribution data corresponding to the distance distribution D4.

The aberration balance when the ophthalmic lens LS using the distance distribution D5 is designed is taken into account. For the first region V1A3 and the first region V1B4, the aberration balance can be set as in the above-described Modified Example 4. When a bicycle traveling parallel is viewed through the first region V1C2 and the first region V1D1, it is not always necessary to be able to view clearly. However, it is not preferable to have a double image due to visual field distortion or impossible binocular vision or a double image due to chromatic aberration so that the relative position of the bicycle from oneself can be correctly recognized. These problems are likely to occur in a portion (a peripheral portion) close to the frame in an ophthalmic lens having high prescription power. Therefore, in the range of the equivalent spherical power from −6 D to +6 D as the range where the prescription power is not so strong, it is preferable to set the aberration balance by emphasizing the correction of the residual astigmatism that affects the image distortion more than the correction of the residual refractive power. When the prescription power exceeds this range and becomes stronger, it is desirable to perform a design process such that distortion is limited.

Modified Example 6

The aberration in the ophthalmic lens LS, i.e., the residual refractive power and the residual astigmatism, is usually best in the vicinity of a prism reference point through which the optical axis passes, and increases as the distance from this position increases. Consequently, when the optical axis of the ophthalmic lens LS passes through the fitting point FP, it is not possible to eliminate all the aberrations in the peripheral portion of the lens even if the aberration balance is taken into account in any method. On the other hand, if the optical axis of the ophthalmic lens LS is set to pass through a position different from the fitting point FP by performing a process of tilting at least one of the object-side surface and the eyeball-side surface of the ophthalmic lens LS or the like and causing intentional eccentricity, it is possible to make the aberration of the light ray passing near the position where the shifted optical axis and the ophthalmic lens LS intersect relatively suitable. The optical axis here is a straight line that coincides with the normal line of the object-side surface at the prism reference point set on the object-side surface at the time of design. Apart from this, the straight line passing through the prism reference point set on the object-side surface at the time of design and the design rotation point is referred to as an apparent optical axis here.

Figure 19:
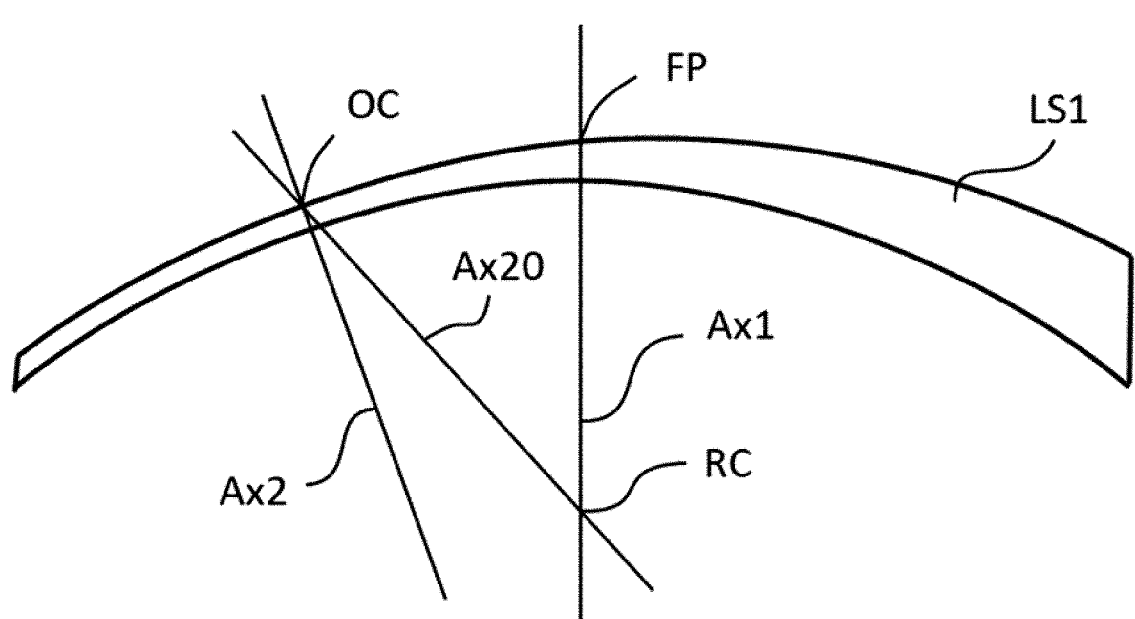
FIG. 19 is a conceptual diagram showing a position of an apparent optical axis of an ophthalmic lens according to a modified example.

FIG. 19 is a conceptual diagram for describing that the apparent optical axis of the ophthalmic lens is shifted from the fitting point FP and schematically shows a cross section of an ophthalmic lens LS1. In FIG. 19, the original optical axis Ax1 before shifting, which passes through the rotation point RC and the fitting point FP of the eyeball in the worn state assumed at the time of design, is shown. In the ophthalmic lens LS1 of FIG. 19, the object-side surface is set to a position where rotation is made in a counterclockwise direction with respect to the fitting point FP on the object-side surface relative to the eyeball-side surface. Thereby, a point OC on the object-side surface different from the fitting point FP becomes the prism reference point and the normal line of the object-side surface at the point OC becomes a new optical axis Ax2. A straight line passing through the point OC and a rotation point RC becomes the apparent optical axis Ax20. Thereby, it is possible to perform a design process such that the residual astigmatism is generally minimized in the vicinity of the point OC and the light ray passing through the rotation point RC. In the ophthalmic lens LS1 in which at least one surface is eccentric in this way, the residual astigmatism can be maximized in the vicinity of the point OC through which the apparent optical axis Ax20 passes. Hereinafter, the point OC will be referred to as the apparent optical axis passing point OC. It is preferable to set an apparent optical axis passing point OC at a similarly shifted position on both the left eye lens and the right eye lens of the ophthalmic lens LS1.

FIG. 20 is a conceptual diagram showing an example of the position of the apparent optical axis passing point OC1 when the ophthalmic lens LS1 has been designed using the distance distribution data corresponding to the distance distribution D1 (FIG. 2). The apparent optical axis passing point OC1 of the ophthalmic lens LS1 is arranged at a position at the height of the fitting point FP in the first region V1C. By designing the ophthalmic lens LS1 for golf by setting the apparent optical axis passing point OC1 in the first region V1C using the distance distribution D1, a better visual field can be obtained when the cup Cp or a target object determined in a direction in which the ball B is hit through the vicinity of the apparent optical axis passing point OC1 of the ophthalmic lens LS1 during putting is viewed.

Also, the apparent optical axis passing point OC1 may be set in the first region V1B. In this case, a better visual field can be obtained when the ball B is viewed through the ophthalmic lens LS1 at the time of addressing or the like. The apparent optical axis passing point OC1 can be arranged in the first region V1 or the second region V2 and is preferably set in a region different from a region where the fitting point FP is arranged from a viewpoint in which a better visual field is obtained through the set region.

However, if the optical axis of the ophthalmic lens LS1 is shifted from the original optical axis in this way, high prism power different from that of the prescription may occur at the fitting point FP of the ophthalmic lens LS1. In particular, when the prism power difference between one eye and the other eye is considered, it is not preferable that a difference between the left and right prism powers at the prescription value be different from a difference between the left and right prism powers at the fitting point FP of the ophthalmic lens LS1. Therefore, by correcting the prism amount of at least one ophthalmic lens LS and intentionally shifting it from the prescription-specific prism power, the difference between the left and right prism powers can be eliminated. Thereby, it is possible to provide an ophthalmic lens LS1 that satisfies a left-right difference of the prescribed prism amount while shifting the apparent optical axis of the ophthalmic lens LS to a substantially desired position and limits the deterioration of the wearing feeling due to the difference in the prism amount.

The ophthalmic lens design method of the present modified example includes designing the ophthalmic lens LS1 such that the apparent optical axis of the ophthalmic lens LS1 passes through a first region V1 or a second region V2 different from the first region V1 or the second region V2 where the fitting point FP is arranged. Thereby, the wearer Wr can obtain a better visual field at the time of viewing through the region where an apparent optical axis passing point OC is set.

Modified Example 7

Even if the ophthalmic lens LS1 is intended for the wearer Wr to ride a two-wheeled vehicle, the apparent optical axis passing point OC may be set at a position different from the fitting point FP.

FIG. 21 is a conceptual diagram showing an example of a position of an apparent optical axis passing point OC2 when the ophthalmic lens LS1 is designed using the distance distribution data corresponding to a distance distribution D5 (FIG. 18). The apparent optical axis passing point OC2 of the ophthalmic lens LS1 is arranged in a first region V1A3. The position of the apparent optical axis passing point OC2 in the left-right direction is similar to the X coordinate of the fitting point FP (X=0). When riding a bicycle such as a road bike in a bicycle race or the like, the wearer Wr spends the longest time for viewing forward by turning his/her eyes upward while taking a forward-leaning posture. Therefore, the height of the apparent optical axis passing point OC2 can be set such that the visual line when the wearer Wr takes such a forward-leaning posture passes through the apparent optical axis passing point OC2. Alternatively, the height of the apparent optical axis passing point OC2 may be statistically calculated and set from the visual line direction when a bicycle racer or a general person takes a forward-leaning posture while riding a bicycle. By setting the apparent optical axis passing point OC2 in the first region V1A3 using the distance distribution D5 and designing the ophthalmic lens LS1 for a two-wheeled vehicle, a better visual field can be obtained at the time of viewing forward through the vicinity of the passing point OC2 when the bicycle racer or the like rides a two-wheeled vehicle such as a road bike.

Also, the apparent optical axis passing point OC2 can be appropriately applied to any distance distribution. For example, even in the case of the distance distribution D4 in FIG. 12, a setting process can be performed by shifting the apparent optical axis passing point from the point FP as in the present modified example.

Modified Example 8

Although the case where the wearer Wr plays golf or performs a bicycle race is the purpose of the ophthalmic lens LS in the above-described embodiment, a case where the wearer Wr rides in a car may be used as the purpose of the ophthalmic lens LS. In particular, it is preferable that a case where the wearer Wr drives a car be set as the purpose of the ophthalmic lens LS.

FIG. 22 is a conceptual diagram showing a distance distribution D6 according to the present modified example. In the distance distribution D6, the case where the wearer Wr drives a right-hand steering wheel vehicle is assumed. The ophthalmic lens LS for driving a left-handed vehicle can be designed using distance distribution data corresponding to the distance distribution D6 and a bilaterally symmetric distance distribution with respect to a straight line Ly of the vertical direction passing through the fitting point FP.

The distance distribution D6 includes a first region V1A4, a first region V1B5, a first region V1C3, a first region V1D2, a first region V1E, a second region V2m, and a second region V2n. A Y coordinate y100 at the lower end of the first region V1E, a Y coordinate y200 at the upper end and a Y coordinate y300 at the lower end of the first region V1A4, Y coordinates y400 at the upper ends of the first regions V1C3, V1B5, and V1D2, and an X coordinate x100 at the left end and an X coordinate x200 at the right end of the first region V1B5 are parameters that can be set as variable values.

The first region V1A4 is a region for viewing forward at the time of driving. A fitting point FP is arranged in the first region V1A4. Accordingly, the Y coordinate y300 at the lower end of the first region V1A4 is set to a value smaller than 0. In the example of FIG. 22, y300 is set to −2 mm. The refractive power corresponding to a set distance of the first region V1A4 is set to 0 D corresponding to infinity.

The first region V1B5 is a region for appropriately instantaneously viewing instruments such as a speedometer and a monitor of a navigation system (a car navigation system) during driving. When viewing these, the driver needs to move the visual line only by the rotational movement of the eyeball, and immediately return the visual line to the front after viewing. Accordingly, it is desirable that the size of the first region V1B5 be set such that they can be viewed only by the rotational movement of the eyeball.

Inside the first region V1B5, an instrument region sm and a monitor region ns are set. The instrument region sm and the monitor region ns are regions where the visual line passes through the ophthalmic lens LS when the driver views the monitor of the instrument and the navigation system only by the rotational movement of the eyeball, respectively. A set distance of the first region V1B5 is preferably set by an average value of the distance from the driver's eye to the center of the instrument and the distance from the driver's eye to the monitor of the navigation system. However, the average value of the distances corresponds to a value obtained as a reciprocal of a value obtained by carrying out an arithmetic averaging operation after reciprocals (refractive powers) of the distances are obtained. For example, 1.7 D corresponding to 60 cm can be set as a representative value.

The first region V1C3 is a region for viewing the outside of the car and the side mirror on the left side through the window on the left side of the driver's seat of the right-hand steering wheel at the time of driving. To view the left side mirror through the ophthalmic lens LS, it is necessary to rotate the eye normally by turning the head to the left such that the side mirror is included at the left end of the visual field passing through the binocular ophthalmic lens LS. A left mirror region sl of the first region V1C3 is a region where the visual line passes through the ophthalmic lens LS when the left side mirror is viewed at the left end of the ophthalmic lens LS. It is preferable to set the X coordinate x100 of the boundary line at the right end of the left mirror region sl such that the left mirror region sl is included in the first region V1C3. However, when the left mirror region sl and the monitor region ns overlap, the X coordinate x100 at the right end of the first region V1C3 is set with priority given to the size of the first region V1B5 including the monitor on which fine characters are displayed and the like. X coordinates x100 at the right end of the first region V1C3 and at the left end of the first region V1B5 can be, for example, −20 mm. Because the left side mirror is a convex mirror, the refractive power corresponding to the set distance of the first region V1C3 is set to 0.5 D corresponding to 2 m on the basis of its curvature and position. This value is a value obtained by assuming that a target object at infinity reflected by a convex mirror having refractive power equivalent to −2 D (a focal length equivalent to −50 cm) at a distance of 1.5 m from the ophthalmic lens LS is viewed.

The first region V1D2 is a region for viewing the outside of the car and the side mirror on the right side through the window on the right side of the driver's seat of the right-hand steering wheel at the time of driving. A right mirror region sr inside of the first region V1D2 is a region where the visual line passes through the ophthalmic lens LS when the right-side mirror is viewed with the ophthalmic lens LS. To view the right-side mirror through the ophthalmic lens LS, it is possible to either just rotate the eye or include the side mirror at the right end of the visual field through the ophthalmic lens LS by turning the head slightly to the right. Thus, it is preferable to set an X coordinate x200 of the boundary line between the first region V1D2 and the first region V1B5 such that the right mirror region sr is arranged at the right end of the visual field through the binocular ophthalmic lens LS or at a position slightly closer to the center from the right end. For example, the X coordinate x200 can be set at a position between the instrument region sm and the right mirror region sr and x200 is set to 15 mm in the example of FIG. 22. Because the right-side mirror is a convex mirror, the refractive power corresponding to the set distance of the first region V1D2 can be set to 0.8 D corresponding to 1.2 m on the basis of its curvature and position. This value is a value obtained by assuming that a target object at an infinite distance reflected by a convex mirror with refractive power (a focal length corresponding to −50 cm) corresponding to −2 D (a focal length corresponding to −50 cm) at a distance of 0.7 m from the ophthalmic lens LS is viewed.

The first region V1E is a region for viewing a rear-view mirror (a room mirror). A rear-view mirror region bm arranged inside of the first region E is a region where the visual line passes through the ophthalmic lens LS when the rear-view mirror is viewed with the ophthalmic lens LS. When the rear-view mirror is a plane mirror, the set distance of the first region V1E can be set to an infinite distance and the region from the first region V1E to the first region V1A4 can be one connected first region V1. When the rear-view mirror is a convex mirror, the refractive power corresponding to the set distance of the first region V1E can be set to 1 D corresponding to 1 m on the basis of its curvature and position. This value is a value obtained by assuming that a target object at an infinite distance reflected by a convex mirror having refractive power corresponding to −2 D (a focal length corresponding to −50 cm) at a distance of 0.5 m from the ophthalmic lens LS is viewed. Alternatively, when the rear-view mirror is a device composed of a camera such as a back camera and a monitor instead of a mirror, the refractive power corresponding to the distance from the driver's eyes to this monitor can be set to 2 D corresponding to, for example, 50 cm. The Y coordinate y100 at the lower end of the first region V1E is set to the Y coordinate at the lower end of the rearview mirror region bm and the Y coordinate y200 at the lower end of the second region V2n arranged between the first region V1E and the first region V1A4 is set as a value that is less than y100 by 3 mm. At this time, a change rate of the set distance in the second region V2n is 0.66 D/mm.

Because a difference between the set distance of the first region V1A4 and the set distance of the first region V1B5 is often relatively large, it is preferable to set the second region V2m between the first region V1A4 and the first region V1B V2m as shown in FIG. 22. The second region V2m is connected to the first regions V1C3, V1B5, and V1D2 so that the pattern of the distance distribution D6 is simplified. Accordingly, it is preferable that Y coordinates y400 at the upper ends of the first region V1C3, V1B5, and V1D2 are positions at the uppermost ends of the left mirror region sl, the monitor region ns, the instrument region sm, and the right mirror region sr. In the example of FIG. 22, y400 is set to −5 mm.

Although the set distances and variable values of the first region V1 and the second region V2 in the above-described distance distribution D6 are representative values, the present invention is not limited to the above values and it is desirable to set them to more suitable values. For example, because the position of a target object such as an instrument differs according to a vehicle type, it is possible to obtain information of the position of the target object from a vehicle manufacturer and set a representative value to a variable value for each type of vehicle in advance. Also, because an optimum value varies with the physique of the driver who is the wearer Wr, a representative value may be calculated from information about a body such as a standing height, a sitting height, an arm length, or a foot length of the wearer Wr and information about a position of a target object for each vehicle type. Furthermore, when a test-driving process for a type of car similar to the car to be purchased at a car dealership is performed, any visual line measurement device may measure a region where the ophthalmic lens is used when the target object is viewed and set a representative value on the basis of the region. When a car owned by the wearer Wr is driven, the visual line measurement device may obtain information about the visual line of the wearer Wr during driving as described above.

The aberration balance when the ophthalmic lens LS is measured using the distance distribution D6 is considered. If a difference in a visual acuity value of the wearer Wr between bright and dark places is absent or substantially absent with respect to the first region V1A4, it is desirable to have an appropriate aberration balance such that he/she can relax and see without using accommodation power and an influence of the residual refractive power and the residual astigmatism on the wearing feeling is minimized. An appropriate aberration balance is, for example, an aberration balance for minimizing vision clarity expressed as a value obtained by taking the square root of the sum of the square of the residual refractive power and the square of half of the residual astigmatism. However, when there is a difference in the visual acuity value between the light and dark places of the wearer Wr such that it is especially common when the wearer Wr is middle-aged or older, it is desirable to set prescription power such that a large visual acuity value is obtained in the dark place and have an aberration balance for reducing the residual refractive power from this prescription power.

It is desirable to form a focus more smoothly and more instantaneously with respect to the target object viewed through the first region V1B5. Accordingly, in the case of young people with sufficient accommodation power, it is desirable to have an aberration balance for emphasizing a process of sufficiently minimizing residual astigmatism such that the focus can be formed quickly and clearly. On the other hand, a case where the accommodation power is not so sufficient is taken into account. If the residual refractive power shifts to the negative side, it takes time to stare because it will be necessary to make extra adjustments accordingly. Accordingly, in this case, it is desirable to have an aberration balance for emphasizing a process of limiting the shift of the residual refractive power to the negative side rather than a process of limiting the residual astigmatism. In reality, because the residual refractive power tends to shift to the negative side in an ophthalmic lens for hyperopia correction in which the spherical power is a positive value, it is desirable to adjust the aberration balance on the basis of the prescription for the wearer Wr. Furthermore, when the accommodation power for the wearer Wr is too low to focus on a target object at a distance of 30 cm to 50 cm from the wearer Wr, it is necessary to use the progressive refractive power-specific ophthalmic lens for both far and near visions or the like with addition power set to compensate the accommodation power.

In relation to the first region V1C3 and the first region V1D2, because it is only necessary to know the presence of other vehicles, pedestrians, obstacles or the like outside of the vehicle through the left and right windows with respect to the target object shown in the left- and right-side mirrors, they are not always necessary to be viewed clearly. Accordingly, the aberration balance of the first region V1C3 and the first region V1D2 can be set to have the same value as that of the first region V1B5 adjacent thereto.

Because the first region V1E can be connected to the first region V1A4 when the rear-view mirror is a plane mirror as described above, the aberration balance can be set as in the first region V1A4. When the rear-view mirror is a concave mirror or when a monitor such as a back camera is arranged in the rear-view mirror region bm, the aberration balance can be set on the basis of the accommodation power for the wearer Wr as in the first region V1B5.

In the ophthalmic lens design method of the present modified example, the purpose of the ophthalmic lens LS is to drive a car and the wearer information is information about the visual line obtained by the visual line measurement device when the wearer Wr drives a car to be purchased or a car to be owned by the wearer Wr. Thereby, it is possible to provide the ophthalmic lens Wr more suitable for the wearer Wr on the basis of an arrangement of the mirror and the like in the car driven by the wearer Wr and the characteristics of the visual line when the wearer Wr drives the car.

Modified Example 9

In the above-described embodiment or the like, a configuration in which the optician store obtains the purpose information and the wearer information about the ophthalmic lens LS or the ophthalmic lens LS1 from the wearer Wr and the orderer inputs the information to the order receiving device 2 is adopted. However, in a place other than the optician store, the purpose information or the wearer information may be input to the computer and transmitted to the order receiving device 2 or the like.

For example, it is desirable to measure the wearer information for designing the ophthalmic lens LS for golf at a golf equipment store. It is desirable for a salesperson of the golf equipment store or the like to set or measure the wearer information according to a length of a golf club purchased by the wearer Wr or the like for the wearer Wr who comes to the golf equipment store to purchase golf equipment. Because the golf equipment store has the salesperson with abundant golf expertise to sell golf equipment, it is possible to measure wearer information in a state in which a posture such as, for example, addressing, has been corrected. Further, any visual line measurement device may decide on the wearer information on the basis of information obtained by measuring the region used by the ophthalmic lens when the target object is viewed. The wearer information measured at the golf equipment store can be sent to the optician store via any existing e-mail service or the like or can be brought to the optician store by the purchaser in a state in which the wearer information is written to a special sheet of paper. The optician store can use the wearer information to order an ophthalmic lens as in the above-described embodiment.

Also, when the purpose of the ophthalmic lens LS is golf, the wearer information may be acquired at a sports equipment store other than the golf equipment store and provided to the optician store or the like. When the purpose of the ophthalmic lens LS is to ride a bicycle, the wearer information may be acquired at a bicycle store or other sporting goods store and provided to the optician store or the like. When the purpose of the ophthalmic lens LS is to drive or ride a car, the wearer information may be acquired at the car dealership and provided to the optician store or the like.

In the ophthalmic lens design method of the present modified example, the purpose information and the wearer information are input at a place other than a store of an ophthalmic lens LS seller and transmitted to the computer provided by the ophthalmic lens LS seller. Thereby, it is possible to provide the ophthalmic lens LS suitable for various situations when the wearer Wr views the target object in various places. In particular, it is possible to provide the ophthalmic lens LS more suitable for the wearer Wr by measuring the wearer information for selling the ophthalmic lens LS in a place where there is a person or the like having specialized knowledge according to the purpose of the ophthalmic lens LS.

Modified Example 10

The order receiving device 2 or the design device may be a device configured as a computer system when a program for implementing the information processing function on a computer-readable recording medium and the computer system is allowed to read and execute a program associated with a process of the above-described design unit 27 and a process associated therewith. Also, the "computer system" described here is assumed to include an operating system (OS) and hardware such as peripheral devices. Also, the "computer-readable recording medium" refers to a portable recording medium such as a flexible disk, a magneto-optical disc, or a memory card or a storage device such as a hard disk embedded in the computer system or a solid-state drive. Further, the "computer-readable recording medium" may include a computer-readable recording medium for dynamically retaining the program for a short period of time as in a communication line when the program is transmitted via a network such as the Internet or a communication circuit such as a telephone circuit and a computer-readable recording medium for retaining the program for a given period of time as in a volatile memory inside the computer system including a server and a client when the program is transmitted. Also, the above-described program may be a program for implementing some of the above-described functions. Further, the above-described program may be a program capable of implementing the above-described function in combination with a program already recorded on the computer system.

Figure 23:
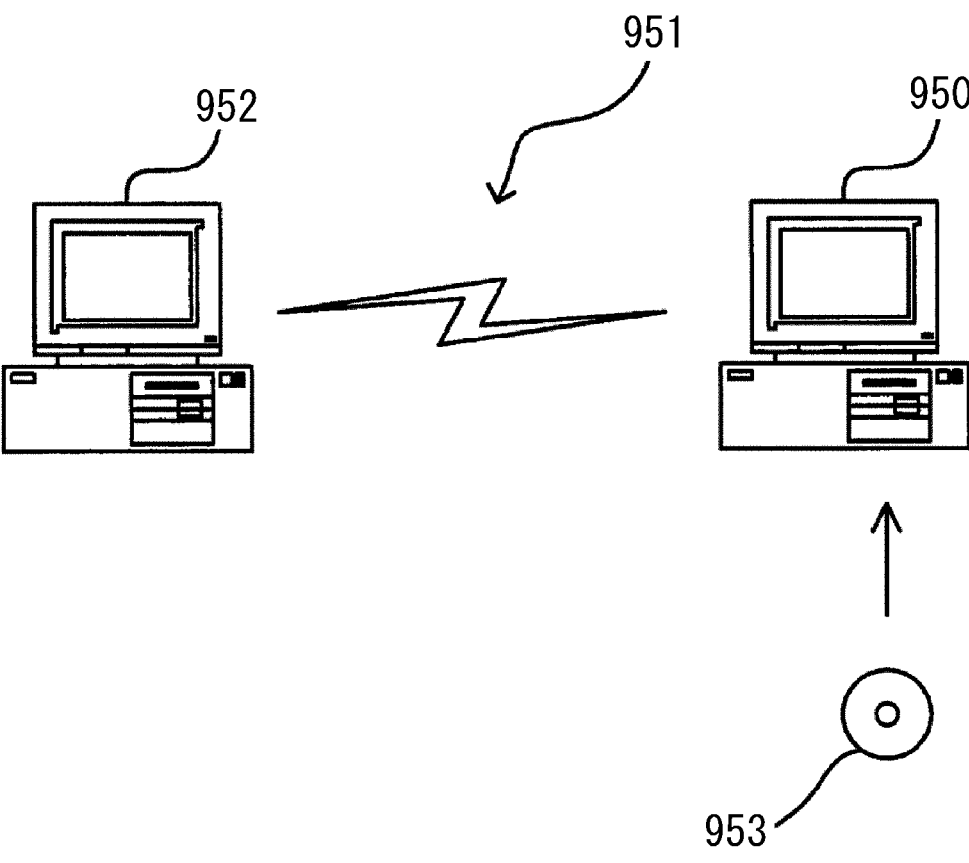
FIG. 23 is a conceptual diagram for describing a process of providing a program.

Also, when the role of the above-described computer system is applied to a personal computer (hereinafter referred to as a PC) or the like, the above-described control-related program can be provided through a recording medium such as a DVD-ROM or a data signal such as the Internet. FIG. 23 is a diagram showing the state. A PC 950 receives the program provided via a DVD-ROM 953. Also, the PC 950 has a connection function with a communication circuit 951. A computer 952 is a server computer that provides the above-described program and stores the program in a recording medium such as a hard disk. The communication circuit 951 is the Internet, a communication circuit of personal computer communication or the like, or a dedicated communication circuit. The computer 952 uses the hard disk to read the program and sends the program to the PC 950 via the communication circuit 951. That is, the program is carried as a data signal through carrier waves and transmitted via the communication circuit 951. As described above, the program can be supplied as a computer program product that can be read by various types of computers such as a recording medium and carrier waves.

According to the present modified example, there is provided a design program for causing a processing device to execute: a first acquisition process (corresponding to step S221 of the flowchart of FIG. 9) of acquiring purpose information (first information) about a purpose of an ophthalmic lens LS to be designed and wearer information (second information) about at least one of a visual line of a wearer Wr of the ophthalmic lens LS for the purpose, a place, a use tool, and a body of the wearer Wr; a second acquisition process (corresponding to step S223) of acquiring distance distribution data indicating the number of first regions V1, positions, shapes, and sizes of a plurality of first regions V1 set on a surface of the ophthalmic lens LS, and distances to a target viewed through the first regions on the basis of the first information; a region setting process (corresponding to step S225) of setting a numerical value to be variably set among numerical values indicating the number of first regions V1, the positions, the shapes, and the sizes of the plurality of first regions V1, and the distances to be set in the distance distribution data on the basis of the second information and set the plurality of first regions V1 and the distances to be set on the surface of the ophthalmic lens LS; and a target aberration setting process (corresponding to step S227) of setting a target aberration distribution of the ophthalmic lens LS on the basis of the plurality of first regions V1 and the set distances that have been set.

Modified Example 11

The numerical values of x1, x2, x3, x4, x10, x20, x30, x40, x100, x200, y1, y2, y3, y4, y10, y20, y30, y100, y200, y300, and y400 exemplified as described above can be appropriately changed on the basis of the characteristics of the eye such as the position of the rotation point of the wearer Wr, the position of the target object assumed for the purpose of the ophthalmic lens LS, the model of the ophthalmic lens, and the like. For example, these numerical values can be set through a shift from the numerical values exemplified as described above in a range of −5 mm to +5 mm, a range of −3 mm to +3 mm, a range of −2 mm to +2 mm, or the like in the X-axis direction and the Y-axis direction. Also, it is possible to change the numerical value of the set distance exemplified above on the basis of characteristics of the eye such as the position of the rotation point of the wearer Wr, a position of the target object assumed for the purpose of the ophthalmic lens LS, a model of the ophthalmic lens, or the like. When an example in which the set distance is set to infinity (0 D) is shown, it can be appropriately set to a value of −0.25 D to 0.25 D. When an example in which the set distance is set to a finite distance is shown, it can be set from a range in which a value of −0.5 D to +0.5 D or −0.25 D to +0.25 D is added to the exemplified set distance. Also, in addition to the first region V1 and the second region V2, it is also possible to newly provide and design a fourth region where the set distance is not constant and changes continuously or discontinuously.

The present invention is not limited to the content of the above-described embodiments. Other aspects considered within the scope of the technical idea of the present invention are also included within the scope of the present invention.

Embodiment Examples

Although embodiment examples relating to the above-described embodiments and modified examples will be shown, the present invention is not limited to content of specific numerical values and the like of the examples. In the following examples and comparative examples, the prism reference point coincides with the fitting point.

Embodiment Example 1

In Embodiment Example 1, the distance distribution data corresponding to the distance distribution D1 in FIG. 4 is used and the optimized design of the single-focus ophthalmic lens for golf is performed according to the aberration balance such that the distribution is rotationally symmetric regardless of the set distance. In the prescription of the ophthalmic lens, the spherical power S was +4 D and the cylindrical power C was 0 D.

As the numerical values of the first regions, the set distance of V1A was ∞ [m], the set distance of V1B was 1.5 m, and the set distance of V1C was 3 m. Also, the numerical values of the second regions, x1 of −7 mm, x2 of −4 mm, y1 of 6 mm, y2 of 3 mm, y3 of −4 mm, and y4 of −7 mm were set as fixed values. The aberration balance of the first region V1A, V1B, and V1C was decided on as a target such that the vision clarity expressed by SQRT (residual refractive power$^{\wedge}$2+(residual astigmatism×0.3$^{\wedge}$2) is minimized. Here, $^{\wedge}$2 denotes a square and SQRT denotes taking the square root in parentheses. Hereinafter, a similarly calculated value was used for the vision clarity. On the basis of this aberration balance target, the target residual refractive power and target residual astigmatism of the prescription eyeglass lens to be designed were decided on by trial and error and the ophthalmic lens was optimized and designed.

FIGS. 24 and 25 are aberration diagrams of the single-focus ophthalmic lens for golf designed in the present embodiment. Each position in the designed single-focus ophthalmic lens is shown by the XY coordinate system with the fitting point FP as the origin as in FIG. 4 (the same is true for each of the following drawings). FIG. 24 shows the distribution of the residual refractive power and the value of the residual refractive power is indicated by a contour line CL1 (the same is also true for the drawing showing the distribution of the following residual refractive power). FIG. 25 shows the distribution of residual astigmatism and the value of residual astigmatism is displayed by a contour line CL2 (the same is also true for the drawing showing the distribution of residual astigmatism below). When this single-focus ophthalmic lens was designed and evaluated, the pattern of the distance distribution D1 shown in FIG. 4 was used for the design object surface. In the drawing, the boundary line between the first region V1 and the second region V2 is indicated by a broken line BL (the same is also true for each of the following drawings). In the present embodiment, the aberration balance is a rotationally symmetric distribution regardless of the set distance. As a result, although there is aberration near the boundary of the first region V1, i.e., the disturbance of the residual refractive power and the residual astigmatism, there are characteristics of aberrations generally rotationally symmetric at positions far away from the boundary.

FIG. 26 is a diagram showing the distribution of an average curvature of a synthetic sag surface of the single-focus ophthalmic lens of the present embodiment. The coordinate systems of FIG. 26 and the drawing showing the distribution of the average curvature to be described below are similar to that of FIG. 10. The average curvature shown in FIG. 26 is a value obtained by subtracting the average curvature C(0,0) at a position (0, 0) from the average curvature C(h, φ) of each point and offsetting the average curvature of each point and has a unit of [1/m]. The average curvature in each of the following drawings is also a value calculated in the similar way. The numerical value of 5.81 shown in the lower left of the drawing is a value after a subtraction process for offsetting. In each of the drawings to be described below, the average curvature uses a value after a subtraction process to offset the average curvature at the origin and the value after the subtraction process is shown at a similar position. The value of the average curvature is indicated by a contour line CL3. In the drawing, circumference C14 of a circle having a height h of 14 mm along the radial direction from the Z-axis and circumference C22 of a circle having a height h of 22 mm are indicated (by dotted lines). The contour lines CL3, the circumference C14, and the circumference C22 are also true for the drawings showing the distribution of the average curvature to be described below.

The average curvature at positions of angles φ (FIG. 10) at heights of 14 mm, 16 mm, 18 mm, 20 mm and 22 mm of the synthetic sag surface of the single-focus ophthalmic lens of the present embodiment is shown in the graph of FIG. 11. The normalized average curvature obtained by normalizing the average curvature is shown in the graphs of FIGS. 12 and 13.

Comparative Example 1

FIGS. 27 and 28 are aberration diagrams of an aspherical single-focus ophthalmic lens having the same prescription as that of Example 1 designed by the conventional technology. FIG. 27 shows a distribution of the residual refractive power and FIG. 28 shows a distribution of the residual astigmatism. Compared with FIGS. 24 and 25, aberrations, i.e., residual refractive power and residual astigmatism, are disturbed to have a step in the vicinity of the boundary of the first region, the disturbance does not stop even at a position away from the boundary, and the aberration value is shifted stepwise in each division region. Thus, the aberration balance changed for each first region V1.

FIG. 29 is a diagram showing the average curvature of the synthetic sag surface of the single-focus ophthalmic lens of the present comparative example. The distribution of this average curvature was rotationally symmetric about the optical axis. Accordingly, there was no change in the average curvature due to the angle φ for all heights h.

Embodiment Example 2

In Embodiment Example 2, the target aberration balance of the first regions V1B and V1C is set to residual refractive power/residual astigmatism=−∞ (residual astigmatism=0) and a design process was performed in conditions similar to those of Embodiment Example 1 with respect to others.

Specifically, because the first region V1A is a region for viewing infinity, the residual refractive power and the residual region are the same as in Embodiment Example 1 such that the wearer can relax without using the accommodation power and an appropriate aberration balance was used such that the effect of astigmatism on the wearing feeling was minimized. However, because the first region V1B and the first region V1C are regions for near vision using the accommodation power for the wearer originally, the necessity to consider the residual refractive power is low as compared with the first region V1A. The aberration balance was set to suitably correct the residual astigmatism by that amount.

FIGS. 30 and 31 are aberration diagrams of the single-focus ophthalmic lens for golf designed in the present embodiment. FIG. 30 shows a distribution of the residual refractive power and FIG. 31 shows a distribution of the residual astigmatism. As shown in FIG. 30, the residual refractive power was higher on the negative side in the first region V1B and the first region V1C. This can be dealt with by increasing the accommodation power for the wearer by an error quantity thereof. As shown in FIG. 31, there was almost no residual astigmatism in the first region V1B and the first region V1C. Thereby, it is possible to obtain the best visual field without blurring due to residual astigmatism in a situation in which the wearer gazes at the ball at his/her feet at the time of addressing in the tee shot or approach when playing golf and a situation in which the wearer views a cup or a target object determined in a direction in which the ball B is hit at the time of putting.

FIG. 32 is a diagram showing the distribution of the average curvature of the synthetic sag surface of the single-focus ophthalmic lens of the present embodiment. The normalized average curvature at the position of the angle φ (FIG. 10) at the heights of 14 mm, 16 mm, 18 mm, 20 mm and 22 mm of the synthetic sag surface is shown in the graph of FIG. 14.

Embodiment Example 3

In Embodiment Example 3, the distance distribution data corresponding to the distance distribution in which the distance distribution D1 of FIG. 4 is shifted by +2 mm in the Y-axis direction is set. Using the distance distribution data, the design of a single-focus ophthalmic lens for golf by adjusting the aberration balance was optimized such that the distribution is rotationally symmetric regardless of the set distance. In the prescription of the single-focus ophthalmic lens of Embodiment Example 3, the spherical power S was −4.25 D and the cylindrical power C was 0 D.

The target aberration balance was determined such that the above-described vision clarity was minimized. On the basis of this target aberration balance, the target residual refractive power and the target residual astigmatism of the prescription ophthalmic lens to be designed were decided on by trial and error and the single-focus ophthalmic lens of the present embodiment was optimized and designed.

FIGS. 33 and 34 are aberration diagrams of the single-focus ophthalmic lens for golf designed in the present embodiment. FIG. 33 shows a distribution of the residual refractive power and FIG. 34 shows a distribution of the residual astigmatism. In the single-focus ophthalmic lens of the present embodiment, the aberration balance has a rotationally symmetric distribution regardless of the design distance. As a result, although there is disturbance of aberration near the boundary of the first region V1, there were characteristics of aberrations generally rotationally symmetric at positions far away from the boundary FIG. 35 is a diagram showing the distribution of the average curvature of the synthetic sag surface of the single-focus ophthalmic lens of the present embodiment. FIG. 36 is a graph showing the normalized average curvature of the synthetic sag surface at the height h and the angle φ of the single-focus ophthalmic lens of the present embodiment.

In FIG. 36 and each of the following drawings showing the normalized average curvature, the curves corresponding to H14, H16, H18, H20, and H22 are shown in a state in which the reference position on the vertical axis is shifted such that the curves do not overlap with respect to normalized average curvatures on circumferences corresponding to heights h of 14 mm, 16 mm, 18 mm, 20 mm and 22 mm along the radial direction from the Z-axis. In H20, H18, H16, and H14, values obtained by adding 0.5, 1.0, 1.5, and 2.0 to the normalized average curvature are shown. A portion CB (indicated by a reference sign with respect to H14 and H22) plotted by overlapping with a thick solid line in each curve is a portion of the curve corresponding to the corresponding reference angle φ0 satisfying the condition (A1).

As shown in FIG. 36, in the single-focus ophthalmic lens of the present embodiment, there are a low-curvature variable arc with different average curvatures at three positions where φ was near 80°, 210°, and 290° at the height h of 18 mm to 22 mm. At any height h, the normalized average curvature at the corresponding reference angle when φ is near 290° was smaller than the normalized average curvature when φ was near 110°. This is a feature for making the same aberration balance over the entire surface.

Embodiment Example 4

In Embodiment Example 4, in relation to the prescription of the ophthalmic lens, the spherical power S was set to −4.25 D and the cylindrical power C was set to 0 D, and the optimized design of the single-focus ophthalmic lens for golf was performed. The design was performed under conditions similar to those of Embodiment Example 2, except for the prescription.

FIGS. 37 and 38 are aberration diagrams of the single-focus ophthalmic lens for golf designed in the present embodiment. FIG. 37 shows a distribution of the residual refractive power and FIG. 38 shows a distribution of the residual astigmatism. As shown in FIG. 37, the residual refractive power was higher on the positive side in the portions corresponding to the first region V1B and the first region V1C. This can be dealt with by decreasing the accommodation power for the wearer by an error quantity thereof. As shown in FIG. 38, there was almost no residual astigmatism in portions corresponding to the first region V1B and the first region V1C. Thereby, it is possible to obtain the best visual field without blurring due to residual astigmatism in a situation in which the wearer gazes at the ball at his/her feet at the time of addressing in the tee shot or approach when playing golf and a situation in which the wearer views a cup or turf at the time of putting.

FIG. 39 is a diagram showing a distribution of the average curvature of the synthetic sag surface of the single-focus ophthalmic lens of the present embodiment. FIG. 40 is a graph showing the normalized average curvature of the synthetic sag surface at the height h and the angle φ of the single-focus ophthalmic lens of the present embodiment. A state in which the reference position on the vertical axis is shifted such that the curves do not overlap is shown.

As shown in FIG. 40, in the single-focus ophthalmic lens of the present embodiment, there was a low-curvature variable arc with different average curvatures at at least two positions where φ was near 80° and 260° at the height h of 14 mm to 22 mm. At any height h, the normalized average curvature at the corresponding reference angle when φ is near 260° was larger than the normalized average curvature when φ was near 80°. This is a characteristic of the average curvature of the synthetic sag surface corresponding to the first region according to a process of designing the aberration balance at the time of design such that the residual astigmatism becomes smaller for a portion corresponding to the first region of the ophthalmic lens closer to the target to be viewed.

Embodiment Example 5

In Embodiment Example 5, in relation to the prescription of the ophthalmic lens, the spherical power S is −1.00 D, the cylindrical power C is −0.75 D, the axial angle Ax of the astigmatic axis is 135°, and the single-focus ophthalmic lens for golf was optimized and designed. The design was performed under conditions similar to those of Embodiment Example 2, except for the prescription.

FIGS. 41 and 42 are aberration diagrams of the single-focus ophthalmic lens for golf designed in the present embodiment. FIG. 41 shows a distribution of the residual refractive power and FIG. 42 shows a distribution of the residual astigmatism. As shown in FIG. 41, the residual refractive power was higher on the positive side in the outer circumference portion particularly corresponding to the first region V1C. This can be dealt with by decreasing the accommodation power for the wearer by an error quantity thereof. As shown in FIG. 42, residual astigmatism was extremely small to have 0.1 D or less in portions corresponding to the first region V1B and the first region V1C. Thereby, it is possible to obtain the best visual field without blurring due to residual astigmatism in a situation in which the wearer gazes at the ball at his/her feet at the time of addressing in the tee shot or approach when playing golf and a situation in which the wearer views a cup or turf at the time of putting. Although the residual astigmatism was small even in the portion corresponding to the first region V1A because the prescription power is weak, it is about 0.15 D in the portion near the outer circumference and is larger than those in the portions corresponding to the first region V1B and the first region V1C.

FIG. 43 is a diagram showing the distribution of the average curvature of the synthetic sag surface of the single-focus ophthalmic lens of the present embodiment. FIG. 44 is a graph showing the normalized average curvature of the synthetic sag surface at the height h and the angle φ of the single-focus ophthalmic lens of the present embodiment. A state in which the reference position on the vertical axis is shifted such that the curves do not overlap is shown.

As shown in FIG. 44, in the single-focus ophthalmic lens of the present embodiment, there was a low-curvature variable arc with different average curvatures at at least two positions where φ was near 115° and 290° at the height h of 18 mm to 22 mm. At any height h, the normalized average curvature at the corresponding reference angle when φ was near 290° was larger than the normalized average curvature when φ was near 110° that is less than 290° by 180°. This is a characteristic of the average curvature of the synthetic sag surface corresponding to the first region according to a process of designing the aberration balance at the time of design such that the residual astigmatism becomes smaller for a portion corresponding to the first region of the ophthalmic lens closer to the target to be viewed.

Embodiment Example 6

In Embodiment Example 6, a process of optimizing and designing a single-focus ophthalmic lens for golf was performing by setting the spherical power S to –3.25 D, setting the cylindrical power C to –1.25 D, and setting an axis angle Ax of the astigmatic axis to 180° for the prescription of the ophthalmic lens using the distance distribution data corresponding to a distance distribution obtained by inverting the distance distribution D1 in FIG. 4 with respect to the Y-axis. The design was performed under conditions similar to those of Embodiment Example 2, except for the prescription and the distance distribution. Assuming that the distance distribution data corresponding to the distance distribution D1 in FIG. 4 is data for designing the ophthalmic lens for the right eye, the distance distribution data here is data for designing the ophthalmic lens for the left eye. In FIG. 46, the regions corresponding to the first regions V1A, V1B, and V1C of the distance distribution D1 are shown.

FIGS. 45 and 46 are aberration diagrams of the single-focus ophthalmic lens for golf designed in the present embodiment. FIG. 45 shows a distribution of the residual refractive power and FIG. 46 shows a distribution of the residual astigmatism. As shown in FIG. 45, the residual refractive power was higher on the positive side particularly in an outer circumference portion for a lower portion of the lens corresponding to the first region. This can be dealt with by decreasing the accommodation power for the wearer by an error quantity thereof. As shown in FIG. 46, there was almost no residual astigmatism with respect to the lower portion of the lens corresponding to the first region. Thereby, it is possible to obtain the best visual field without blurring due to residual astigmatism in a situation in which the wearer gazes at the ball at his/her feet at the time of addressing in the tee shot or approach when playing golf and a situation in which the wearer views a cup or turf at the time of putting.

FIG. 47 is a diagram showing a distribution of the average curvature of the synthetic sag surface of the single-focus ophthalmic lens of the present embodiment. FIG. 48 is a graph showing the normalized average curvature of the synthetic sag surface at the height h and the angle φ of the single-focus ophthalmic lens of the present embodiment. A state in which the reference position on the vertical axis is shifted such that the curves do not overlap is shown.

As shown in FIG. 48, in the single-focus ophthalmic lens of the present embodiment, there was a low-curvature variable arc with different average curvatures at at least two positions where φ was near 90° and 270° at the height h of 16 mm to 22 mm. At any height h, the normalized average curvature at the corresponding reference angle in an angle range of a width of 45° centered on φ=270° was larger than the normalized average curvature when φ was near 90° that is less than 270° by 180°. This is a characteristic of the average curvature of the synthetic sag surface corresponding to the first region according to a process of designing the aberration balance at the time of design such that the residual astigmatism becomes smaller for a portion corresponding to the first region of the ophthalmic lens closer to the target to be viewed.

Embodiment Example 7

In Embodiment Example 7, in relation to the prescription of the ophthalmic lens, the spherical power S is –7.50 D, the cylindrical power C is 0 D, and the single-focus ophthalmic lens for golf is optimized and designed. The design was performed under conditions similar to those of Embodiment Example 2, except for the prescription.

FIGS. 49 and 50 are aberration diagrams of the single-focus ophthalmic lens for golf designed in the present embodiment. FIG. 49 shows a distribution of the residual refractive power and FIG. 50 shows a distribution of the residual astigmatism. As shown in FIG. 49, the residual refractive power was higher on the positive side in the outer circumference portion particularly corresponding to the first region V1C. This can be dealt with by decreasing the accommodation power for the wearer by an error quantity thereof. As shown in FIG. 50, residual astigmatism was almost absent in portions corresponding to the first region V1B and the first region V1C. Thereby, it is possible to obtain the best visual field without blurring due to residual astigmatism in a situation in which the wearer gazes at the ball at his/her feet at the time of addressing in the tee shot or approach when playing golf and a situation in which the wearer views a cup or turf at the time of putting.

FIG. 51 is a diagram showing the distribution of the average curvature of the synthetic sag surface of the single-focus ophthalmic lens of the present embodiment. FIG. 52 is a graph showing the normalized average curvature of the synthetic sag surface at the height h and the angle φ of the single-focus ophthalmic lens of the present embodiment. A state in which the reference position on the vertical axis is shifted such that the curves do not overlap is shown.

As shown in FIG. 52, in the single-focus ophthalmic lens of the present embodiment, there was a low-curvature variable arc with different average curvatures at at least two positions where φ was near 80° and 260° at the height h of 14 mm to 22 mm. At any height h, the normalized average curvature at the corresponding reference angle in an angle range of a width of 45° centered on φ=270° was larger than the normalized average curvature when φ was near 90° that is less than 270° by 180°. This is a characteristic of the average curvature of the synthetic sag surface corresponding to the first region according to a process of designing the aberration balance at the time of design such that the residual astigmatism becomes smaller for a portion corresponding to the first region of the ophthalmic lens closer to the target to be viewed.

The disclosure content of the purpose based on the following priority is incorporated here by reference.

Japanese Patent Purpose No. 2019-230891 (filed on Dec. 20, 2019)

What is claimed is:

1. An ophthalmic lens design method comprising:
   acquiring first information about a purpose of an ophthalmic lens to be designed;
   acquiring second information about at least one of a visual line of a wearer of the ophthalmic lens for the purpose, a place, a use tool, and a body of the wearer;
   acquiring data indicating a number of first regions, positions, shapes, and sizes of a plurality of first regions set on a surface of the ophthalmic lens, and distances to a target viewed through the plurality of first regions based on the first information;
   setting a numerical value to be variably set among numerical values indicating the number of first regions, the positions, the shapes, and the sizes of the plurality of first regions, and the distances in the data based on the second information and setting the plurality of first regions and the distances on the surface of the ophthalmic lens; and setting a target aberration distribution of the ophthalmic lens whereby each position in the ophthalmic lens is associated with a target residual refractive power and a target residual astigmatism distribution based on the plurality of first regions, the distances that have been set, wherein an aberration balance representing a ratio of the target residual refractive power and the target residual astigmatism for each position of the ophthalmic lens is set in association with characteristics of the wearer and the target viewed.

2. The ophthalmic lens design method according to claim 1, wherein a first region, among the plurality of first regions, for viewing a target object that is same based on the purpose is set on a left side of a left eye lens when viewed from the wearer and a left side of a right eye lens when viewed from the wearer or a right side of the left eye lens when viewed from the wearer and a right side of the right eye lens when viewed from the wearer within the ophthalmic lens.

3. An ophthalmic lens manufacturing method comprising:
manufacturing an ophthalmic lens designed by the ophthalmic lens design method according to claim 2.

4. The ophthalmic lens design method according to claim 1, wherein, in each of the plurality of first regions, a distribution of values indicating a relative magnitude of another of target residual refractive power and target residual astigmatism with respect to one of the target residual refractive power and the target residual astigmatism is rotationally symmetric with respect to a straight line passing through a fitting point of the ophthalmic lens and a design rotation point or an optical axis of the ophthalmic lens as an axis.

5. An ophthalmic lens manufacturing method comprising:
manufacturing an ophthalmic lens designed by the ophthalmic lens design method according to claim 4.

6. The ophthalmic lens design method according to claim 1, wherein, at positions where a magnitude of a rotation angle taken from a straight line passing through a design rotation point and a fitting point in the ophthalmic lens is same, target astigmatism in the first region where a finite distance is set is set to be less than astigmatism in another first region set at another distance longer than the distance.

7. An ophthalmic lens manufacturing method comprising:
manufacturing an ophthalmic lens designed by the ophthalmic lens design method according to claim 6.

8. The ophthalmic lens design method according to claim 1, wherein, at positions where a magnitude of a rotation angle taken from a straight line passing through a design rotation point and a fitting point in the ophthalmic lens is same, target residual refractive power in the first region where a finite distance is set is set to have a larger positive-side value than residual refractive power in a first region, among the plurality of first regions, where the distance is set to infinity.

9. An ophthalmic lens manufacturing method comprising:
manufacturing an ophthalmic lens designed by the ophthalmic lens design method according to claim 8.

10. The ophthalmic lens design method according to claim 1, comprising:
setting a second region on a surface of the ophthalmic lens to be designed, wherein the second region is set between two first regions where different distances are set and the distance in the second region changes such that a connection between the different distances is made.

11. The ophthalmic lens design method according to claim 10, comprising:
further setting a third region inside of the second region,
wherein, in the third region, a change in the distance in a direction orthogonal to a trajectory of the visual line is set to be less than a change in the distance in a direction along the trajectory based on a frequency at which the visual line of the wearer passes through the surface of the ophthalmic lens.

12. An ophthalmic lens manufacturing method comprising:
manufacturing an ophthalmic lens designed by the ophthalmic lens design method according to claim 11.

13. The ophthalmic lens design method according to claim 10,
wherein at least the distance in the second region is expressed by a spline function.

14. An ophthalmic lens manufacturing method comprising:
manufacturing an ophthalmic lens designed by the ophthalmic lens design method according to claim 13.

15. The ophthalmic lens design method according to claim 10, comprising:
designing the ophthalmic lens such that an apparent optical axis of the ophthalmic lens passes through the first region or the second region different from the first region or the second region where a fitting point is arranged.

16. An ophthalmic lens manufacturing method comprising:
manufacturing an ophthalmic lens designed by the ophthalmic lens design method according to claim 15.

17. An ophthalmic lens manufacturing method comprising:
manufacturing an ophthalmic lens designed by the ophthalmic lens design method according to claim 10.

18. The ophthalmic lens design method according to claim 1,
wherein the second information includes at least one piece of information about a height of the wearer, a posture of the wearer when the wearer acts with respect to the purpose, a position or a range of the ophthalmic lens through which a visual line of the wearer passes, and a position of the wearer or a visual target.

19. An ophthalmic lens manufacturing method comprising:
manufacturing an ophthalmic lens designed by the ophthalmic lens design method according to claim 18.

20. The ophthalmic lens design method according to claim 1,
wherein the first information and the second information are input at a place other than a store of a seller of the ophthalmic lens and are transmitted to a computer provided for the seller.

21. An ophthalmic lens manufacturing method comprising:
manufacturing an ophthalmic lens designed by the ophthalmic lens design method according to claim 20.

22. An ophthalmic lens manufacturing method comprising:
manufacturing an ophthalmic lens designed by the ophthalmic lens design method according to claim 1.

23. An ophthalmic lens having a pair of refracting surfaces of an object-side surface formed on an object side and an eyeball-side surface formed on an eyeball side, wherein at least one of the object-side surface and the eyeball-side surface is an aspherical surface that is non-rotationally symmetric, wherein a fitting point set on the object-side surface is set as an origin, wherein a straight line parallel to a normal line of the object-side surface at a reference point for measuring prism power set on the object-side surface is set as a Z-axis and a direction from the object-side surface to the eyeball-side surface is set as a positive direction of the Z-axis, wherein, within a plane orthogonal to the Z-axis, an upward-downward direction when viewed from a wearer of the ophthalmic lens is set as a Y-axis, the upward direction is set as a positive direction of the Y-axis, and a left-right direction when viewed from the wearer is set as an X-axis, and the right direction is set as a positive direction of the X-axis, wherein the Z-axis is set as a rotation axis, an angle formed with respect to the X-axis is denoted by $\phi$ [°], a direction of rotation from the positive direction of the X-axis to the positive direction of the Y-axis is set as a positive direction, and a height along a radial direction from the Z-axis is denoted by h [mm], wherein a Z coordinate of a point at h and $\phi$ in the object-side surface is denoted by z1(h, $\phi$) and a Z coordinate of a point at h and $\phi$ in the eyeball-side surface is denoted by z2(h, $\phi$) when each of h and $\phi$ has a value corresponding to a position of any point on the object-side surface and average curvature of a synthetic sag surface at h and $\phi$ is denoted by C(h, $\phi$) when a virtual surface in which z3 obtained as z3(h, $\phi$)=z1(h, $\phi$)−z2 (h, $\phi$) is set as a Z coordinate of a point at h and $\phi$ is defined as the synthetic sag surface, wherein a maximum value of the average curvature C (h, $\phi$) of the synthetic sag surface is denoted by Cmax360 (h) and a minimum thereof is denoted by Cmin360(h) when the angle $\phi$ changes in a range of a width of 360° from 0° to 360° at the height h, and a maximum value of the average curvature C(h, $\phi$) of the synthetic sag surface is denoted by Cmax45(h, $\phi$1) and a minimum thereof is denoted by Cmin45(h, $\phi$1) when the angle $\phi$ changes in a range of a width of 45° from $\phi$=$\phi$1−22.5° to $\phi$=$\phi$1+22.5° centered on a specific angle $\phi$1 capable of having any value from 0° to 360° at the height h, wherein Cpp45(h, $\phi$1) and Cpp360(h) are set as values obtained from the following equations (C1) and (C2) of:

$$Cpp45(h,\phi1)=Cmax45(h,\phi1)-Cmin45(h,\phi1) \quad \text{(C1) and}$$

$$Cpp360(h)=Cmax360(h)-Cmin360(h) \quad \text{(C2),}$$

wherein, when an angle $\phi$1 satisfying a condition that Cpp360(h)×0.1 is greater than or equal to Cpp45(h, $\phi$1) is set as a corresponding reference angle $\phi$0 at at least one value of h greater than or equal to 14 mm and less than or equal to 22 mm, a plurality of corresponding reference angles $\phi$0 are present and corresponding reference angles $\phi$0 of at least one pair among the plurality of corresponding reference angles $\phi$0 are 45° or more apart from each other, wherein at least one of the plurality of corresponding reference angles $\phi$0 is a corresponding reference angle $\phi$0a included in a range of 5° to 175° and at least one of the plurality of corresponding reference angles $\phi$0 is a corresponding reference angle $\phi$0b included in a range of 185° to 355°, and wherein C(h, $\phi$0a) is different from C(h, $\phi$0b).

24. The ophthalmic lens according to claim 23, wherein at least one of the corresponding reference angles $\phi$0 is either a corresponding reference angle $\phi$0c included in a range of 175° to 265° or a corresponding reference angle $\phi$0d included in a range of 275° to 5°.

25. The ophthalmic lens according to claim 23, wherein at least one of the plurality of corresponding reference angles $\phi$0 is a corresponding reference angle $\phi$0e present at any one angle in a range of 247.5° to 292.5°.

26. The ophthalmic lens according to claim 25, wherein, if a sum of prescription-specific spherical power of the ophthalmic lens and half of prescription-specific astigmatism power is denoted by Se, $$C(h,\phi0e)<C(h,\phi0e-180°) \text{ when } Se \text{ is positive, and}$$

$$C(h,\phi0e)>C(h,\phi0e-180°) \text{ when } Se \text{ is negative.}$$

27. The ophthalmic lens according to claim 23, wherein, at all values of h greater than or equal to 14 mm and less than or equal to 22 mm, the plurality of corresponding reference angles $\phi$0 are present and corresponding reference angles $\phi$0 of at least one pair among the plurality of corresponding reference angles $\phi$0 are 45° or more apart from each other, and at least one of the plurality of corresponding reference angles $\phi$0 is an angle $\phi$0a included in a range of 5° to 175° and at least one of the plurality of corresponding reference angles $\phi$0 is an angle $\phi$0b included in a range of 185° to 355°, and wherein C(h, $\phi$0a) is different from C(h, $\phi$0b).

28. The ophthalmic lens according to claim 23, wherein the ophthalmic lens is a single-focus ophthalmic lens or a progressive refractive power-specific ophthalmic lens.

29. An ophthalmic lens design device comprising:

a first acquisition unit configured to acquire first information about a purpose of an ophthalmic lens to be designed and second information about at least one of a visual line of a wearer of the ophthalmic lens for the purpose, a place, a use tool, and a body of the wearer;

a second acquisition unit configured to acquire data indicating a number of first regions, positions, shapes, and sizes of a plurality of first regions set on a surface of the ophthalmic lens, and distances to a target viewed through the first regions based on the first information;

a region setting unit configured to set a numerical value to be variably set among numerical values indicating the number of first regions, the positions, the shapes, and the sizes of the plurality of first regions, and the distances in the data based on the second information and set the plurality of first regions and the distances on the surface of the ophthalmic lens; and a target aberration setting unit configured to set a target aberration distribution of the ophthalmic lens whereby each position in the ophthalmic lens is associated with a target residual refractive power and a target residual astigmatism distribution based on the plurality of first regions and the distances that have been set, wherein an aberration balance representing a ratio of the target residual refractive power and the target residual astigmatism for each position of the ophthalmic lens is set in association with characteristics of the wearer and the target viewed.

30. An ophthalmic lens order receiving/ordering system comprising:

the ophthalmic lens design device according to claim 29;

an ophthalmic lens ordering device including an input unit configured to receive inputs of the first information and the second information and a transmission unit configured to transmit the first information and the second information; and an ophthalmic lens order receiving device including a reception unit configured to receive the first information and the second information.

31. A design program for causing a processing device to execute:

a first acquisition process of acquiring first information about a purpose of an ophthalmic lens to be designed and second information about at least one of a visual line of a wearer of the ophthalmic lens for the purpose, a place, a use tool, and a body of the wearer;

a second acquisition process of acquiring data indicating a number of first regions, positions, shapes, and sizes of a plurality of first regions set on a surface of the ophthalmic lens, and distances to a target viewed through the plurality of first regions based on the first information;

a region setting process of setting a numerical value to be variably set among numerical values indicating the number of first regions, the positions, the shapes, and the sizes of the plurality of first regions, and the distances in the data based on the second information and setting the plurality of first regions and the distances on the surface of the ophthalmic lens; and a target aberration setting process of setting a target aberration distribution of the ophthalmic lens whereby each position in the ophthalmic lens is associated with a target residual refractive power and a target residual astigmatism distribution based on the plurality of first regions and the distances that have been set, wherein an aberration balance representing a ratio of the target residual refractive power and the target residual astigmatism for each position of the ophthalmic lens is set in association with characteristics of the wearer and the target viewed.

* * * * *